DISPATCHING SYSTEM

Filed June 13, 1960 25 Sheets-Sheet 1

SOLID LINES = CONNECTIONS BETWEEN PANELS AND MAPS

DASHED LINES = MANNER OF MOVING IDENTIFYING TOKENS

INVENTORS.
D. BLAISDELL AND
T. J. JUDGE

BY Forest B. Hitchcock

THEIR ATTORNEY

INVENTORS.
D. BLAISDELL AND
T. J. JUDGE
BY
Forest B. Hitchcock
THEIR ATTORNEY

INVENTORS.
D. BLAISDELL AND
T. J. JUDGE
BY
Forest B. Hitchcock
THEIR ATTORNEY

DISPATCHING SYSTEM

Filed June 13, 1960 25 Sheets-Sheet 4

INVENTORS
D. BLAISDELL AND
T. J. JUDGE
BY
Forest B. Hitchcock
THEIR ATTORNEY

Oct. 1, 1963

D. BLAISDELL ETAL 3,105,951

DISPATCHING SYSTEM

Filed June 13, 1960

25 Sheets-Sheet 5

*INVENTORS.*
D. BLAISDELL AND
T. J. JUDGE

*BY* Forest B. Hitchcock
THEIR ATTORNEY

INVENTORS.
D. BLAISDELL AND
T. J. JUDGE
BY Forest B. Hitchcock
THEIR ATTORNEY

DISPATCHING SYSTEM

Filed June 13, 1960 25 Sheets-Sheet 7

INVENTORS.
D. BLAISDELL AND
T. J. JUDGE
BY Forest B. Hitchcock
THEIR ATTORNEY

INVENTORS
D. BLAISDELL AND
T. J. JUDGE
BY Forest B. Hitchcock
THEIR ATTORNEY

INVENTORS.
D. BLAISDELL AND
T. J. JUDGE
BY
Forest B. Hitchcock
THEIR ATTORNEY

INVENTORS.
D. BLAISDELL AND
T. J. JUDGE
BY
Forest B. Hitchcock
THEIR ATTORNEY

INVENTORS.
D. BLAISDELL AND
T. J. JUDGE
BY
Forest B. Hitchcock
THEIR ATTORNEY

INVENTORS.
D. BLAISDELL AND
T. J. JUDGE
BY
Forest B. Hitchcock
THEIR ATTORNEY

INVENTORS.
D. BLAISDELL AND
T. J. JUDGE
BY
Forest B. Hitchcock
THEIR ATTORNEY

INVENTORS.
D. BLAISDELL AND
T. J. JUDGE
BY Forest B. Hitchcock
THEIR ATTORNEY

FIG. 3.

CODE CHART

| STATION DESIG-NATION | UNIT DESIG-NATION | MARK SPACE BUSES | | | | | | | |
|---|---|---|---|---|---|---|---|---|---|
| | | 1 | 2 | 3 | 4 | 5 | 6 | 7 | 8 |
| ADE | 034 | S | M | M | M | M | S | M | M |
| ADF | 035 | M | S | M | M | M | S | M | M |
| ADH | 037 | M | M | S | M | M | S | M | M |
| ADI | 038 | S | M | S | M | M | S | M | M |
| AJJ | 099 | M | S | M | M | M | S | S | M |
| BLANK | | S | S | S | S | S | S | S | S |

M = ENERGIZED MARK BUS
S = ENERGIZED SPACE BUS

FIG. 4.

CODE CHART

| LETTERS | DIGITS | UNITS, TENS AND HUNDREDS BUSES | | | | | |
|---|---|---|---|---|---|---|---|
| | | 1 | 2 | 3 | 4 | 5 | 6 |
| A | 0 | + | O | + | O | + | O |
| B | 1 | + | O | O | + | O | + |
| C | 2 | + | + | O | O | + | O |
| D | 3 | O | + | O | + | O | + |
| E | 4 | O | + | + | O | + | O |
| F | 5 | O | + | + | O | O | + |
| G | 6 | O | O | + | + | + | O |
| H | 7 | + | O | + | O | O | + |
| I | 8 | + | O | O | + | + | O |
| J | 9 | + | + | O | O | O | + |
| BLANK | | O | O | + | + | O | + |

+ = ENERGIZED BUS
O = DEENERGIZED BUS

*INVENTORS*
D. BLAISDELL AND
T. J. JUDGE
*BY*
THEIR ATTORNEY

FIG. 5A. CODE CHART

| UNIT DESIG-NATION | MARK-SPACE BUSES | | | | | | | |
|---|---|---|---|---|---|---|---|---|
| | 1 | 2 | 3 | 4 | 5 | 6 | 7 | 8 |
| 001 | M | M | M | M | M | M | M | M |
| 002 | S | M | M | M | M | M | M | M |
| 003 | M | S | M | M | M | M | M | M |
| 004 | S | S | M | M | M | M | M | M |
| 005 | M | M | S | M | M | M | M | M |
| 006 | S | M | S | M | M | M | M | M |
| 007 | M | S | S | M | M | M | M | M |
| 008 | S | S | S | M | M | M | M | M |
| 009 | M | M | M | S | M | M | M | M |
| 010 | S | M | M | S | M | M | M | M |
| 011 | M | S | M | S | M | M | M | M |
| 012 | S | S | M | S | M | M | M | M |
| 013 | M | M | S | S | M | M | M | M |
| 014 | S | M | S | S | M | M | M | M |
| 015 | M | S | S | S | M | M | M | M |
| 016 | S | S | S | S | M | M | M | M |
| 017 | M | M | M | M | S | M | M | M |
| 018 | S | M | M | M | S | M | M | M |
| 019 | M | S | M | M | S | M | M | M |
| 020 | S | S | M | M | S | M | M | M |
| 021 | M | M | S | M | S | M | M | M |
| 022 | S | M | S | M | S | M | M | M |
| 023 | M | S | S | M | S | M | M | M |
| 024 | S | S | S | M | S | M | M | M |
| 025 | M | M | M | S | S | M | M | M |
| 026 | S | M | M | S | S | M | M | M |
| 027 | M | S | M | S | S | M | M | M |
| 028 | S | S | M | S | S | M | M | M |
| 029 | M | M | S | S | S | M | M | M |
| 030 | S | M | S | S | S | M | M | M |
| 031 | M | S | S | S | S | M | M | M |
| 032 | S | S | S | S | S | M | M | M |

M = ENERGIZED MARK BUS
S = ENERGIZED SPACE BUS

FIG. 5B. CODE CHART

| UNIT DESIG-NATION | MARK-SPACE BUSES | | | | | | | |
|---|---|---|---|---|---|---|---|---|
| | 1 | 2 | 3 | 4 | 5 | 6 | 7 | 8 |
| 033 | M | M | M | M | M | S | M | M |
| 034 | S | M | M | M | M | S | M | M |
| 035 | M | S | M | M | M | S | M | M |
| 036 | S | S | M | M | M | S | M | M |
| 037 | M | M | S | M | M | S | M | M |
| 038 | S | M | S | M | M | S | M | M |
| 039 | M | S | S | M | M | S | M | M |
| 040 | S | S | S | M | M | S | M | M |
| 041 | M | M | M | S | M | S | M | M |
| 042 | S | M | M | S | M | S | M | M |
| 043 | M | S | M | S | M | S | M | M |
| 044 | S | S | M | S | M | S | M | M |
| 045 | M | M | S | S | M | S | M | M |
| 046 | S | M | S | S | M | S | M | M |
| 047 | M | S | S | S | M | S | M | M |
| 048 | S | S | S | S | M | S | M | M |
| 049 | M | M | M | M | S | S | M | M |
| 050 | S | M | M | M | S | S | M | M |
| 051 | M | S | M | M | S | S | M | M |
| 052 | S | S | M | M | S | S | M | M |
| 053 | M | M | S | M | S | S | M | M |
| 054 | S | M | S | M | S | S | M | M |
| 055 | M | S | S | M | S | S | M | M |
| 056 | S | S | S | M | S | S | M | M |
| 057 | M | M | M | S | S | S | M | M |
| 058 | S | M | M | S | S | S | M | M |
| 059 | M | S | M | S | S | S | M | M |
| 060 | S | S | M | S | S | S | M | M |
| 061 | M | M | S | S | S | S | M | M |
| 062 | S | M | S | S | S | S | M | M |
| 063 | M | S | S | S | S | S | M | M |
| 064 | S | S | S | S | S | S | M | M |

M = ENERGIZED MARK BUS
S = ENERGIZED SPACE BUS

*INVENTORS*
D. BLAISDELL AND
T. J. JUDGE
*BY* Forest B. Hitchcock
THEIR ATTORNEY

FIG. 5C. CODE CHART

| UNIT DESIG-NATION | MARK-SPACE BUSES | | | | | | | |
|---|---|---|---|---|---|---|---|---|
| | 1 | 2 | 3 | 4 | 5 | 6 | 7 | 8 |
| 065 | M | M | M | M | M | M | S | M |
| 066 | S | M | M | M | M | M | S | M |
| 067 | M | S | M | M | M | M | S | M |
| 068 | S | S | M | M | M | M | S | M |
| 069 | M | M | S | M | M | M | S | M |
| 070 | S | M | S | M | M | M | S | M |
| 071 | M | S | S | M | M | M | S | M |
| 072 | S | S | S | M | M | M | S | M |
| 073 | M | M | M | S | M | M | S | M |
| 074 | S | M | M | S | M | M | S | M |
| 075 | M | S | M | S | M | M | S | M |
| 076 | S | S | M | S | M | M | S | M |
| 077 | M | M | S | S | M | M | S | M |
| 078 | S | M | S | S | M | M | S | M |
| 079 | M | S | S | S | M | M | S | M |
| 080 | S | S | S | S | M | M | S | M |
| 081 | M | M | M | M | S | M | S | M |
| 082 | S | M | M | M | S | M | S | M |
| 083 | M | S | M | M | S | M | S | M |
| 084 | S | S | M | M | S | M | S | M |
| 085 | M | M | S | M | S | M | S | M |
| 086 | S | M | S | M | S | M | S | M |
| 087 | M | S | S | M | S | M | S | M |
| 088 | S | S | S | M | S | M | S | M |
| 089 | M | M | M | S | S | M | S | M |
| 090 | S | M | M | S | S | M | S | M |
| 091 | M | S | M | S | S | M | S | M |
| 092 | S | S | M | S | S | M | S | M |
| 093 | M | M | S | S | S | M | S | M |
| 094 | S | M | S | S | S | M | S | M |
| 095 | M | S | S | S | S | M | S | M |
| 096 | S | S | S | S | S | M | S | M |

M= ENERGIZED MARK BUS
S= ENERGIZED SPACE BUS

FIG. 5D. CODE CHART

| UNIT DESIG-NATION | MARK-SPACE BUSES | | | | | | | |
|---|---|---|---|---|---|---|---|---|
| | 1 | 2 | 3 | 4 | 5 | 6 | 7 | 8 |
| 097 | M | M | M | M | M | S | S | M |
| 098 | S | M | M | M | M | S | S | M |
| 099 | M | S | M | M | M | S | S | M |
| 100 | S | S | M | M | M | S | S | M |
| 101 | M | M | S | M | M | S | S | M |
| 102 | S | M | S | M | M | S | S | M |
| 103 | M | S | S | M | M | S | S | M |
| 104 | S | S | S | M | M | S | S | M |
| 105 | M | M | M | S | M | S | S | M |
| 106 | S | M | M | S | M | S | S | M |
| 107 | M | S | M | S | M | S | S | M |
| 108 | S | S | M | S | M | S | S | M |
| 109 | M | M | S | S | M | S | S | M |
| 110 | S | M | S | S | M | S | S | M |
| 111 | M | S | S | S | M | S | S | M |
| 112 | S | S | S | S | M | S | S | M |
| 113 | M | M | M | M | S | S | S | M |
| 114 | S | M | M | M | S | S | S | M |
| 115 | M | S | M | M | S | S | S | M |
| 116 | S | S | M | M | S | S | S | M |
| 117 | M | M | S | M | S | S | S | M |
| 118 | S | M | S | M | S | S | S | M |
| 119 | M | S | S | M | S | S | S | M |
| 120 | S | S | S | M | S | S | S | M |
| 121 | M | M | M | S | S | S | S | M |
| 122 | S | M | M | S | S | S | S | M |
| 123 | M | S | M | S | S | S | S | M |
| 124 | S | S | M | S | S | S | S | M |
| 125 | M | M | S | S | S | S | S | M |
| 126 | S | M | S | S | S | S | S | M |
| 127 | M | S | S | S | S | S | S | M |
| 128 | S | S | S | S | S | S | S | M |

M= ENERGIZED MARK BUS
S= ENERGIZED SPACE BUS

INVENTORS
D. BLAISDELL AND
T. J. JUDGE
BY
Forest B. Hitchcock
THEIR ATTORNEY

FIG. 5E.

CODE CHART

| UNIT DESIG-NATION | MARK-SPACE BUSES | | | | | | | |
|---|---|---|---|---|---|---|---|---|
| | 1 | 2 | 3 | 4 | 5 | 6 | 7 | 8 |
| 129 | M | M | M | M | M | M | M | S |
| 130 | S | M | M | M | M | M | M | S |
| 131 | M | S | M | M | M | M | M | S |
| 132 | S | S | M | M | M | M | M | S |
| 133 | M | M | S | M | M | M | M | S |
| 134 | S | M | S | M | M | M | M | S |
| 135 | M | S | S | M | M | M | M | S |
| 136 | S | S | S | M | M | M | M | S |
| 137 | M | M | M | S | M | M | M | S |
| 138 | S | M | M | S | M | M | M | S |
| 139 | M | S | M | S | M | M | M | S |
| 140 | S | S | M | S | M | M | M | S |
| 141 | M | M | S | S | M | M | M | S |
| 142 | S | M | S | S | M | M | M | S |
| 143 | M | S | S | S | M | M | M | S |
| 144 | S | S | S | S | M | M | M | S |
| 145 | M | M | M | M | S | M | M | S |
| 146 | S | M | M | M | S | M | M | S |
| 147 | M | S | M | M | S | M | M | S |
| 148 | S | S | M | M | S | M | M | S |
| 149 | M | M | S | M | S | M | M | S |
| 150 | S | M | S | M | S | M | M | S |
| 151 | M | S | S | M | S | M | M | S |
| 152 | S | S | S | M | S | M | M | S |
| 153 | M | M | M | S | S | M | M | S |
| 154 | S | M | M | S | S | M | M | S |
| 155 | M | S | M | S | S | M | M | S |
| 156 | S | S | M | S | S | M | M | S |
| 157 | M | M | S | S | S | M | M | S |
| 158 | S | M | S | S | S | M | M | S |
| 159 | M | S | S | S | S | M | M | S |
| 160 | S | S | S | S | S | M | M | S |

M= ENERGIZED MARK BUS
S= ENERGIZED SPACE BUS

FIG. 5F.

CODE CHART

| UNIT DESIG-NATION | MARK-SPACE BUSES | | | | | | | |
|---|---|---|---|---|---|---|---|---|
| | 1 | 2 | 3 | 4 | 5 | 6 | 7 | 8 |
| 161 | M | M | M | M | M | S | M | S |
| 162 | S | M | M | M | M | S | M | S |
| 163 | M | S | M | M | M | S | M | S |
| 164 | S | S | M | M | M | S | M | S |
| 165 | M | M | S | M | M | S | M | S |
| 166 | S | M | S | M | M | S | M | S |
| 167 | M | S | S | M | M | S | M | S |
| 168 | S | S | S | M | M | S | M | S |
| 169 | M | M | M | S | M | S | M | S |
| 170 | S | M | M | S | M | S | M | S |
| 171 | M | S | M | S | M | S | M | S |
| 172 | S | S | M | S | M | S | M | S |
| 173 | M | M | S | S | M | S | M | S |
| 174 | S | M | S | S | M | S | M | S |
| 175 | M | S | S | S | M | S | M | S |
| 176 | S | S | S | S | M | S | M | S |
| 177 | M | M | M | M | S | S | M | S |
| 178 | S | M | M | M | S | S | M | S |
| 179 | M | S | M | M | S | S | M | S |
| 180 | S | S | M | M | S | S | M | S |
| 181 | M | M | S | M | S | S | M | S |
| 182 | S | M | S | M | S | S | M | S |
| 183 | M | S | S | M | S | S | M | S |
| 184 | S | S | S | M | S | S | M | S |
| 185 | M | M | M | S | S | S | M | S |
| 186 | S | M | M | S | S | S | M | S |
| 187 | M | S | M | S | S | S | M | S |
| 188 | S | S | M | S | S | S | M | S |
| 189 | M | M | S | S | S | S | M | S |
| 190 | S | M | S | S | S | S | M | S |
| 191 | M | S | S | S | S | S | M | S |
| 192 | S | S | S | S | S | S | M | S |

M= ENERGIZED MARK BUS
S= ENERGIZED SPACE BUS

*INVENTORS*
D. BLAISDELL AND
T. J. JUDGE
*BY* Forest B. Hitchcock
THEIR ATTORNEY

FIG. 5G. CODE CHART

| UNIT DESIGNATION | MARK-SPACE BUSES | | | | | | | |
|---|---|---|---|---|---|---|---|---|
| | 1 | 2 | 3 | 4 | 5 | 6 | 7 | 8 |
| 193 | M | M | M | M | M | M | S | S |
| 194 | S | M | M | M | M | M | S | S |
| 195 | M | S | M | M | M | M | S | S |
| 196 | S | S | M | M | M | M | S | S |
| 197 | M | M | S | M | M | M | S | S |
| 198 | S | M | S | M | M | M | S | S |
| 199 | M | S | S | M | M | M | S | S |
| 200 | S | S | S | M | M | M | S | S |
| 201 | M | M | M | S | M | M | S | S |
| 202 | S | M | M | S | M | M | S | S |
| 203 | M | S | M | S | M | M | S | S |
| 204 | S | S | M | S | M | M | S | S |
| 205 | M | M | S | S | M | M | S | S |
| 206 | S | M | S | S | M | M | S | S |
| 207 | M | S | S | S | M | M | S | S |
| 208 | S | S | S | S | M | M | S | S |
| 209 | M | M | M | M | S | M | S | S |
| 210 | S | M | M | M | S | M | S | S |
| 211 | M | S | M | M | S | M | S | S |
| 212 | S | S | M | M | S | M | S | S |
| 213 | M | M | S | M | S | M | S | S |
| 214 | S | M | S | M | S | M | S | S |
| 215 | M | S | S | M | S | M | S | S |
| 216 | S | S | S | M | S | M | S | S |
| 217 | M | M | M | S | S | M | S | S |
| 218 | S | M | M | S | S | M | S | S |
| 219 | M | S | M | S | S | M | S | S |
| 220 | S | S | M | S | S | M | S | S |
| 221 | M | M | S | S | S | M | S | S |
| 222 | S | M | S | S | S | M | S | S |
| 223 | M | S | S | S | S | M | S | S |
| 224 | S | S | S | S | S | M | S | S |

M=ENERGIZED MARK BUS
S=ENERGIZED SPACE BUS

FIG. 5H. CODE CHART

| UNIT DESIGNATION | MARK-SPACE BUSES | | | | | | | |
|---|---|---|---|---|---|---|---|---|
| | 1 | 2 | 3 | 4 | 5 | 6 | 7 | 8 |
| 225 | M | M | M | M | M | S | S | S |
| 226 | S | M | M | M | M | S | S | S |
| 227 | M | S | M | M | M | S | S | S |
| 228 | S | S | M | M | M | S | S | S |
| 229 | M | M | S | M | M | S | S | S |
| 230 | S | M | S | M | M | S | S | S |
| 231 | M | S | S | M | M | S | S | S |
| 232 | S | S | S | M | M | S | S | S |
| 233 | M | M | M | S | M | S | S | S |
| 234 | S | M | M | S | M | S | S | S |
| 235 | M | S | M | S | M | S | S | S |
| 236 | S | S | M | S | M | S | S | S |
| 237 | M | M | S | S | M | S | S | S |
| 238 | S | M | S | S | M | S | S | S |
| 239 | M | S | S | S | M | S | S | S |
| 240 | S | S | S | S | M | S | S | S |
| 241 | M | M | M | M | S | S | S | S |
| 242 | S | M | M | M | S | S | S | S |
| 243 | M | S | M | M | S | S | S | S |
| 244 | S | S | M | M | S | S | S | S |
| 245 | M | M | S | M | S | S | S | S |
| 246 | S | M | S | M | S | S | S | S |
| 247 | M | S | S | M | S | S | S | S |
| 248 | S | S | S | M | S | S | S | S |
| 249 | M | M | M | S | S | S | S | S |
| 250 | S | M | M | S | S | S | S | S |
| 251 | M | S | M | S | S | S | S | S |
| 252 | S | S | M | S | S | S | S | S |
| 253 | M | M | S | S | S | S | S | S |
| 254 | S | M | S | S | S | S | S | S |
| 255 | M | S | S | S | S | S | S | S |
| 256 | S | S | S | S | S | S | S | S |

M= ENERGIZED MARK BUS
S= ENERGIZED SPACE BUS

INVENTORS
D. BLAISDELL AND
T. J. JUDGE
BY Forest B. Hitchcock
THEIR ATTORNEY

SEQUENCE CHART (FILL-IN OPERATION)

INVENTORS
D. BLAISDELL AND
T. J. JUDGE
BY
Forest B. Hitchcock
THEIR ATTORNEY

INVENTORS.
D. BLAISDELL AND
T. J. JUDGE
BY
Forest B. Hitchcock
THEIR ATTORNEY

SOLID LINES = CONNECTIONS BETWEEN PANELS AND MAPS
DASHED LINES = MANNER OF MOVING IDENTIFYING TOKENS

INVENTORS.
D. BLAISDELL AND
T. J. JUDGE
BY Forest H. Hitchcock
THEIR ATTORNEY

INVENTORS.
D. BLAISDELL AND
T. J. JUDGE
BY Forest B. Hitchcock
THEIR ATTORNEY

INVENTORS.
D. BLAISDELL AND
T. J. JUDGE
BY Forest B. Hitchcock
THEIR ATTORNEY

INVENTORS.
D. BLAISDELL AND
T. J. JUDGE
BY
Forest B. Hitchcock
THEIR ATTORNEY

United States Patent Office 3,105,951
Patented Oct. 1, 1963

3,105,951
DISPATCHING SYSTEM

Donald Blaisdell and Thomas J. Judge, Rochester, N.Y., assignors to General Signal Corporation, a corporation of New York Filed June 13, 1960, Ser. No. 35,652
27 Claims. (Cl. 340—23)

This invention relates to a dispatching system, and more particularly pertains to such a dispatching system wherein a plurality of indicating means are provided to facilitate the supervision of movable units of apparatus from assigned locations to designated locations or the converse thereof within the jurisdictional boundaries of a central control office in accordance with known information.

In various areas wherein a number of movable units each normally assigned to a given location and having an operator therefor may be moved to designated locations when the respective operators receive instructions via radio communication or the like, it is normally considered desirable to employ some form of a dispatching system in the central control office to inform the responsible persons thereat of the general location of each of the movable units coming within the jurisdictional boundaries of the central control office. Several forms of dispatching systems are in general use which are somewhat effective to provide information in accordance with the general whereabouts of the movable units for the responsible persons.

One such dispatching system employs a board having a number of pegs or clips located thereon which is located in the central control office. Such board is normally employed when a dispatcher thereat dispatches a given movable unit to a designated location by transmitting suitable information to the operator therefor. In order to provide a readily viewable record of the whereabouts of such movable unit, the dispatcher would normally write the designation of such movable unit on a piece of paper and then place it on one of the pegs or clips located on such board. In this manner, the dispatcher and other responsible persons would know which of the movable units are located at their assigned locations and which are not.

A more advanced dispatching system which is effective to provide similar information to that provided by the dispatching system described above includes a lamp for each movable unit under the control of the dispatcher in the central control office. With this system, the dispatcher would cause the lamps corresponding to those units instructed to go to designated locations to be illuminated. In this manner, the illumination or nonillumination of the respective lamps is effective to tell which of the movable units are at their assigned locations and which are not.

In some of the various areas indicated above, it is desirable in some instances to provide comparable movable units at the stations wherefrom the assigned movable units have been dispatched to a designated location in order that such stations would have similar movable units to the normally assigned movable units available for dispatching in the absence of the normally assigned movable units. One area, for example, in which this fill-in feature would be desirable is fire control systems.

In accordance with the above, the present invention proposes to provide a dispatching system wherein the dispatcher can control the illumination of each lamp of a plurality of groups of lamps located on each of two maps according to the physical location of the respective stations to which the movable units are normally assigned for providing indications representative of the presence of each movable unit at its assigned station, the absence therefrom and the returning of such movable unit from the designated location to its assigned station. In addition, it is proposed that a corresponding plurality of groups of lamps be physically associated with the above plurality of groups of lamps for providing indications representative of the presence of a comparable movable unit at a given station in the absence of the normally assigned movable unit in accordance with individual control thereof by the dispatcher. Moreover, the dispatcher can cause a given group of changeable display indicators located in a changeable display indicator console to be operated to positions for displaying designations representative of the designations for a station and movable units which are filling in at such station for other similar movable units during a certain time. As an alternate, the present invention proposes that the changeable display indicators may be located on one of the maps in groups in lieu of the plurality of groups of lamps for indicating that another movable unit is filling in at a given station for the normally assigned movable unit. The physical location of the station indicated on such map is then indicative of the station at which a movable unit is being used as a fill in.

Thus, one object of the present invention is the provision of a dispatcher's control board having three separate panels included therewith each representing a general location of a plurality of movable units.

Another object of the present invention is the provision of an identifying token means for each of the plurality of movable units, all of said means being normally located on one of the panels and adapted to be independently moved in a predetermined manner to the other panels in accordance with the general location of the respective movable units.

Another object of the present invention is the provision of another panel included with the dispatcher's control board for locating thereon a plurality of station identifying token means representative of the several stations to which movable units are assigned.

Another object of the present invention is to provide another panel with the dispatcher's control board which has a plurality of positions, each such position being provided for receiving thereat a station identifying token means and one or more of the movable unit identifying token means for indicating the movable units filling in at a given station.

Another object of the present invention is the provision of a plurality of maps, each representative of a similar area for showing the respective locations of each of a plurality of stations with similar indicating means being located thereon for each movable unit assigned to the respective stations for providing several distinctive indications in accordance with the whereabouts of the movable units.

Another object of the present invention is the provision of other similar indicating means being located on each of the plurality of maps in association with the indicating means at the several stations for the assigned movable units, each representative of a comparable movable unit which may be dispatched to a given station from another station to fill in for the assigned movable unit thereat which has been dispatched to a designated location for providing distinctive indications of such fill in.

Another object of the present invention is the provision of a changeable display indicator console in association with one of such plurality of maps which is adapted to display in groups of changeable display indicators a designation representative of a station and one or more designations representative of one or more movable units in a position corresponding to the position of the station and movable units identifying token means located on the fill-in panel and in accordance therewith.

Another object of the present invention is the provision of a plurality of maps, one such map having similar indicating means located thereon in association with each assigned movable unit indicating means for providing distinctive indications which are indicative of the presence or absence of a comparable movable unit for filling in for the movable unit normally assigned thereat which has been dispatched to a designated location, and the other map having a plurality of changeable display indicators located thereon in association with each assigned movable unit indicating means for providing the display of the designations representative of the comparable movable units which may be employed to fill in for the movable unit normally assigned thereto.

Another object of the present invention is the provision of manually operable means with the fill-in panel which when designated is adapted to cause the changeable display indicators previously positioned to display designations representative of a given station and one or more movable units corresponding to the identifying token means located on the fill-in panel to be operated to blank positions in accordance with the removal of such identifying token means from the fill-in panel.

Other objects, purposes and characteristic features of the present invention will be in part obvious from the accompanying drawings, and in part pointed out as the description of the invention progresses.

In describing the invention in detail, reference will be made to the accompanying drawings, in which like reference characters designate corresponding parts throughout the several views, and in which:

FIG. 3 shows a code chart having a number of mark-space buses which are caused to be energized in a definite manner in accordance with the station or movable unit identifying token means which are moved to the fill-in panel;

FIG. 4 shows a code chart having a number of codes to which are assigned letters and digits which are employed to operate the changeable display indicators to characteristic positions for displaying either digits or letters in accordance with that which is inscribed on the display tapes of the indicators;

FIGS. 5A to 5H show code charts for the mark-space buses with each of the codes having the number of a movable unit assigned thereto which may be employed with an expanded version of the present invention;

For the purpose of simplifying the illustration and facilitating in the explanation, the various parts and circuits constituting the embodiment of the invention have been shown diagrammatically and certain conventional illustrations have been employed, and the drawings have been made more with the purpose of making it easy to understand the principles and mode of operation rather than with the idea of illustrating the specific construction and arrangement of parts that would be employed in practice. Thus, the various relays and their contacts are illustrated in a conventional manner, and symbols are used to indicate connections to the terminals of batteries, or other sources of electric current, instead of showing all of the wiring connections to these terminals.

The symbols (+) and (−) are employed to indicate the positive and negative terminals respectively of suitable batteries or other sources of direct current; and the circuit with which these symbols are used always have current flowing in the same direction. The symbols (B+) and (B−) indicate connections to the opposite terminals of a suitable battery, or other direct current source which has a central or intermediate tap designated (CN); and the circuits with which these symbols are used may have current flowing in one direction or the other depending upon the particular terminal used in combination with the intermediate tap (CN).

It has been stated above that the present invention is applicable in some of the various areas wherein it is desirable to provide comparable movable units as fill ins for normally assigned movable units at given stations when such assigned movable units are sent to designated locations. An example of such an area has been specifically stated above as fire control systems. With such systems, fire protection of the general nature described above may be afforded to a large city, metropolitan area, county or the like depending, of course, on the density of population, the distance between the communities in a given area or the like. In such areas, it is considered desirable to have normally assigned fire apparatus units or the equivalent thereof located at a given fire station since fires may occur practically simultaneously in the area protected by such fire station, thereby requiring equivalent fire apparatus units at each such fire. Under these conditions, the present invention can be appropriately described in connection with a fire control system. It should be understood, however, that the present invention can be employed as a dispatching system to facilitate in the dispatching of other types of movable units such as police cars, ambulances, taxicabs, buses and the like.

*General Organization*

Figure 1:
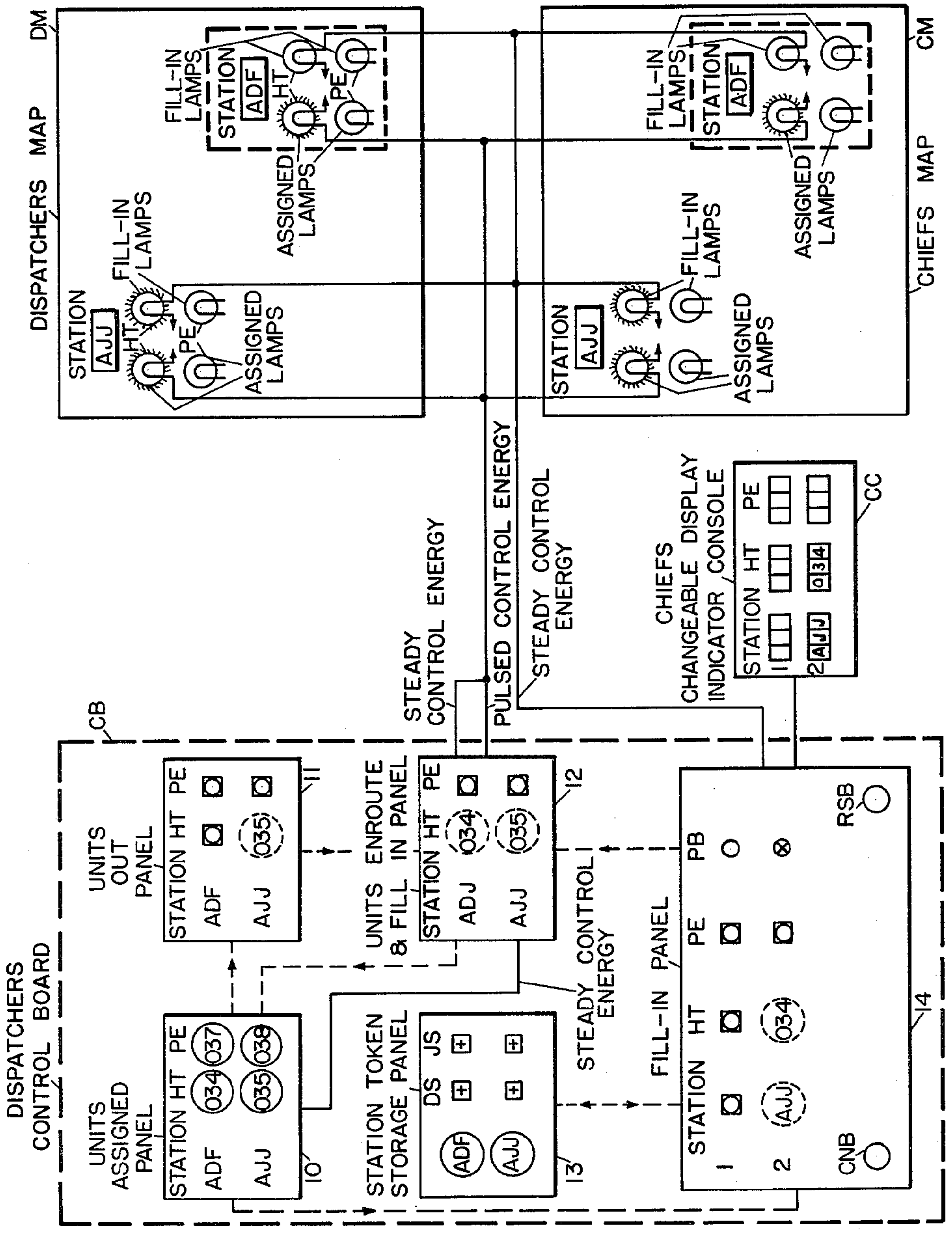
FIG. 1 is a block diagram showing the various panels on the dispatcher's control board, two maps each indicative of a similar given area having a plurality of lamps located thereon for the several stations in the area and a changeable display indicator console with all of such elements shown to be connected in a prescribed manner.

With reference to FIG. 1, the general organization of the elements included with the present invention and the respective functions thereof may now be described in connection with a fire control system. Referring to FIG. 1, it is seen that, generally speaking, a fire control system includes a dispatcher's control board CB, a dispatcher's map DM, a fire chief's map CM and a fire chief's changeable display indicator console CC. The dispatcher's control board CB is shown to include several panels between which are independently moved and located on the panels a plurality of station and fire apparatus unit identifying token means in accordance with the location of the fire apparatus units identified by the identifying token means. The movement of such identifying token means in a prescribed manner is then adapted to cause the illumination of various lamps disposed on the dispatcher's map DM and the chief's map CM representative of fire apparatus units which are located on such maps in locations representative of the fire stations to which the fire apparatus units are normally assigned. Such movement of the plurality of identifying token means is also adapted to cause the simultaneous operation of selected groups of changeable display indicators located on the first chief's changeable display indicator console CC to positions for displaying a designation representative of a fire station and the designations representative of fire apparatus units which are filling in at such station.

More particularly, the dispatcher's control board CB includes a units assigned panel 10, a units out panel 11, a units enroute and fill-in panel 12, a station token storage panel 13 and a fill-in panel 14. The units assigned panel 10 is employed to provide storage for each of the identifying token means representative of a given fire apparatus unit which is normally assigned to a given fire station. The panel 10 is shown to have the identifying token means for a hose truck HT and a pump engine PE at each of two stations ADF and AJJ. The designations for the stations ADF and AJJ would be normally applied to the panel 10 at designated locations in a suitable manner. The units out panel 11 has located thereon token receiving means for a hose truck HT and a pump engine PE for the stations ADF and AJJ corresponding to that shown for panel 10. The panel 11 is normally employed to receive the identifying token means for those fire apparatus units which have been sent to a designated location and are thus absent from their assigned stations. The panel 12 has located thereon token receiving means for a hose truck HT and a pump engine PE for each of the stations ADF and AJJ corresponding to those located on the panel 11. Such token receiving means are normally employed when the fire apparatus units corresponding to their identifying token means located on panel 11 are going from their designated locations to their respectively assigned stations. The location of an identifying token means on panel 12 is thus indicative of the fire apparatus unit represented by such identifying token means which is enroute from a designated location to its normally assigned station. The station token storage panel 13 is provided to store each of the plurality of identifying token means for each of several stations which form a part of the complete system. The fill-in panel 14 has a plurality of fill-in positions each of which includes a token receiving means for receiving a given identifying token means indicative of a given fire station, token receiving means for receiving an identifying token means indicative of a hose truck HT normally assigned to a given station, token receiving means for receiving an identifying token means indicative of a pump engine PE normally assigned to a given station and a push button PB which is effective when one or more of such identifying token means is inserted in its respective token receiving means to cause corresponding lamps on the dispatcher's map DM and the chief's map CM to be illuminated and corresponding changeable display indicators located on the chief's console CC to be operated to positions for displaying designations corresponding to the designations of such inserted identifying token means.

The dispatcher's map DM and the chief's map CM each have a plurality of lamps at each of several similar stations located thereon. Such stations correspond to the stations shown on the various panels of the dispatcher's control board CB which, in this case, are stations ADF and AJJ. Each of such stations would normally be located on each of the maps according to its physical location in the area identified by each of the maps. The hose truck HT normally assigned to each of the fire stations ADF and AJJ has one lamp on each of the maps DM and CM which is adapted to provide distinctive indications as to the general location of the hose truck HT and another lamp for providing distinctive indications as to whether or not a hose truck HT from another fire station is filling in for the normally assigned hose truck HT at that station. Likewise, similar lamps are provided for the pump engine PE at each of the stations ADF and AJJ on both maps for providing similar indications indicative of the general location of the normally assigned pump engine PE and the location of a pump engine PE employed as a fill in.

The fire chief's changeable display indicator console CC has a plurality of positions corresponding to the plurality of positions shown on the fill-in panel 14 included with the dispatcher's control board CB. Each such position includes three groups of changeable display indicators with each such group including three changeable display indicators for respectively displaying the designations representative of a fire station, a hose truck HT and a pump engine PE in accordance with their identifying token means being located on the fill-in panel 14 in one of the plurality of positions. The removal of such identifying token means from the fill-in panel 14 for any one position thereon or all of such positions thereon is adapted to cause the initiation of suitable circuit means in response to the designation of a reset button RSB located on the fill-in panel 14 to cause the groups of changeable display indicators corresponding to the positions of those identifying token means removed from the panel 14 to be operated to blank positions. A cancel button CNB located on the panel 14 may be depressed at desirable times to insure that such suitable circuit means are conditioned to normal positions from energized positions which resulted from actuation of corresponding push buttons PB.

The apparatus described above is effective to provide two sets of means for indicating the general whereabouts of assigned fire apparatus units and the general whereabouts of fire apparatus units employed as fill-in units at designated fire stations. The manner in which the identifying token means are located on the various panels of the dispatcher's control board CB and the response of the lamps located on the dispatcher's map DM to such location of the identifying token means on the various panels are effective to provide the above stated indications, while the various lamps located on the chief's map CM and the changeable display indicators located on the chief's console CC are effective to provide similar indications to those provided by the dispatcher's control board CB and map DM. It should be noted here that the fire chief's map CM and the fire chief's console CC would normally be located remotely from the dispatcher's control board CB and map DM. Such remote location results from the location of such apparatus in different rooms included in the same building, in separate buildings or the like.

The type of token receiving means and identifying token means employed in the present invention is shown and fully described in the Patent 3,046,364, entitled "Token Operated Electrical Switches," and filed on September 28, 1959, by I. A. De Kramer and R. A. Hagen, now Patent No. 3,046,364, dated July 24, 1962. Generally speaking, the token receiving means referred to above includes a housing having therein ten microswitch contactors which are normally in one position and which are effective to cause a certain contact relationship for each of the contacts associated respectively with the ten microswitch contactors. The identifying token means referred to above includes a control knob having a shaft connected thereto on which are ten cam bushings arranged fixedly in a predetermined manner. The identifying token means is normally inserted into such token receiving means and is turned clockwise 90° for effectively causing the cam bushings to actuate the ten microswitch contactors in a predetermined manner for thus establishing certain contact relationships for each of the ten microswitch contactors. The opposite side of the control knob is adapted to receive a piece of paper, plastic or the like on which is written or inscribed the designation of a station or a fire apparatus unit, as the case may be. The ten cam bushings connected to the shaft of each identifying token means in a prescribed manner are effective to cause corresponding microswitch contactors which are included with all of the token receiving means in which a given identifying token means may be inserted to be affected. This will be more apparent as the description progresses.

The type of changeable display indicator employed in the present invention is shown and fully described in the patent application Ser. No. 763,569, entitled "Data Posting Indicators," and filed on September 26, 1958, by W. D. Maynard. In such application, two changeable display indicators of a similar nature are shown and described. The construction of each such indicator is generally the same, but one of such indicators is constructed in a manner to have 36 characteristic positions while the other indicator is constructed in a manner to have 12 characteristic positions. The changeable display indicator having 36 characteristic positions employs an eight bus wire lead-in system of which four are required to be energized for each of the 36 characteristic positions while four are left deenergized. In a similar manner, the changeable display indicator having 12 characteristic positions employs a six bus wire lead-in system of which three must be energized for each of the 12 characteristic positions while the remaining three are left deenergized. A number of the changeable display indicators having 12 characteristic positions has been chosen to be employed in the present invention for displaying letters, digits and other suitable characters which are suitably inscribed on the tape elements thereof, but this should not be construed to mean that the changeable display indicator having 36 characteristic positions could not be employed in a similar version of the present invention.

The sequence in which the lamps located on the dispatcher's map DM and the chief's map CM and the changeable display indicators located in the chief's console CC are caused to be operated when certain of the identifying token means representative of given fire apparatus units and identifying token means for a given station are moved in a prescribed manner may be described with reference to the dotted lines shown in FIG. 1. In this connection, it is necessary to make several assumptions which are indirectly shown in FIG. 1 by the identifying token means for the hose truck HT having the numbers 034 and 035 and the identifying token means for the station AJJ which are shown dotted on the respective panels 11, 12 and 14. To be more specific, however, it is assumed that the hose truck HT represented by the identifying token means 035 is instructed to go to a given designated location. It is also assumed that the hose truck HT represented by identifying token means 035 is after a given period of time returning from its designated location. During the time that the hose truck HT represented by the identifying token means 035 is away from its assigned station AJJ, it is assumed that the hose truck HT represented by identifying token means 034 is sent to station AJJ to fill in for the normally assigned hose truck HT thereat.

The identifying token means 035 would be moved from the panel 10 to the panel 11 and inserted in a corresponding token receiving means thereat when the dispatcher instructs such hose truck HT to go to its designated location. When the identifying token means 035 is removed from the panel 10, the corresponding assigned lamps for the hose truck HT located on the maps DM and CM at the station AJJ are caused to be illuminated. Knowing that it is desirable to provide a fill in for such hose truck HT at station AJJ, the dispatcher moves the identifying token means for the station AJJ from the storage panel 13 to the fill-in panel 14 and inserts it in the token receiving means corresponding to the station in the position No. 2. The identifying token means 034 for the hose truck HT normally assigned to the station ADF is moved from the panel 10 to the fill-in panel 14 and is inserted in the token receiving means corresponding to the hose truck HT in the position No. 2. The push button for the position No. 2 is then depressed by the dispatcher which is effective to cause the fill-in lamps associated with the hose truck HT at the station AJJ on both maps DM and CM to be illuminated. In addition, the two groups of three indicators each corresponding to the station and hose truck for the position No. 2 on the chief's console CC are caused to be operated in succession for displaying the station designation AJJ and the hose truck designation 034 with the three indicators of each such group being initiated into operation simultaneously. When the identifying token means 034 representative of the hose truck HT assigned to the station ADF was removed from the panel 10, the assigned lamps located on the maps DM and CM for the station ADF were effectively illuminated. When the dispatcher learns that the hose truck HT represented by the identifying token means 035 has left its designated location and is returning from such location, he moves the identifying token means 035 from the panel 11 to the panel 12. The insertion of identifying token means 035 into the token receiving means corresponding to the hose truck HT for station AJJ located on panel 12 causes the assigned lamp for the hose truck HT on both maps DM and CM at the station AJJ to be operated in a flashing manner. Such lamps are thus operated until the dispatcher learns that the hose truck HT represented by the identifying token means 035 has returned to its station AJJ and he subsequently moves the identifying token means 035 from the panel 12 to the panel 10. The hose truck HT represented by identifying token means 034 is then instructed to return to its assigned station ADF. The dispatcher then removes the identifying token means for the station AJJ and the identifying token means 034 for the hose truck HT normally assigned to station ADF and inserts them in appropriate token receiving means on the panels 13 and 12 respectively. The insertion of the identifying token means 034 in the token receiving means corresponding to the hose truck HT on the panel 12 is effective to cause the assigned lamps for the hose truck HT on the maps DM and CM at the station ADF to be operated in a flashing manner. The fill-in lamps previously illuminated and the changeable display indicators previously positioned are caused to be deenergized and positioned to blank respectively following the operation of the reset button RSB on the panel 14 by the dispatcher. When the dispatcher learns that the hose truck HT represented by identifying token means 034 has returned to its assigned station ADF, he removes the identifying token means 034 from panel 12 and inserts it in the appropriate token receiving means for the hose truck HT located on panel 10. The assigned lamps which were flashing for the hose trucks HT represented by the identifying token means 034 and 035 are thus deenergized.

The assigned lamps as well as the fill-in lamps located on the maps DM and CM are thus caused to be operated in the manner described above in accordance with the movement of certain identifying token means between the various panels. In addition, the changeable display indicators located on the chief's console CC are caused to be operated in the general sequence indicated above in accordance with certain of the station and movable unit identifying token means being located on the fill-in panel 14. The detailed circuits with which the various token receiving means located on the several panels are associated as well as the assigned lamps, the fill-in lamps and the changeable display indicators indicated on the maps DM and CM and the chief's console CC are illustrated by the detailed circuit organization shown in FIGS. 2A to 2H and 2J to 2N. Before considering typical operations in connection with such detailed circuit organization, it is believed expedient to first consider such organization in connection with the various elements employed therein.

*Detailed Circuit Organization*

Referring to FIGS. 2A to 2H and 2J to 2N, it is seen that all of the detailed circuits included therein comprise an organization which is consistent with the general organization of the various elements shown in FIG. 1 which comprise the present invention. Generally speaking, token receiving means are shown in detailed form for the panels 10 and 12 for the hose truck HT and pump engine PE which are associated with the stations ADF and AJJ. The identifying token means for the hose trucks HT identified by numbers 034 and 035 and the identifying token means for the pump engines PE identified by numbers 037 and 038 are shown to be associated with their respective token receiving means which correspond to the panel 10. The token receiving means for the stations ADF and AJJ which are associated with the panel 13 are included and have the identifying token means for the stations ADF and AJJ associated therewtih. Token receiving means for a station, a hose truck HT and a pump engine PE are included for each of the two positions shown on the fill-in panel 14. The assigned lamps, fill-in lamps and changeable display indicators are then connected to suitable controlling energy sources by means of the token receiving means in association with the identifying token means for a given station and one or more units of apparatus while other detailed circuits are illustrated in a manner to control the operation of the assigned lamps, fill-in lamps and changeable display indicators in accordance with the location of the various identifying token means.

Figure 2A:
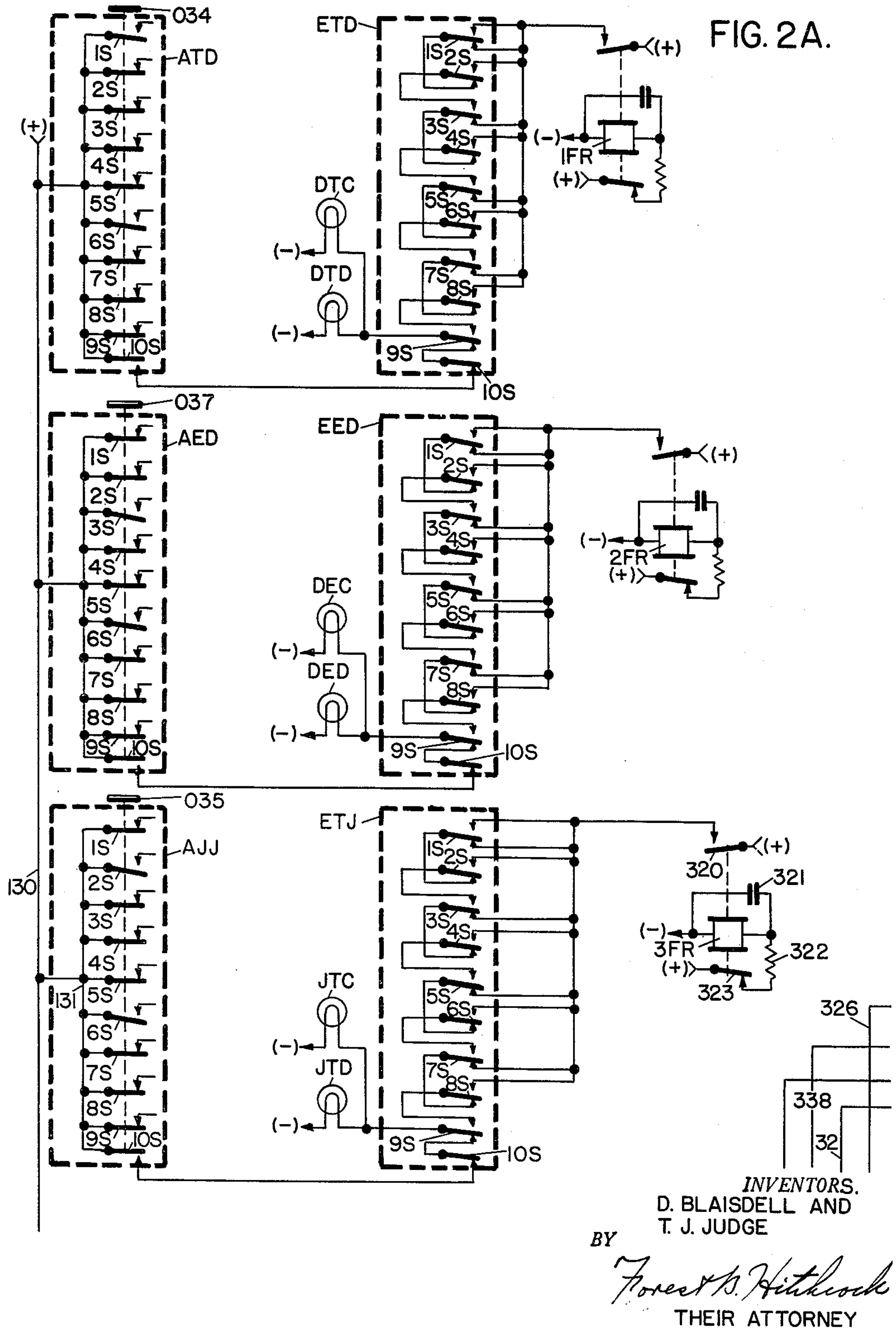
FIGS. 2A to 2H and 2J to 2N illustrate the circuitry provided for causing the plurality of lamps and the changeable display indicators to be operated in accordance with the moving of station and movable unit identifying token means between the various panels.
Figure 2B:
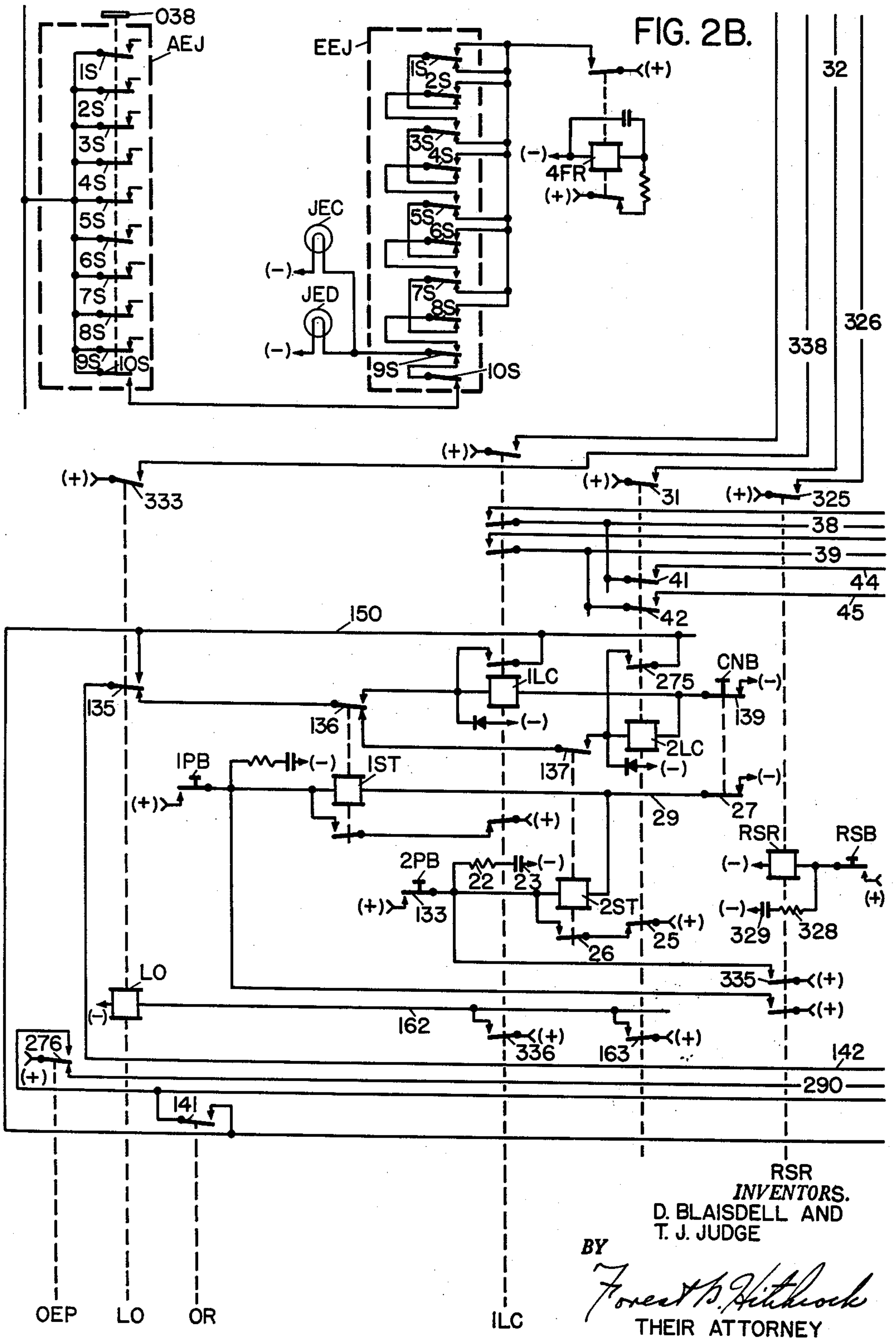

More specifically, referring to FIGS. 2A and 2B, the token receiving means employed with station ADF are designated ATD and AED while the token receiving means employed with station AJJ are designated ATJ and AEJ. The token receiving means ATD and ATJ correspond to the hose trucks HT on panel 10 while the token receiving means AED and AEJ correspond to the pump engines PE on panel 10. Each of these token receiving means is seen to have its corresponding identifying token means associated therewith which is indicative of the hose truck HT or pump engine PE to be located at its assigned station. Such identifying token means are identified by the hose truck HT or pump engine PE to which they correspond. They are thus identified by the numbers 034, 037, 035 and 038. It will be noted that the ten microswitch contactors associated with each of the token receiving means are actuated in a predetermined manner corresponding to the arrangement of the ten cam bushings connected to the shaft of the identifying token means. Although the front contacts of the first nine microswitch contactors are shown to be open while a back contact of the tenth microswitch contactor is shown to be connected to a back contact of an associated token receiving means, this does not necessarily mean that the first nine microswitch contactors and their front contacts need to be included with the token receiving means ATD, AED, ATJ and AEJ. These microswitch contactors and their front contacts have been shown in each case in order to show the manner in which the ten cam bushings associated with the identifying token means 034, 037, 035 and 038 are effective to actuate the microswitch contactors in predetermined code combinations. It should be noted here that the manner in which the ten cam bushings are connected to the shaft of an identifying token means is effective to cause the microswitch contactors employed with each of the various token receiving means in which such identifying token means may be placed to be actuated in a manner consistent with the arrangement of the cam bushings.

Similar token receiving means are shown for the hose truck HT and the pump engine PE for the stations ADF and AJJ which would normally be located on the panel 12. These token receiving means are identified by the designations ETD, EED, ETJ and EEJ. Each of these token receiving means has its ten microswitch contactors associated therewith connected in a predetermined manner for providing electrical circuits from an energy source to two associated lamps which correspond to the assigned lamps located on the maps DM and CM. The manner in which such two lamps for each of the token receiving means ETD, EED, ETJ and EEJ are caused to be illuminated is dependent upon the absence of an identifying token means from an associated token receiving means located on panel 10 or the presence of an identifying token means inserted into the token receiving means located on panel 12 corresponding to two of such lamps. In the absence of an identifying token means from one of the token receiving means on panel 10, the two lamps associated with the corresponding token receiving means located on panel 12 are caused to be illuminated steadily, while the presence of an identifying token means inserted into the token receiving means located on panel 12 causes such two lights to be operated in a flashing manner. It will be noted that the two lamps associated with each of the token receiving means ETD, EED, ETJ and EEJ are normally disconnected from a positive (+) potential, but are normally connected to a negative (−) potential. The absence of an identifying token means from a token receiving means located on panel 10 is effective to establish an energizing circuit for the two lamps associated with the corresponding token receiving means located on panel 12 through the back contact of the tenth microswitch contactor for the token receiving means located on panel 10 and through the back contacts of the ninth and tenth microswitch contactors included with the corresponding token receiving means located on panel 12. Each of the token receiving means on panel 12 has associated therewith a single winding relay which is caused to be energized through a back contact of such relay while at the same time charging an associated capacitor which is effective when discharging to maintain such relay energized for a period of time consistent with the size of such capacitor. A positive (+) potential is then supplied through a front contact of such relay and through the front and back contacts of the microswitch contactors included with the associated token receiving means located on panel 12 to effectively cause the two associated lamps to be operated in a flashing manner. For example, the two lamps JTC and JTD associated with token receiving means ETJ are normally deenergized. Should the identifying token means 035 be removed from the token receiving means AJJ, a positive (+) potential is supplied through the back contact of microswitch contactor 10S and through the back contacts of microswitch contactors 10S and 9S included with token receiving means ETJ for effectively illuminating the lamps JTC and JTD. Should the identifying token means 035 or any other identifying token means which may be employed be inserted into token receiving means ETJ, a positive (+) potential would be supplied through the front and back contacts of the microswitch contactors 1S to 9S in a manner determined by the identifying token means inserted therein in accordance with the energization of relay 3FR. The lamps DTC and DTD associated with token receiving means ETD, lamps DEC and DED associated with token receiving means EED and lamps JEC and JED associated with token receiving means EEJ are similarly caused to be illuminated steadily by the removal of identifying token means from the respective token receiving means ATD, AED and AEJ. Moreover, they are caused to be illuminated in a flashing manner in accordance with the insertion of an identifying token means into the token receiving means ETD, EED and EEJ and the operation of the relays 1FR, 2FR and 4FR associated with the token receiving means ETD, EED and EEJ.

Figure 2C:
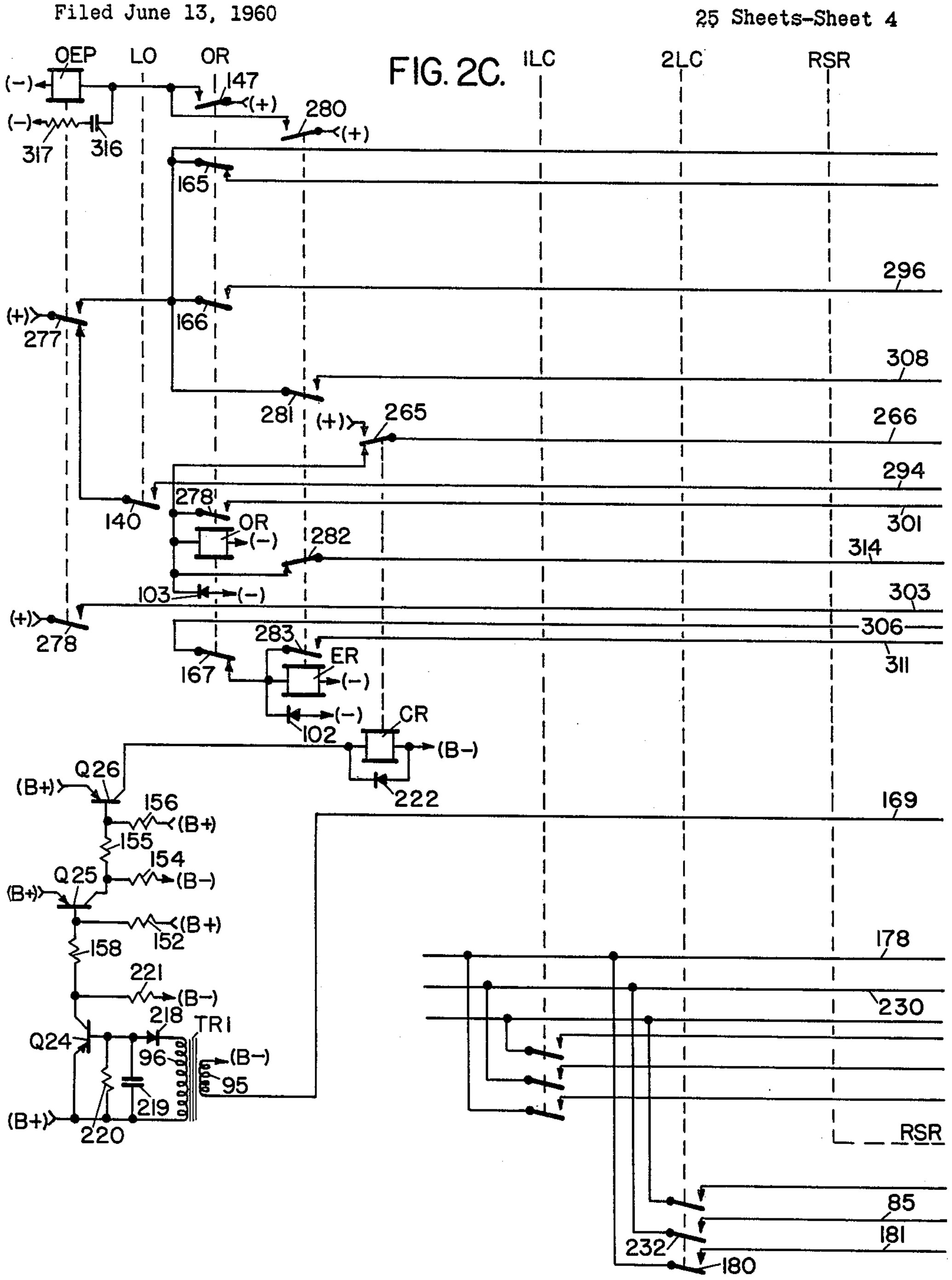

The fill-in lamps located on the maps DM and CM as well as the changeable display indicators located in the chief's console CC are caused to be illuminated and operated respectively when identifying token means are inserted into the token receiving means included with the fill-in panel 14 in a given position with the push button PB corresponding thereto being subsequently depressed. The identifying token means for the stations are normally stored on the panel 13 and are moved to the panel 14 when a fill-in operation is desired. The token receiving means for the stations ADF and AJJ located on panel 13 are shown in FIG. 2G and are designated DS and JS. The identifying token means ADF and AJJ are shown to be inserted into the respective token receiving means DS and JS. Again, the ten microswitch contactors 1S to 10S which are normally employed with a token receiving means are shown with the first nine of such microswitch contactors being shown only for the purpose of illustrating the manner in which the cam bushings associated with each of the identifying token means ADF and AJJ would normally operate such contactors. The tenth microswitch contactor 10S of each of the token receiving means DS and JS is connected in a circuit for deenergizing associated fill-in lamps located on the maps DM and CM which will be explained in more detail hereinafter.

Figure 2D:
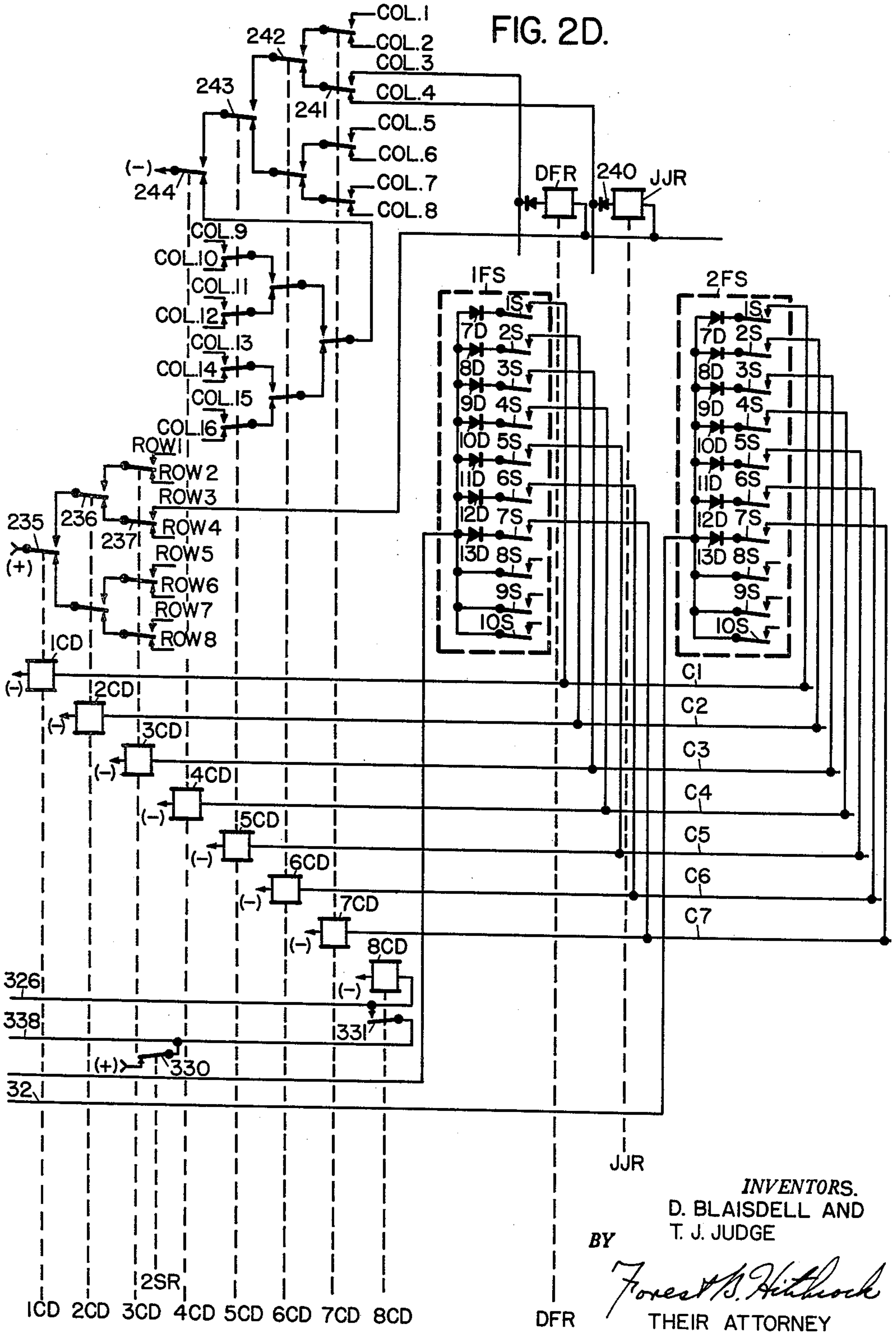
Figure 2E:
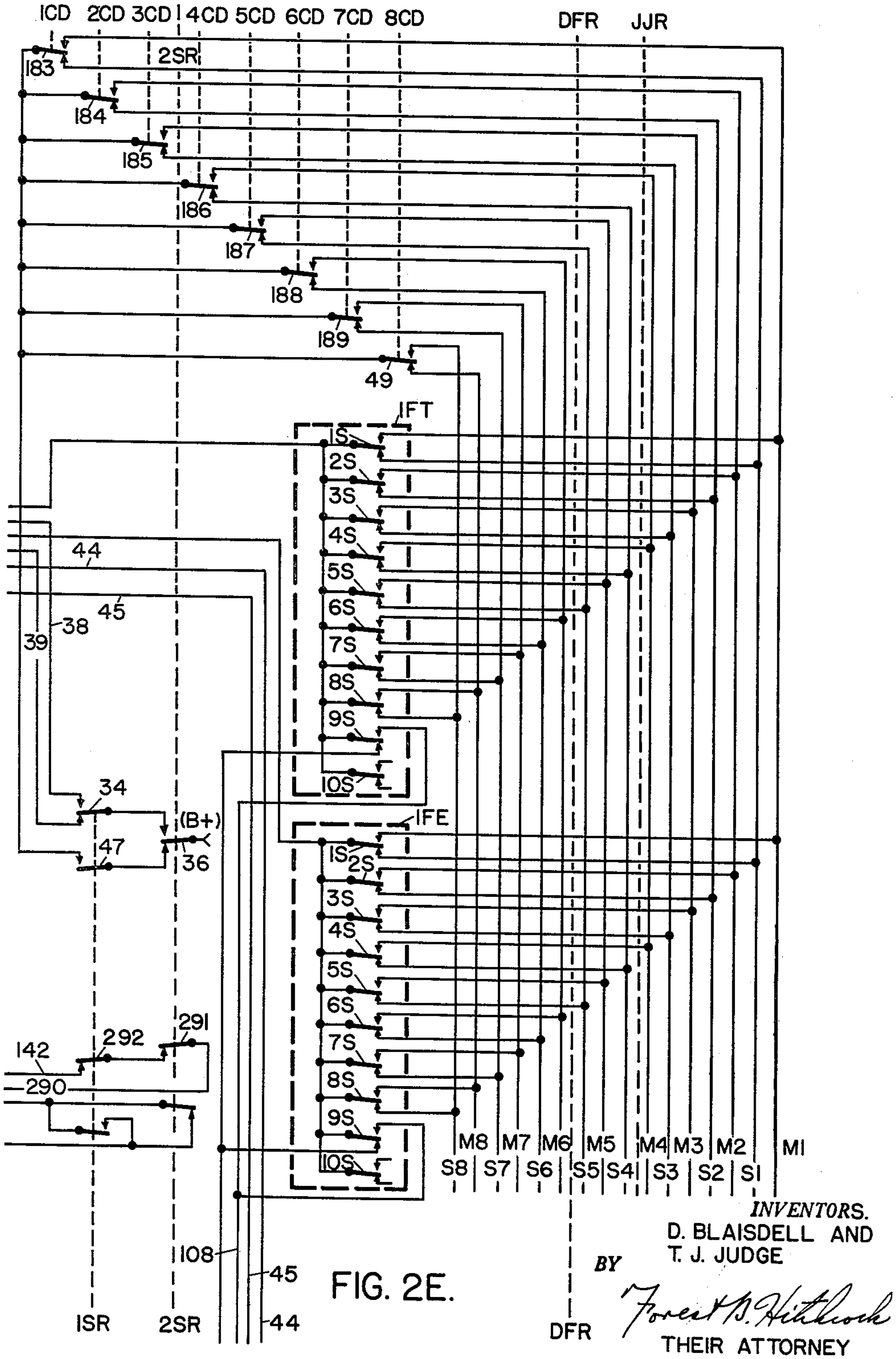
Figure 2F:
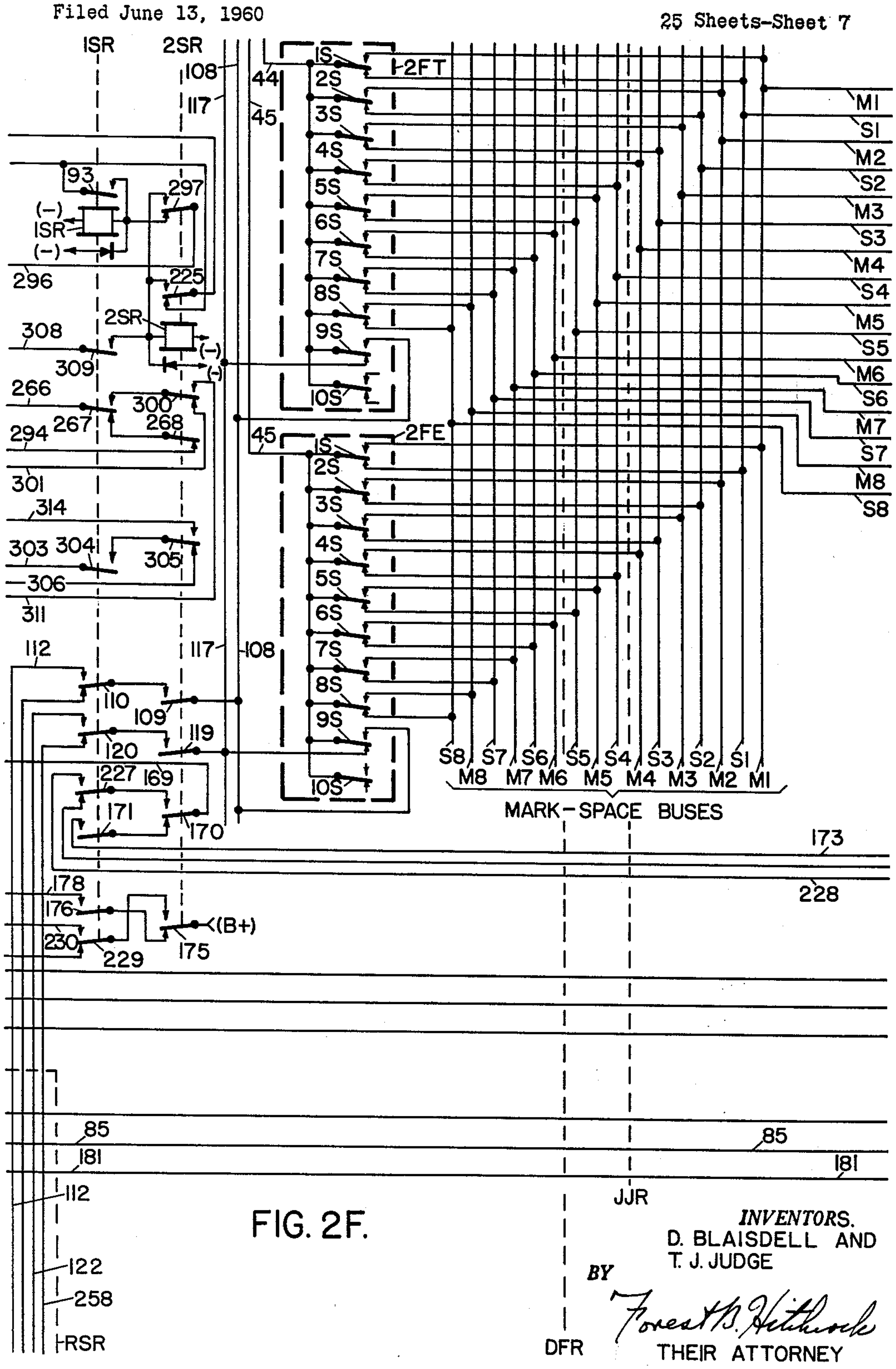
Figures 2G, 11:
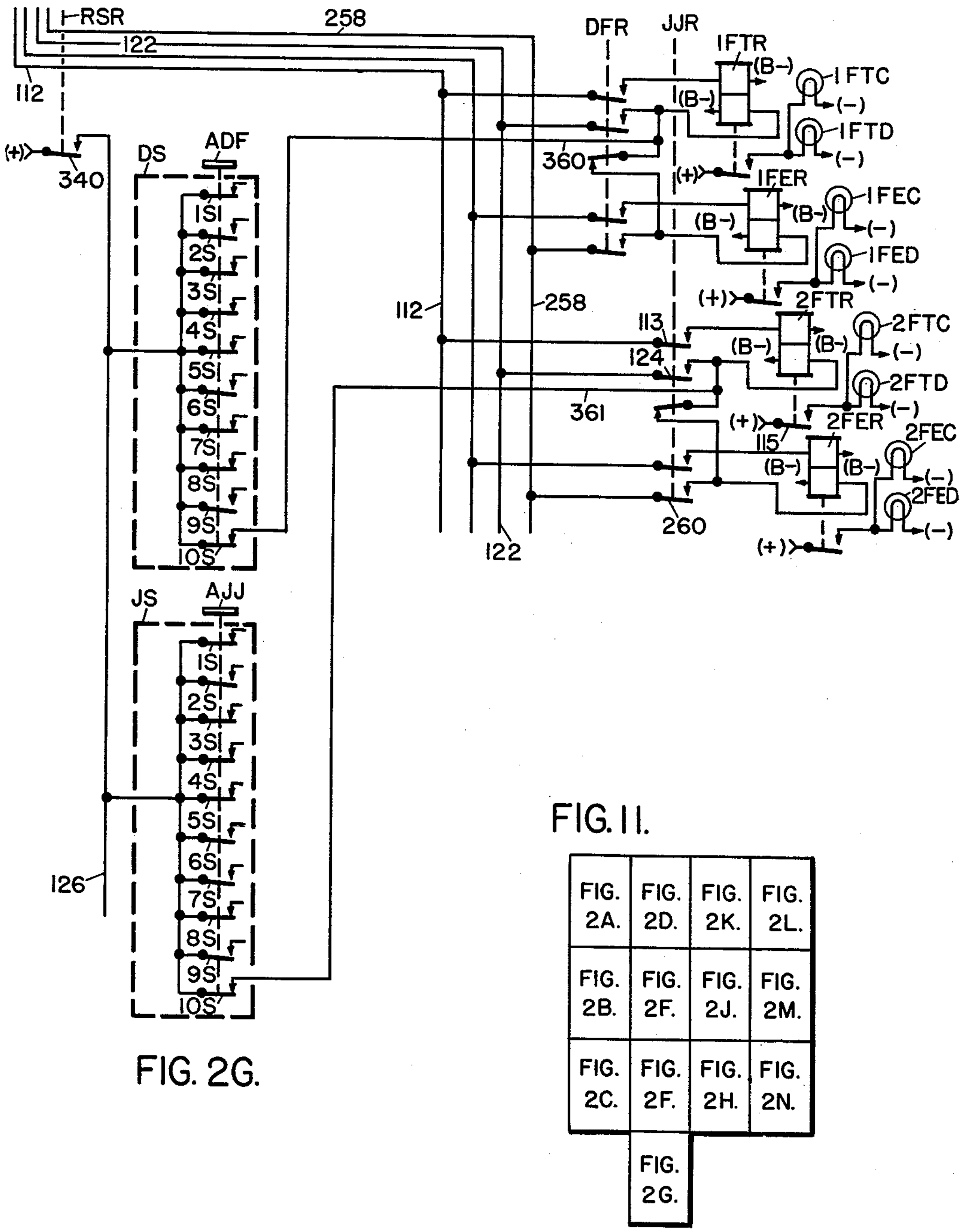

The token receiving means located on the fill-in panel 14 for the two positions shown thereon which correspond to a station, a hose truck HT and a pump engine PE are shown in FIGS. 2D, 2E and 2F. The microswitch contactors included with each of such token receiving means are shown to be connected to detailed circuits which are effective in accordance with the presence of identifying token means inserted in certain of such token receiving means for causing the illumination of corresponding fill-in lights located on the maps DM and CM and the operation of corresponding changeable display indicators located on the chief's console CC when the push button PB corresponding to the position having identifying token means inserted in token receiving means is depressed. The positions of illumination and designation display of the fill-in lamps and changeable display indicators may be changed to normal positions of deenergization and blank respectively when identifying token means are removed from the token receiving means located in corresponding positions on the fill-in panel 14 and the reset button RSB is depressed. In addition, the detailed circuits responsive to the actuation of the push button PB for the positions 1 and 2 shown on the panel 14 may be conditioned to their normal positions by the actuation of cancel button CNB located on panel 14.

More particularly, the token receiving means located on the fill-in panel 14 for the two positions shown thereon which correspond to the stations are shown in FIG. 2D in detailed form and are designated 1FS and 2FS. In referring to FIG. 2D, it is seen that each of the token receiving means 1FS and 2FS employs only seven of the ten microswitch contactors 1S to 10S shown as being included therewith. The front contacts of the microswitch contactors 1S to 7S for each of the token receiving means 1FS and 2FS are seen to be connected to a plurality of code buses C1 to C7, while the microswitch contactors 1S to 7S are further connected to a positive (+) potential at times through a front contact of a location code relay LC as shown in FIG. 2B through diodes 7D to 13D. At desirable times when an identifying token means is inserted into either token receiving means 1FS or 2FS and the corresponding location code relay LC is caused to be energized, the positive (+) potential is supplied through the front contacts of the respective microswitch contactors 1S to 7S in a combination in accordance with the identifying token means inserted therein for energizing a group of code determining relays 1CD to 7CD in a combination corresponding to the actuated positions of the microswitch contactors 1S to 7S. The diodes 7D to 13D included with each of the token receiving means 1FS and 2FS are provided for preventing erroneous energization of the relays 1CD to 7CD through front contacts of the microswitch contactors 1S to 7S for token means 1FS and 2FS as will be explained in more detail hereinafter. It will be noted in FIG. 2D that each of the code determining relays 1CD to 7CD is a single winding relay which is individually energized in accordance with a positive (+) potential being applied to the corresponding code buses C1 to C7. Each of such relays is shown to be normally connected to a negative (−) potential. The energization of such code determining relays 1CD to 7CD is effective to cause the energization of a station relay corresponding to the station which the identifying token means inserted into the unit receiving means 1FS or 2FS is indicative of. The fill-in lights located on the maps DM and CM are thus caused to be illuminated in accordance with the energization of the proper station relay and other detailed circuits which will be presently explained. In accordance with the presentation of the present invention, a station relay DFR is included which corresponds to the station ADF and a station relay JJR is included which corresponds to the station AJJ. Moreover, another code determining relay 8CD is included with relays 1CD to 7CD in FIG. 2D, but it is caused to operate in a different manner than that described for relays 1CD to 7CD for operating the groups of changeable display indicators corresponding to stations which will be explained more fully hereinafter.

Referring to FIGS. 2E and 2F, it is seen that each of the code determining relays 1CD to 8CD has a front and back contact connected to the mark-space buses M1 to M8 and S1 to S8. Such mark-space buses are then adapted to be energized by a positive (+) potential through front and back contacts of stepping relays 1SR and 2SR when the code determining relays 1CD to 8CD are energized in a given code combination and stepping relay 1SR is caused to be energized. The stepping relays 1SR and 2SR will be explained in more detail hereinafter. It will be noted that the token receiving means for the hose truck HT and the pump engine PE which are normally located on the fill-in panel 14 are shown in detailed form in FIG. 2E and are designated 1FT and 1FE respectively. Referring to FIG. 2E, it is seen that the microswitch contactors 1S to 8S for each of the token receiving means 1FT and 1FE are connected to the mark-space buses M1 to M8 and S1 to S8, while microswitch contactor 9S has its front and back contacts connected to a portion of the detailed circuits presently to be explained for causing the operation of corresponding fill-in lights located on the maps DM and CM in accordance with an identifying token means being inserted into either of the token receiving means 1FT and 1FE and a positive (+) potential being supplied through front contacts of the corresponding location code relay LC. The token receiving means corresponding to the hose truck HT and pump engine PE which are located on the fill-in panel 14 for position No. 2 are shown in detailed form in FIG. 2F. Referring to FIG. 2F, it is seen that such token receiving means designated 2FT and 2FE are similarly connected to the mark-space buses M1 to M8 and S1 to S8 and the detailed circuits presently to be described in the manner described above for token receiving means 1FT and 1FE.

The detailed circuits employed for causing a positive (+) potential to be selectively applied to the token receiving means 1FS, 2FS, 1FT, 2FT and 1FE and 2FE may now be described by referring to FIGS. 2B, 2C, 2E and 2F. By referring to FIG. 2B, it is seen that the push buttons PB located on panel 14 which correspond to 1 and 2 positions shown thereon are designated 1PB and 2PB respectively. When each of such push buttons is depressed, an energizing circuit is established for an associated storage relay ST through a front contact of the cancel button CNB. The storage relays 1ST and 2ST correspond to the push buttons 1PB and 2PB respectively. It is seen that each of these relays 1ST and 2ST is indicated to be a single winding relay which is normally energized by the circuit generally described above and which is effectively maintained energized by a resistor-capacitor arrangement following the release of its corresponding push button. One such resistor-capacitor arrangement for storage relay 2ST includes resistor 22 and capacitor 23. In this connection, it should be understood that the size of capacitor 23 is sufficient in order to store a charge for maintaining relay 2ST energized until its front contacts are established. An additional stick circuit which includes a back contact of an associated location code relay LC is established through a front contact of the storage relay energized. The stick circuit for relay 2ST, for example, would extend from (+), through back contact 25 of relay 2LC, through front contact 26 of relay 2ST, through the winding of relay 2ST, over bus 29 through front contact 27 of cancel button CNB, to (−). The storage relay 2ST is then maintained energized dependent upon the deenergized condition of its location code relay 2LC. This is similarly true for storage relay 1ST which has location code relay 1LC associated therewith. It will be noted that the storage relays 1ST and 2ST have a portion of their energizing circuits in common which includes bus 29 and front contact 27 of cancel button CNB with the same common circuit being included in their respective stick circuits. In this connection, it should be observed that should the front contact 27 of cancel button CNB be established to (−), both of the storage relays 1ST and 2ST could normally be energized depending upon the actuation of their respective push buttons 1PB and 2PB and the deenergized condition of their location code relays 1LC and 2LC respectively. Other storage relays which may be connected to the bus 29 in a similar manner to storage relays 1ST and 2ST may be caused to be similarly energized and maintained energized in the manner described for relays 1ST and 2ST. The location code relays 1LC and 2LC associated with the storage relays 1ST and 2ST respectively are each effective when energized to establish circuits for providing a positive (+) potential to the corresponding token receiving means 1FS or 2FS for causing the energization of code determining relays 1CD to 7CD in combination and for establishing circuits in conjunction with the stepping relays 1SR and 2SR for providing positive (+) potentials to the corresponding token receiving means 1FT, 1FE, 2FT or 2FE. For example, a positive (+) potential is supplied to the common connection of the microswitch contactors 1S to 10S included with token receiving means 2FS shown in FIG. 2D through front contact 31 of relay 2LC when such relay is energized, over wire 32. A positive (+) potential is supplied to the common connection of the microswitch contactors 1S to 10S included with token receiving means 2FT or 2FE shown in FIG. 2F in accordance with the positions of front and back contact 34 of stepping relay 1SR and front and back contact 36 of stepping relay 2SR, over bus wires 38 and 39, through front contacts 41 and 42 of relay 2LC, and over wires 44 and 45 to the token receiving means 2FT and 2FE respectively.

The code determining relays 1CD to 7CD are thus caused to be energized in a code combination corresponding to the actuation of the microswitch contactors 1S to 7S for either token receiving means 1FS or 2FS in accordance with an identifying token means being inserted into such token receiving means 1FS or 2FS and the energization of the corresponding location code relay LC in the manner described above. The mark-space buses M1 to M8 and S1 to S8 are energized via the front and back contacts mentioned above of the code determining relays 1CD to 8CD which circuit includes back contact 36 and front contact 47 of the stepping relays 2SR and 1SR respectively. Such mark-space buses M1 to M8 and S1 to S8 are thus energized in combination in accordance with the energization of the stepping relays 1SR and 2SR and the energization of the location code relays LC corresponding to the token receiving means having an identifying token means inserted therein. It should be noted, however, that only the space buses S1 to S8 would normally be energized in the absence of an identifying token means from a unit token receiving means which has a positive (+) potential applied to the microswitch contactors 1S to 8S in the manner described above. This is also true for a station token receiving means which does not have an identifying token means representative of a given station inserted therein. In this case, relays 1CD to 7CD would remain deenergized to thus place a positive (+) potential on space buses S1 to S7 in accordance with the B+ being applied through the circuit described above. It will be noted in FIG. 2E that the front and back contact 49 of relay 8CD has its connections to the mark-space buses M8 and S8 connected in a reverse manner. This connection is made in this manner in order to provide a total of 128 different codes available for providing 128 identifying token means having their respective cam bushings arranged differently from the others each of which may be assigned to a given fire station. This will be explained more fully hereinafter. The energization of the mark-space buses M1 to M8 and S1 to S8 in the manner described above is adapted to energize a number of units, tens and hundreds buses via a diode matrix in order to cause the operation of selected station, hose truck HT and pump engine PE indicators to positions corresponding to the manner in which the mark-space buses are energized as a result of a given identifying token means being inserted into one of the token receiving means described above.

Figure 2H:
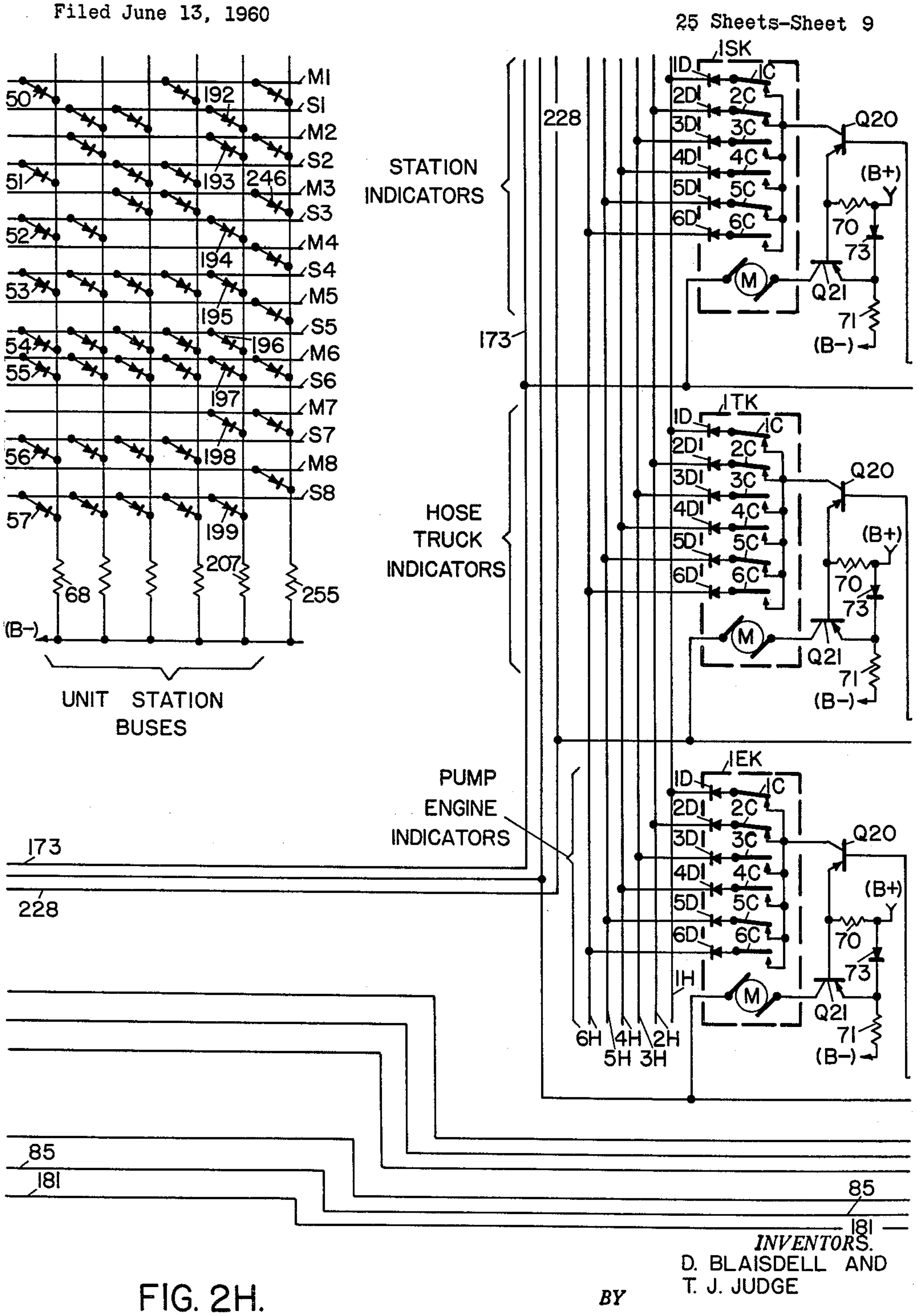
Figure 2J:
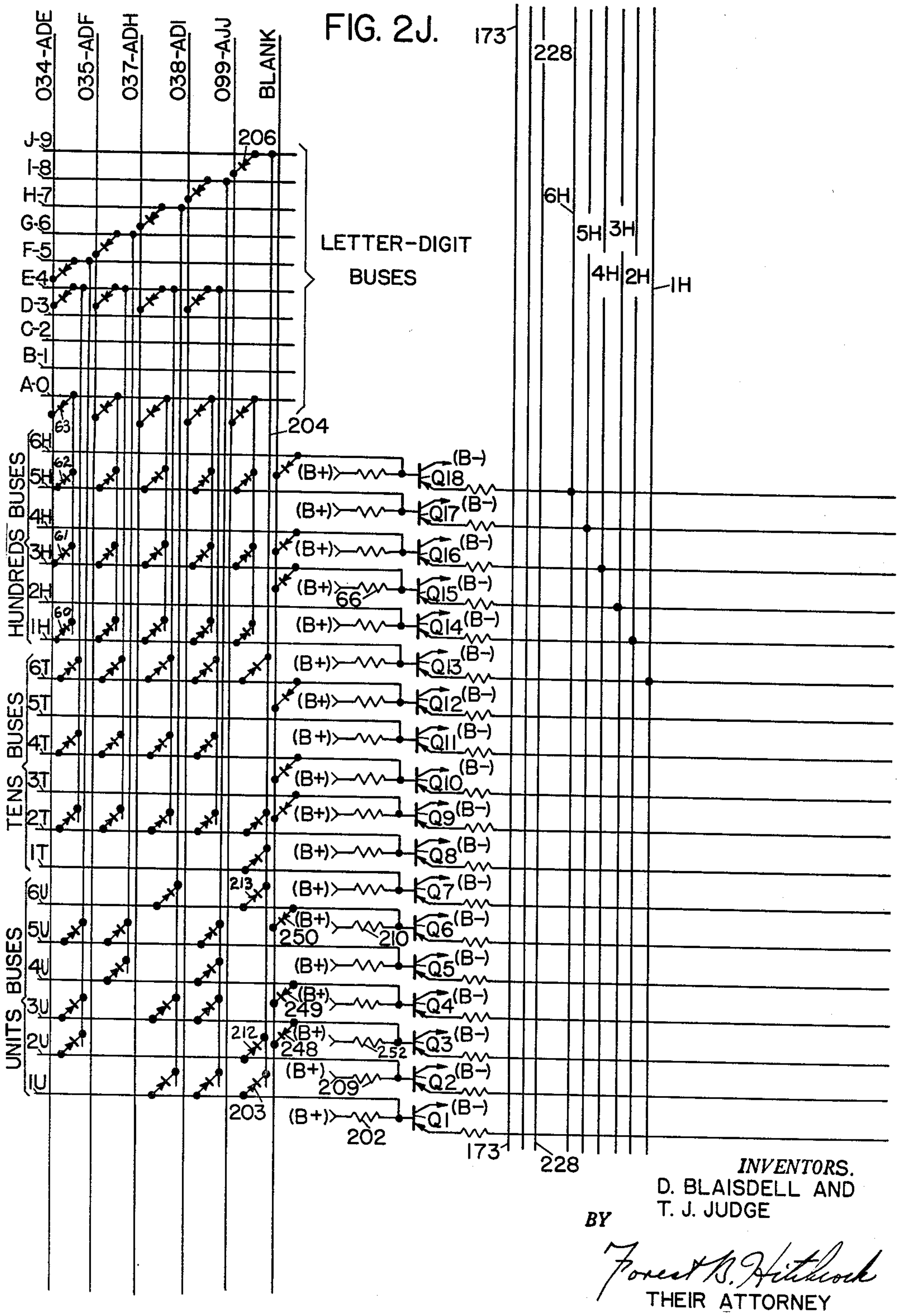

Referring to FIGS. 2F, 2H and 2J, it may now be described how the energization of the mark-space buses M1 to M8 and S1 to S8 in a particular code combination is effective to energize the units, tens and hundreds buses in predetermined code combinations for causing the operation of selected changeable display indicators. Referring to such figures, it is seen that the mark-space buses M1 to M8 and S1 to S8 are connected to buses which are appropriately called unit-station buses by means of diodes. The manner in which such mark-space buses are connected to the unit-station buses may be better described with reference to the code chart shown in FIG. 3. Before considering the description of such connection, it is considered expedient to explain the code chart shown in FIG. 3, which chart is employed with the detailed circuit organization of the present invention for facilitating the description thereof. Referring to FIG. 3, it is seen that a station designation and a unit designation are assigned to each of five codes for the mark-space buses each of which is representative of the manner in which the mark-space buses M1 to M8 and S1 to S8 are energized. In interpreting this code chart in connection with the disclosing of the present invention, it will be noted that an (M) is indicative of a mark bus which is energized while an (S) is indicative of a space bus which is energized for each of the five code combinations shown therein. It should be obvious from this interpretation that the opposite bus to that which is shown in the code chart of FIG. 3, whether it be a mark bus or space bus, is deenergized for a given code combination. This is true as well for the code combination shown in the code chart of FIG. 3 for blank for operating selected indicators to a blank position. In this connection, each of the space buses S1 to S8 would be energized while each of the mark buses M1 to M8 would be deenergized in a given situation. This will be described more fully hereinafter. The manner in which the mark-space buses M1 to M8 and S1 to S8 are connected to the unit-station buses shown in FIGS. 2G and 2H may now be described in connection with the particular code combinations shown in the code chart of FIG. 3.

By way of example, the unit-station bus designated 034–ADE is seen to have diodes 50, 51, 52, 53, 54, 55, 56 and 57 connected to buses M1, S2, S3, S4, S5, M6, S7, and S8 respectively. It will be noted by referring to the code combination allotted to the units-station bus 034–ADE in the code chart of FIG. 3 that the exact opposite mark-space buses are energized when either the identifying token means 034 for the hose truck HT as described above or an identifying token means ADE for a fire station which has not been described above is inserted into an appropriate token receiving means and positive (+) energy is provided as described above. With the unit-station bus 034–ADE thus being connected to the deenergized mark-space buses via the above described diodes, (B−) is connected in biasing circuits for PNP type transistors Q1 to Q18 through the letter-digit buses and the units, tens and hundreds buses shown in FIG. 2J in a predetermined manner through a plurality of diodes. Referring to FIG. 2J, it is seen that the unit buses are designated 1U, 2U, 3U, 4U, 5U and 6U, the tens buses are designated 1T, 2T, 3T, 4T, 5T and 6T and the hundreds buses are designated 1H, 2H, 3H, 4H, 5H and 6H. The letter-digit buses each are designated by a letter and a digit. One such designation, for example, is A–0 for the first of ten letter-digit buses. It is seen that the unit-station buses are connected to the units, tens and hundreds buses through the letter-digit buses in a predetermined manner by means of a plurality of diodes. This is effected in this manner in order to cause the energization of certain of the PNP type transistors Q1 to Q18 associated with the units, tens and hundreds buses. By way of example, it is seen that the hundreds buses 1H, 3H and 5H are connected to the unit-station bus 034–ADE through the letter-digit bus A–0 by means of diodes 60, 61, 62 and 63 respectively. It is seen that such diodes are connected in a manner to supply (B−) to the biasing circuits of the respective PNP type transistors. In this case, the transistors Q13, Q15 and Q17 are affected. One such completed biasing circuit for the transistor Q15 extends from (B+), through resistor 66, over hundreds bus 3H, through diode 61, to letter-digit bus A–0, through diode 63, over unit-station bus 034–ADE, through resistor 68, to (B−). In this manner of connection, the (B+) is removed from the base of transistor Q15 as a result of the current flow through resistors 66 and 68. Such base of transistor Q15 is thus effectively placed at a more negative (−) potential as a result of the voltage drop across resistor 66 which is effective to cause transistor Q15 to be energized. It will be noted that the collector of transistor Q15 is connected to (B−), but such (B−) is disconnected from the extension of the hundreds bus 3H which is connected to the hundreds indicators since transistor Q15 is normally deenergized. With the energization of transistor Q15 in the manner described above, the (B−) is connected to the extension of the hundreds bus 3H leading to the hundreds indicators through the collector, base and emitter of transistor Q15. The biasing circuits for the transistors Q1 to Q14 and Q16 to Q18 are similarly effective to cause (B−) to be connected to their respective units, tens and hundreds buses for operating selected indicators during given conditions. In this connection, it is obvious that each of the transistors Q1 to Q18 is effectively a gate in its respective units, tens or hundreds bus for supplying a (B−) to its respective bus or removing such (B−) therefrom. It is seen that each of the transistors Q1 to Q18 is normally deenergized, which deenergization is suitable for disconnecting (B−) from the respective buses. The manner in which the unit-station buses are connected to the unit, tens and hundreds buses for causing the energization of the transistors Q1 to Q18 in predetermined combinations may be explained more explicitly by referring to the code chart shown in FIG. 4.

In referring to the code chart shown in FIG. 4, it is seen that a particular code combination is shown for each combination of a letter and digit employed in this presentation of the present invention. More particularly, the code chart shown in FIG. 4 shows that, for example, the units, tens and hundreds buses are energized in a predetermined combination for the letter A and the digit 0. Such code combination shows that the units, tens or hundreds buses should be energized in the manner indicated in such code chart for causing a given indicator to be operated to display the letter A or the digit 0. In this connection, it will be recalled that the display element of each of the changeable display indicators employed in the present invention may have letters, digits or other suitable characters inscribed thereon dependent upon its position or use in the intended application thereof. In order to describe the present invention, the letters A through J have been chosen to be inscribed on tape elements of those changeable display indicators employed to display station designations while the digits 0 through 9 have been chosen to be inscribed on the tape elements of those changeable display indicators employed to display movable unit designations. It will be noted that the code combinations for the letters A through J correspond to the code combinations of the digits 0 through 9 respectively. In addition, the same code combination is used for the blank position on all of the changeable display indicators employed in the presentation of the present invention. It is seen that each of the eleven code combinations employs a (+) as well as a (0). In this connection, a (+) is indicative of an energized bus while a (0) is indicative of a deenergized bus. Moreover, it should be noted that each of the code combinations is applicable to the units, tens or hundreds buses for operating a selected group of changeable display indicators to their respective units, tens and hundreds positions for displaying the designation of a station, hose truck HT or pump engine PE.

The manner in which selected changeable display indicators are caused to be operated to desired positions when their corresponding units, tens or hundreds buses are effectively conected to (B−) in predetermined combinations may be seen by referring to FIGS. 2H, 2J, 2K, 2L, 2M and 2N. In referring to such figures, it is seen that each of the changeable display indicators includes six changeable contacts 1C to 6C, six diodes 1D to 6D and a motor M. In each case, these are the essential elements necessary to show the manner in which the respective indicators may be operated to display positions by the operation of their respective motors M. Also, it will be noted that each of the changeable display indicators shown in such figures, includes a motor control circuit which comprises PNP type transistors Q20 and Q21, resistors 70 and 71 and diode 73. It is seen that the collector of transistor Q20 is connected to a common connection of the commutator contacts 1C to 6C while the opposite side of the respective commutator contacts 1C to 6C are connected to their respective units, tens or hundreds buses through the diodes 1D to 6D respectively in accordance with the positions of the indicators in their respective groups. The emitter of transistor Q20 is seen to be connected to the base of transistor Q21 and to one side of resistor 70 while its base is connected to the indicators selector circuit corresponding to the station, hose truck HT or pump engine PE and the relative position of the indicators, i.e., position 1 or position 2. The collector of each transistor Q21 is seen to be connected to one side of the respective motor M while the opposite side of the motor M is connected to (B−) through an appropriate circuit. The emitter of transistor Q21 is connected between the biasing circuit including resistor 71 and diode 73 while the opposite side of resistor 71 is connected to (B−) and the opposite side of diode 73 is connected to one side of resistor 70 and (B+). It is seen that the base of transistor Q20 associated with each of the changeable display indicators corresponding to the station, hose truck HT and pump engine PE respectively for each of the positions 1 and 2 are connected to the respective indicators selector circuit via a biasing circuit included therewith. The indicators selector circuit for each group of three indicators is seen to comprise a PNP type transistor designated Q22 which has its emitter connected to (B+) while its collector is connected to a biasing circuit which includes resistors 78 and 79 and diode 80. It will also be noted that the biasing circuit including resistors 78 and 79 is connected to the base of transistor Q20 for each of the three indicators in a group which correspond to a station, hose truck HT or pump engine PE. The base of transistor Q22 associated with the hose truck indicators in position 2 for example, is seen to be connected to a biasing circuit whch includes resistors 82 and 83 and to (B+) through a front contact of the corresponding location code LC relay, front and back contacts of the stepping relays 1SR and 2SR and wire 85. It will be noted that the biasing circuit for each of the transistors Q22 which includes resistors 82 and 83 is effective to normally place the base of the respective transistor Q22 at a negative (−) potential as a result of the voltage drop in resistor 83 to effectively cause such transistor Q22 to be normally energized. It will be described hereinafter how the transistor Q22 for a given group of indicators is selectively deenergized for causing the operation of that group of indicators. The general manner in which (B−) is supplied to the motor control circuits and (B+) is supplied to the indicators selector circuit for a given group of indicators may be described by referring to the detailed circuits shown in FIGS. 2B, 2C, 2E and 2F.

In considering the description of the detailed circuits shown in FIGS. 2B, 2C, 2E and 2F, it will be helpful to remember the general statement made above in connection with the sequence of operation of the station, hose truck HT and pump engine PE indicators corresponding to either position 1 or position 2. That is, it was generally stated that the station indicators are initially caused to be operated after which the hose truck HT indicators are caused to be operated followed by the operation of the pump engine PE indicators in accordance with identifying token means being inserted into the respective token receiving means located on panel 14 for either position 1 or position 2 and the actuation of the corresponding push button 1PB or 2PB.

The circuitry provided for effecting the operation of the various groups of changeable display indicators in a sequential manner may now be described. Referring to FIGS, 2B, 2C, 2E and 2F, it is seen that various relays other than those mentioned above included therein are shown to be indirectly responsive to the actuation of either push button 1PB or 2PB for operating the appropriate group of station indicators. Also, such relays are responsive to the operation of the selected group of station indicators in a certain combination for causing the operation of a group of hose truck indicators and are further responsive thereafter in another combination for causing the operation of a group of pump engine indicators.

The normally deenergized stepping relays 1SR and 2SR referred to above are both single winding relays. These two relays may be energized singly or in combination to complete circuits for supplying (B—) to the various motor control circuits and (B+) to the various indicators selector circuits for the different groups of indicators. More particularly, these two relays 1SR and 2SR may be energized in accordance with the energization of an odd relay OR and an even relay ER. Each of these normally deenergized relays OR and ER is a single winding relay which is caused to be energized dependent partially upon the deenergized condition of the other for energizing the stepping relays 1SR and 2SR in the proper combination in accordance with the changeable display indicators desired to be operated. The energization of either relay OR or relay ER establishes an energizing circuit for an odd-even repeater relay OEP. Initially, the relay OEP is deenergized and is effective to establish a circuit for the relay OR when the relay LO mentioned above is energized following the energization of relay 1LC or 2LC. After such relay OEP is energized, its function is to then complete energizing and stick circuits for the stepping relays 1SR and 2SR dependent upon the energization of the relays OR and ER while also providing stick circuits for such relays OR and ER.

The relays OR and ER are operated to respective energized and deenergized conditions following the initital energization of relay OR in accordance with the operation of the various groups of changeable display indicators. More particularly, a commutating relay CR which is normally deenergized is caused to be energized when a given group of indicators is initiated into operation and is caused to be deenergized when the last of such group of indicators has completed its operation. Such conditioning of relay CR is responsive to the conditioning of a motor run detector circuit shown specifically in FIG. 2C. In FIG. 2C, it is seen that the primary 95 of a transformer TR1 is included in the (B—) supply circuit for the motors M of the groups of indicators. The secondary 96 of such transformer TR1 is appropriately connected to a PNP type transistor Q24 for effecting the operation thereof in accordance with the operation of a given motor M. The operation of such transistor Q24 is then effective to condition PNP type transistors Q25 and Q26 through respective associated resistors and energy sources for causing the operation of relay CR. It should be noted here that during the quiescent condition of the system, the transistors Q24 and Q26 are deenergized while the transistor Q25 is energized for thus maintaining the relay CR deenergized. In the active condition of the system, i.e., when a group of changeable display indicators are each being operated to desired positions, the transistors Q24 and Q26 are energized while the transistor Q25 is deenergized for thus causing the relay CR to be energized. The detailed operation of this motor run detector circuit will be considered when typical operations of the present system are described.

It has been stated above that the fill-in lamps located on the maps DM and CM are caused to be illuminated in accordance with an identifying token means being inserted into the token receiving means 1FT, 1FE, 2FT or 2FE which are shown in FIGS. 2E and 2F. Referring to FIGS. 2B, 2E, 2F and 2G it is seen that the energizing circuit for a double winding relay associated with each group of corresponding fill-in lamps located on the maps DM and CM includes front and back contacts of the stepping relays 1SR and 2SR, front contacts of the corresponding location code relay 1LC or 2LC, a front contact of the microswitch contactor 9S included with the corresponding token receiving means 1FT, 1FE, 2FT or 2FE, a front and back contact of the stepping relay 1SR and a front contact of the stepping relay 2SR and a front contact of the corresponding station relay DFR or JJR. It will be noted that such double winding relays are designated 1FTR, 1FER, 2FTR and 2FER as shown in FIG. 2G. One such energizing circuit, for example, for relay 2FTR extends from (B+), through front contact 36 of relay 2SR, through front contact 34 of relay 1SR, over wire 38, through front contact 41 of relay 2LC, over wire 44, through the front contact of microswitch contactor 9S associated with token receiving means 2FT, over bus 108, through front contact 109 of relay 2SR, through front contact 110 of relay 1SR, over wire 112, through front contact 113 of station relay JJR, through the upper winding of relay 2FTR, to (B—). With the relay 2FTR energized in this manner, an energizing circuit is established for the associated fill-in lamps 2FTC and 2FTD located on the maps CM and DM respectively through front contact 115 of relay 2FTR. The other fill-in lamps located on the maps DM and CM which correspond to the other relays are caused to be similarly illuminated when their respective relays are caused to be energized. In this connection, the relay 1FTR corresponds to the lamps 1FTC and 1FTD, the relay 1FER corresponds to the lamps 1FEC and 1FTD and the relay 2FER corresponds to the lamps 2FEC and 2FED. In the absence of an identifying token means from a respective token receiving means, a similar circuit to that described above as the energizing circuit for relay 2FTR is established to cause the deenergization of the respective relays 1FTR, 1FER, 2FTR and 2FER. One such deenergizing circuit for relay 2FTR, for example, extends from (B+), through front contact 36 of relay 2SR, through front contact 34 of relay 1SR, over wire 38, through front contact 41 of relay 2LC, over wire 44, through the back contact for the microswitch contactor 9S associated with token receiving means 2FT, over bus 117, through front contact 119 of relay 2SR, through front contact 120 of relay 1SR, over wire 122, through front contact 124 of station relay JJR, through the lower winding of relay 2FTR, to (B—). It should be noted here that each of the relays 1FTR, 1FER, 2FTR and 2FER are of the type which when energized remain in that energized condition even though the energizing circuit has been disconnected until a deenergizing circuit is established for causing the deenergization of such relays. Relays of this type are commonly called mechanically biased relays.

When it is desired to cause the station, hose truck HT and pump engine PE indicators for a given position to be operated to their blank positions in accordance with the removal of identifying token means from corresponding token receiving means on the fill-in panel 14 as well as the deenergization of those fill-in lamps previously illuminated, the reset button RSB located on the fill-in panel 14 as described above is normally depressed. This establishes an energizing circuit for a reset relay RSR as shown in FIG. 2B. The energization of such relay RSR is effective to establish an energizing circuit for the code determining relay 8CD, an energizing circuit for each of the storage relays 1ST and 2ST as well as deenergizing circuits for the relays 1FTR, 1FER, 2FTR and 2FER in accordance with the presence of the identifying token means ADF and AJJ for the corresponding stations in the respective token receiving means DS and JS on the panel 13. With the establishing of such circuits, the station, hose truck HT and pump engine PE indicators for the positions 1 and 2 are caused to be operated to blank positions in accordance with the energization of their respective location code relays 1LC and 2LC in the manner described above and the removal of previously inserted identifying token means from the respective token receiving means on the panel 14. In addition, the corresponding fill-in lamps located on the maps DM and CM are caused to be deenergized in accordance with the presence of the identifying token means ADF and AJJ and the respective token receiving means DS and JS located on panel 13 as mentioned above.

It should be understood that the drawings included in the figures referred to above and the description thereof is illustrative of a decidedly limited fire control system. The present invention has been presented thus far in connection with a fire control system in such limited manner in order to avoid unnecessary multiplication of similar circuits to thus facilitate in the understanding of such invention and yet be suitable for claiming purposes. The degree to which the present system may be expanded may be explained with reference to the code charts shown in FIGS. 5A to 5H. Referring to FIGS. 5A to 5H, it will be noted that eight code charts are shown therein each of which has thirty-two code combinations for the eight mark-space buses which are assigned the numbers 001 to 256. Although each of the eight code charts has a separate heading for the respective FIGS. 5A to 5H, the code combinations for the numbers 001 to 256 are continuous from one code chart to the next code chart in accordance with the sequence in numbers. It is noted that the heading of each column of numbers is designated unit designation. In this respect, each of the code combinations 001 to 255 may be assigned to a separate unit of apparatus with similar unit designations to those shown for the 255 code combinations while the code combination 256 is assigned to blank. In connection with the individual code combinations, it is seen that each code combination comprises a combination of marks (M) and spaces (S). In accordance with the code chart shown in FIG. 3, the marks (M) and the spaces (S) should be interpreted in the same manner when such code combinations are utilized in the present system in the manner described above for those code combinations shown in the code chart of FIG. 3. That is, the symbol (M) is indicative of an energized mark bus while the symbol (S) is indicative of an energized space bus. In referring to the code chart of FIG. 3, it is seen that the code combinations for the unit designations shown therein as well as the blank code combination are merely duplicated code combinations of the corresponding unit designations shown in the code chart of FIG. 5B and the code chart of FIG. 5D. The code combination for the blank shown therein corresponds to the code combination shown for the unit designation 256 in the code chart of FIG. 5H. These code combinations have been extracted from the code charts shown in FIGS. 5A to 5H and included in the separate code chart of FIG. 3 to facilitate in the description of the detailed circuit organization shown in FIGS. 2A to 2H and 2J to 2N. It will be noted that the respective code charts shown in FIGS. 5A to 5H do not have a heading designated station designation with typical designations assigned to the various code combinations. It should be understood, however, that the present invention provides that the code combinations for the numbers 001 to 128 may be effectively utilized as code combinations for station designations as will be presently explained.

The manner in which the code combinations shown in FIGS. 5A to 5H may be utilized with the present invention may be generally described by referring to the detailed circuit organization shown in FIGS. 2A to 2H and 2J to 2N. In order to provide for 128 stations, it would be necessary to connect 126 different token receiving means similar to token receiving means DS and JS and in addition thereto to bus 126 in the manner shown in FIG. 2F while identifying token means for each of 126 more stations are provided with each such identifying token means having its cam bushings arranged in a manner corresponding to a given code combination shown in the code charts of FIGS. 5A, 5B, 5C and 5D for the numbers 001 to 128. Such token receiving means would be located on the station token storage panel 13 with such identifying token means being normally inserted into the corresponding token receiving means. Similarly, 251 additional token receiving means would be located on the panel 10 in accordance with the number of units of apparatus which are assigned to the respective stations and would be similar to token receiving means ATD, AED, ATJ and AEJ as shown in FIGS. 2A and 2B. Each of such token receiving means would have an identifying token means inserted therein each of which has its cam bushings arranged in a manner corresponding to the code combinations shown in the code charts of FIG. 5A to 5H for the numbers 001 to 255, but excluding the numbers 034, 035, 037 and 038 which are shown in FIGS. 2A and 2B. Likewise, the panels 11 and 12 each would have token receiving means similarly located for the 128 stations to that provided on panel 10 for serving the purposes as described above. With such a large number of stations, it is credible that several fill-in operations would be required at approximately the same time. In order to accommodate such operations, additional positions having token receiving means for a station and each of several units of apparatus may be included with the fill-in panel 14 as described above. It is obvious that the relays which correspond to the respective positions 1 and 2 such as storage relay 2ST and location code relay 2LC for position 2 would have to be provided for each additional position provided on the fill-in panel 14. The token receiving means additionally added to the fill-in panel 14 each would be similar to the token receiving means 1FS and 2FS and connected in a similar manner to the code buses C1 to C7. Other token receiving means which would be added to the fill-in panel 14 corresponding to positions for given types of units of apparatus would be connected to their respective detailed circuits similar to the token receiving means shown in FIGS. 2E and 2F which are designated 1FT, 1FE, 2FT and 2FE. The front and back contacts of the microswitch contactor 9S for each of the additional token receiving means for units of apparatus would be connected to the buses 108 and 117 in the manner shown for providing energization and deenergization circuits for associated fill-in lamps similar to that shown in FIG. 2G.

Each of the 128 stations would have a relay such as relays DFR and JJR shown in FIG. 2D which would individually be energized in accordance with the energization of the code determining relays 1CD to 7CD. Such relays would be connected to the wires designated row 1 to row 8 and the wires designated column 1 to column 16 in the manner shown in FIG. 2D.

Referring to the code charts shown in FIGS. 5A to 5H, it will be noted that only those code charts shown in FIGS. 5A, 5B, 5C and 5D have the mark bus M8 energized for each of the 128 code combinations. In this connection, it will be noted by referring to FIG. 2E that the mark bus M8 is connected to the back of contact 49 while the space bus S8 is connected to the front of contact 49 for relay 8CD. Since the relay 8CD is energized only during a reset operation, the mark bus M8 will be energized for each of the 128 code combinations. It will be noted in FIGS. 2E and 2F that the mark bus M8 and the space bus S8 are connected to the contacts of the microswitch contactor 8S included with each of the token receiving means shown therein in the same manner as the contacts for each of the other microswitch contactors 1S to 7S. The code combinations shown in FIGS. 5E, 5F, 5G and 5H which have the space bus No. 8 energized for each of the code combinations 129 to 255 may thus be employed for identifying given units of apparatus.

It is believed that the nature of the invention, its advantages and characteristic features can be best understood with further description being set forth from the standpoint of operation.

OPERATION

In considering typical operations of the present invention to further illustrate such invention, similar assumptions to those made in connection with FIG. 1 as described above will, for convenience, be employed to further illustrate the detailed circuits shown in FIGS. 2A to 2H and 2J to 2N. For convenience, these assumptions will be repeated here for facilitating in the comprehension of the following operational description.

Initially, it will be assumed that the hose truck HT represented by the identifying token means 035 is instructed to go to a given designated location. Additionally, it will be assumed that the hose truck HT represented by identifying token means 035 is returning from its designated location after a given period of time. During the interim, however, it will be assumed that the hose truck HT represented by identifying token means 034 is instructed to go to the station AJJ whereat the hose truck HT represented by identifying token means 035 is normally assigned to fill in for such normally assigned hose truck HT. When the hose truck HT represented by identifying token means 035 returns to its normally assigned station AJJ, the hose truck HT represented by identifying token means 034 is then assumed to be instructed to return to its normally assigned station ADF. The manner in which the assigned lamps and fill-in lamps located on the maps DM and CM and the changeable display indicators located on the chief's console CC are caused to be operated in accordance with the movement of the identifying token means 035, 034 and AJJ will be presently described.

Referring to FIG. 2A, it will be described how the assigned lamps located on the maps DM and CM for movable unit 035 are caused to be illuminated steadily when the identifying token means 035 is removed from panel 10 and subsequently inserted into the corresponding token receiving means on panel 11. When the identifying token means 035 is removed from its associated token receiving means ATJ located on panel 10, an energizing circuit is established through the back contact of its microswitch contactor 10S for energizing the associated assigned lamps JTD located on map DM and JTC located on map CM. This circuit extends from (+), over bus 130, through the common connection 131 of the microswitch contactors 1S to 10S associated with token receiving means ATJ, through the back contact of microswitch contactor 10S for means ATJ, through the back contact of microswitch contactor 10S associated with token receiving means ETJ, through the back contact of microswitch contactor 9S associated with token receiving means ETJ, through the lamps JTD and JTC, to (−) respectively. Such lamps JTD and JTC will thus remain steadily illuminated until such time as the identifying token means 035 is inserted into the token receiving means ETJ located on the panel 12 for causing such lamps to be operated in a flashing manner. Before this is effected, however, the fill-in operation will be described in accordance with the assumptions made above.

As shown in FIG. 1, the position No. 2 on the fill-in panel 14 was arbitrarily selected for receiving the identifying token means AJJ and 034 in respective token receiving means associated therewith. The identifying token means AJJ would be inserted into the token receiving means 2FS corresponding to the station for position No. 2 while the identifying token means 034 would be inserted into the token receiving means 2FT corresponding to the hose truck HT for position No. 2. The push button 2PB corresponding to position No. 2 would then be depressed following which the fill-in lamps 2FTD and 2FTC would be effectively operated and the station indicators 2SK, 2SK2 and 2SK3 and the hose truck HT indicators 2TK, 2TK2 and 2TK3 would be effectively operated to positions corresponding to the designnations AJJ and 034 respectively. The manner in which such lamps and changeable display indicators are caused to be operated will now be described in connection with the detailed circuits shown in FIGS. 2A to 2H and 2J to 2N. Before this description is initiated, it should be noted that the assigned lamps DTD and DTC located on the maps DM and CM respectively are caused to be illuminated steadily when the identifying token means 034 is removed from its token receiving means ATD located on the panel 10. Such lamps would be illuminated similarly to lamps JTD and JTC as described above. This may be seen by referring to FIG. 2A. Further description in this connection is thus considered unnecessary here.

Figure 6:
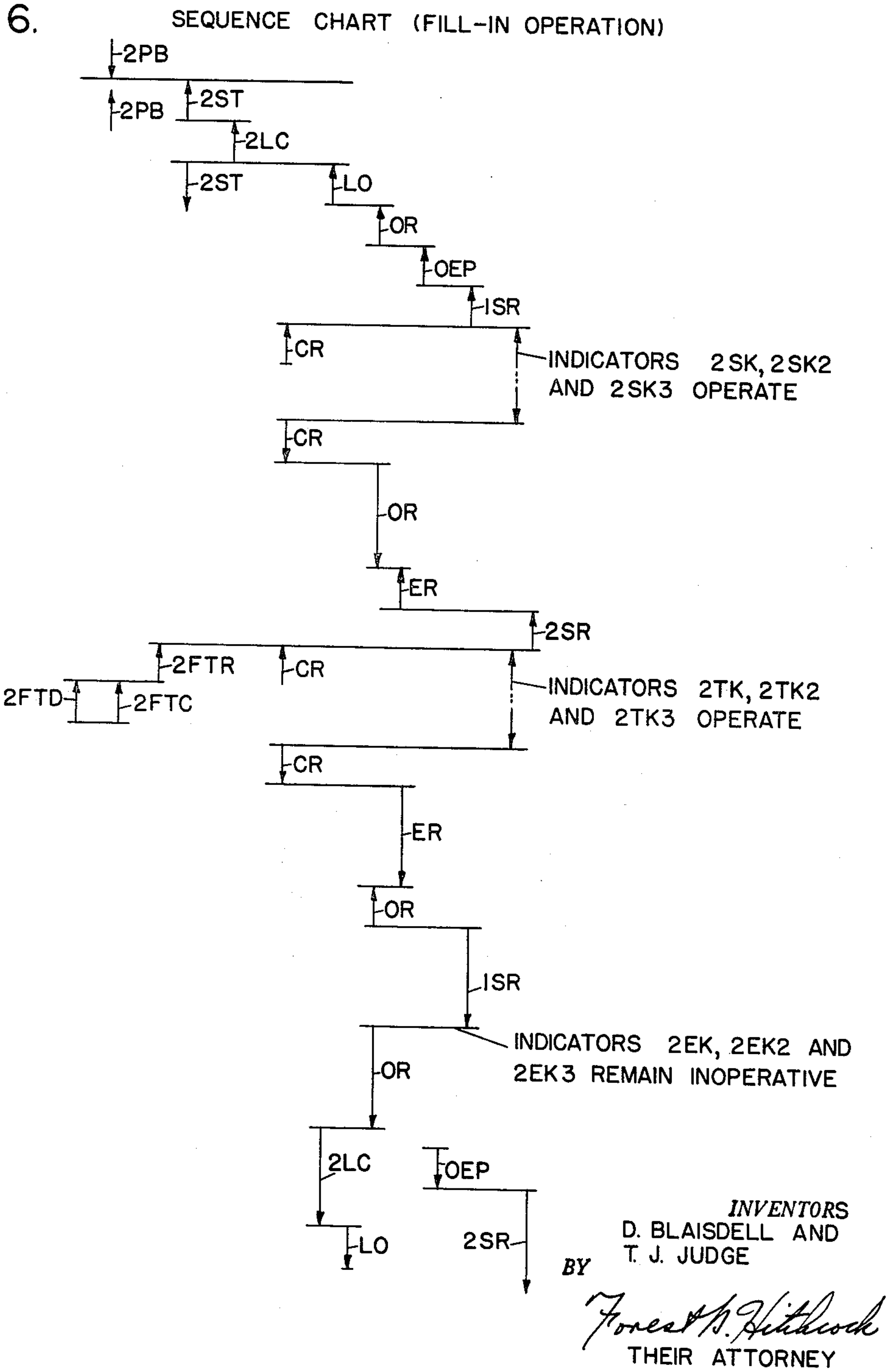
FIG. 6 shows a sequence chart for a typical fill-in operation when employing the circuitry shown in FIGS. 2A to 2H and 2J to 2N.

The depression of push button 2PB initially establishes an energizing circuit for storage relay 2ST which extends from (+), through closed contact 133 of push button 2PB, through the winding of relay 2ST, through closed contact 27 of cancel button CNB, over bus 29, to (−). A charging circuit is also established for capacitor 23 through closed contact 133 of push button 2PB and resistor 22. The function of such charged capacitor 23 is to insure that the relay 2ST be energized following the release of push button 2PB in order that a stick circuit for relay 2ST may be established. Referring to FIG. 2B, it will be seen that the capacitor discharge circuit extends from the positive side of capacitor 23, through resistor 22 and to (−) through the winding of relay 2ST via the circuit described above. The stick circuit for relay 2ST extends from (+), through back contact 25 of relay 2LC, through front contact 26 of relay 2ST, through the winding of relay 2ST, over wire 29, through closed contact 27 of button CNB, to (−). Before continuing, it should be noted that the sequence of operation described here and that which is to follow is shown in the sequence chart of FIG. 6. Such sequence chart illustrates the sequence in which the relays are energized and deenergized with the relative times of energization and deenergization for such relays being included for the typical fill-in operation now being described. Following the energization of relay 2ST, the location code relay 2LC is energized by a circuit extending from (+), through back contact 276 of relay OEP, over wire 290, through back contact 291 of relay 2SR, through back contact 292 of relay 1SR, over wire 142, through back contact 135 of relay LO, through back contact 136 of relay 1ST, through front contact 137 of relay 2ST, through the winding of relay 2LC, through closed contact 139 of button CNB, to (−). Energization of such relay 2LC disconnects the stick circuit for relay 2ST through its back contact 25 to thus release relay 2ST. In addition, an energizing circuit for the lock out relay LO extending from (+), through front contact 163 of relay 2LC, over bus 162, through the winding of relay LO, to (−) is established for energizing such relay LO. With the relay LO being energized, the relays OR, OEP and 1SR are sequentially energized. The energizing circuit for relay OR extends from (+), through back contact 277 of relay OEP, through front contact 140 of relay LO, over wire 294, through back contact 268 of relay 2SR, through back contact 267 of relays 1SR, over wire 266, through back contact 265 of relay CR, through the winding of relay OR, to (−). The energizing circuit for relay OEP then extends from (+), through front contact 147 of relay OR, through the winding of relay OEP, to (−). Following the energization of relay OEP, the energizing circuit for relay 1SR extends from (+), through front contact 277 of relay OEP, through front contact 166 of relay OR, over wire 296, through back contact 297 of relay 2SR, through the winding of relay 1SR, to (−). The relay OR is made sufficiently slow release by the inclusion of diode 103 in shunt therewith to prevent the release of such relay OR for a sufficient length of time to insure that the stick circuit for relay OR is established following the energization of relay 1SR. Such stick circuit is also dependent upon the energization of relay CR which is dependent upon the operation of the motors M of selected changeable display indicators as stated above. With the relay 1SR being energized, (B−) is supplied to the respective motors M included with the station indicators 2SK, 2SK2 and 2SK3, while (B+) is supplied to the indicators selector circuit corresponding to such station indicators for position 2.

More particularly, (B−) is supplied to the motors M of such indicators through the circuit extending from (B−), through the primary 95 of transformer TR1, over wire 169, through back contact 170 of relay 2SR, through front contact 171 of relay 1SR, over wire 173, to the bus 75 corresponding to the station indicators for position 2. (B+) is supplied to the indicators selector circuit corresponding to the station indicators for position 2 by a circuit extending from (B+), through back contact 175 of relay 2SR, through front contact 176 of relay 1SR, over wire 178, through front contact 180 of relay 2LC, over wire 181, to the base of transistor Q22 and the common connection of resistors 82 and 83 included with such indicators selector circuit. In addition, the hundreds, tens and units buses are energized following the energization of relay 1SR in the manner generally described above. The station indicators 2SK, 2SK2 and 2SK3 are thus caused to be operated to the respective positions A, J and J in accordance therewith. It is considered to here describe the energization of the hundreds, tens and unit buses for effecting the operation of such station indicators in a more detailed manner.

It will be recalled that the energization of the hundreds, tens and unit buses in predetermined code combinations is dependent upon the manner in which the mark-space buses M1 to M8 and S1 to S8 are caused to be energized as generally described above. In the present case, the mark-space buses are energized in the code combination shown in the code chart of FIG. 3 corresponding to the station designation AJJ. Referring to the code chart shown in FIG. 3, it is seen that the mark buses 1, 3, 4, 5 and 8 are required to be energized while the space buses 2, 6 and 7 are required to be energized for the station designation AJJ. In order to energize such mark-space buses in this manner, the code determining relays 1CD, 3CD, 4CD and 5CD are required to be energized. The cam bushings associated with the identifying token means AJJ which has been assumed to be inserted into the token receiving means 2FS are effective to cause the microswitch contactors 1S, 3S, 4S and 5S to be appropriately actuated for completing energizing circuits to their corresponding code determining relays. With the energization of the location code relay 2LC as described above, (+) is supplied to each of the code determining relays having its associated microswitch contactor for token receiving means 2FS appropriately actuated. One such energizing circuit for relay 3CD, for example, extends from (+), through front contact 31 of relay 2LC, over wire 32, through the common connection of the microswitch contactors 1S to 10S included with token receiving means 2FS, through diode 9D, through the closed contact of microswitch contactor 3S, over code bus C3, through the winding of relay 3CD, to (−). The energizing circuits for code determining relays 1CD, 4CD and 5CD may be similarly traced. It will be noted that the code determining relay 8CD is not here energized, but it should be recalled that the connections to the mark-space buses M8 and S8 are reversed in the manner shown in FIG. 2E. With such code determining relays energized, the mark-space buses will be energized in the code combination shown in the code chart of FIG. 3 and described above for the station designation AJJ through front and back contacts of the code determining relays 1CD to 8CD as shown in FIG. 2E. Referring to FIG. 2E, it is seen that the mark bus M3 is energized by a circuit extending from (B+), through back contact 36 of stepping relay 2SR, through front contact 47 of stepping relay 1SR, through front contact 185 of relay 3CD, to mark bus M3. The mark buses M1, M4 and M5 are similarly energized through front contacts 183, 186 and 187 of their associated relays 1CD, 4CD and 5CD, while the space buses 2, 6 and 7 are similarly energized through back contacts 184, 188 and 189 of relays 2CD, 6CD and 7CD as shown in FIG. 2E. With the mark-space buses energized in this code combination, each of the unit-station buses are rendered ineffective except for the unit station bus designated 099–AJJ. Each of such buses is effectively connected to the (B+) supplied to at least one of the mark-space buses M1 to M8 and S1 to S8 while the unit-station bus designated 099–AJJ is connected to those mark-space buses which are left deenergized. For example, the unit station bus designated 034–ADE is connected to the mark bus M1 through diode 50 which is effective to provide a complete circuit from (B+) to (B−) which includes the resistor 68 connected in bus 034–ADE. The voltage drop in resistor 68 is subsequently effective to render such bus ineffective for supplying (B−) to the biasing circuits of any one of the transistors Q1 to Q18 as generally described above. Each of the other unit-station buses which are designated 035–ADF, 037–ADH and 038–ADI and the blank bus are similarly rendered inoperative for supplying (B−) to the biasing circuits of the transistors Q1 to Q18. As indicated above, it is seen that the diodes 192, 193, 194, 195, 196, 197, 198 and 199 connect the deenergized mark-space buses to the unit-station bus designated 099–AJJ. The biasing circuits for the transistors Q1 to Q18 associated with the units, tens and hundreds buses are caused to be energized in code combinations according to those shown in the code chart of FIG. 4 for the letters A and J. For example, the transistors Q1, Q2 and Q6 corresponding to the units buses 1U, 2U and 6U respectively are caused to be energized as a result of their respective biasing circuits being established. One such biasing circuit for transistor Q1 extends from (B+), through resistor 202, through diode 203, over bus 204, over letter-digit bus J–9, through diode 206, through resistor 207 connected in unit-station bus 099–AJJ, to (B−). The biasing circuits for the transistors Q2 and Q6 may be similarly traced through their respective resistors 209 and 210 and their respective diodes 212 and 213. The bases of transistors Q1, Q2 and Q6 are placed at a negative (−) potential as a result of the voltage drops in the respective resistors 202, 209 and 210 for causing such transistors to be energized which is effective to place (B−) on the units buses 1U, 2U and 6U. The transistors Q7, Q8 and Q12 associated with the tens buses 1T, 2T and 6T and the transistors Q13, Q15 and Q17 associated with the hundreds buses 1H, 3H and 5H are similarly energized for placing (B—) on their corresponding tens and hundreds buses.

Figure 2K:
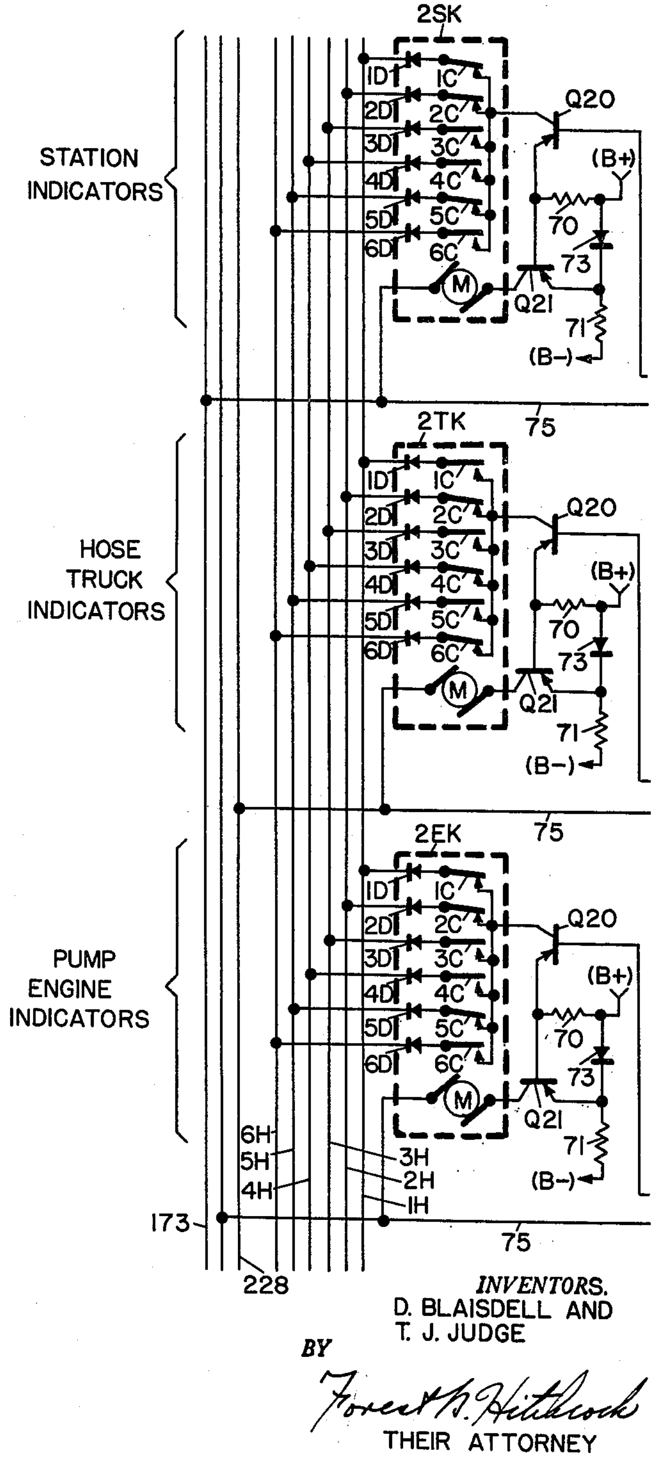
Figure 2L:
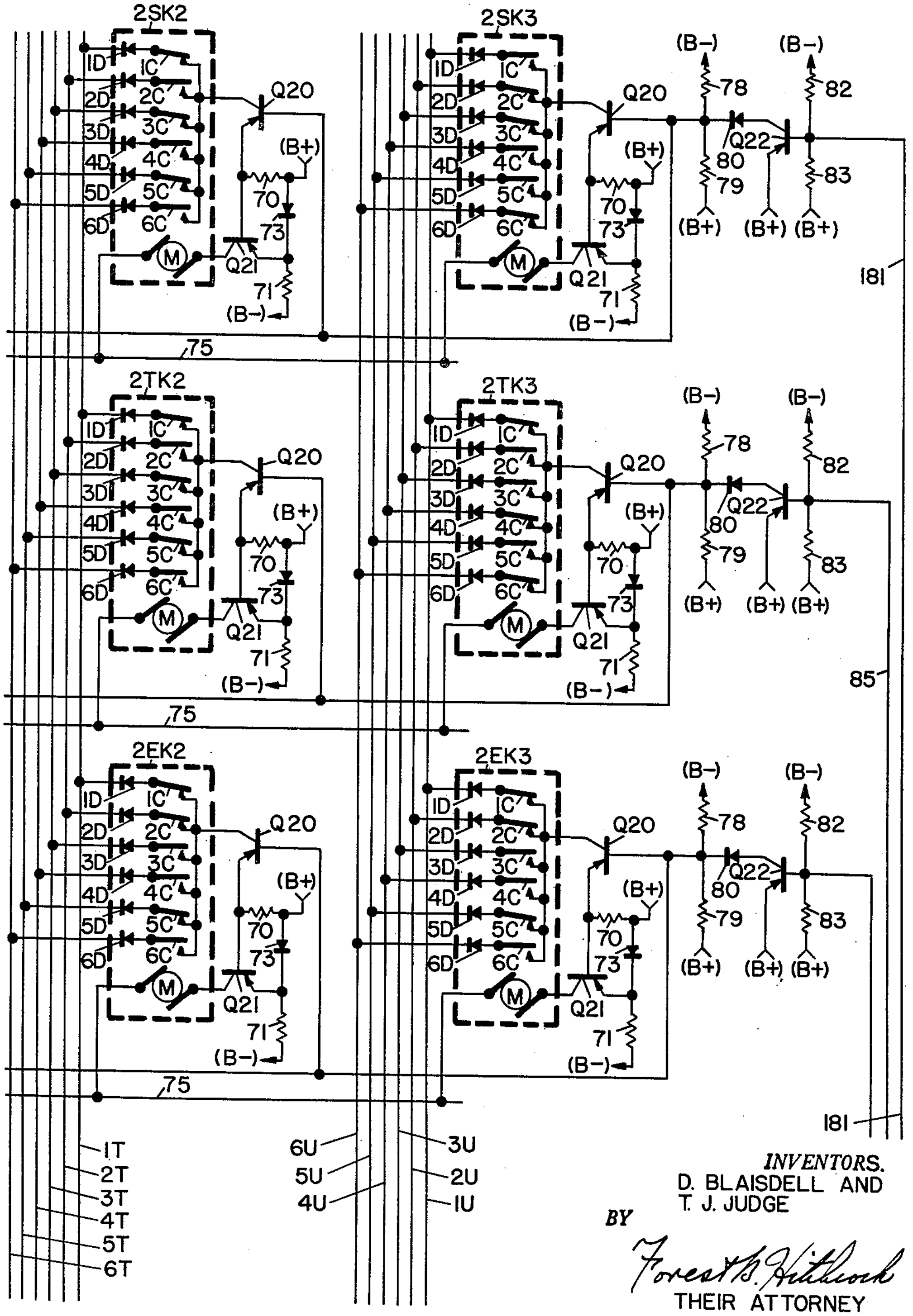
Figure 2M:
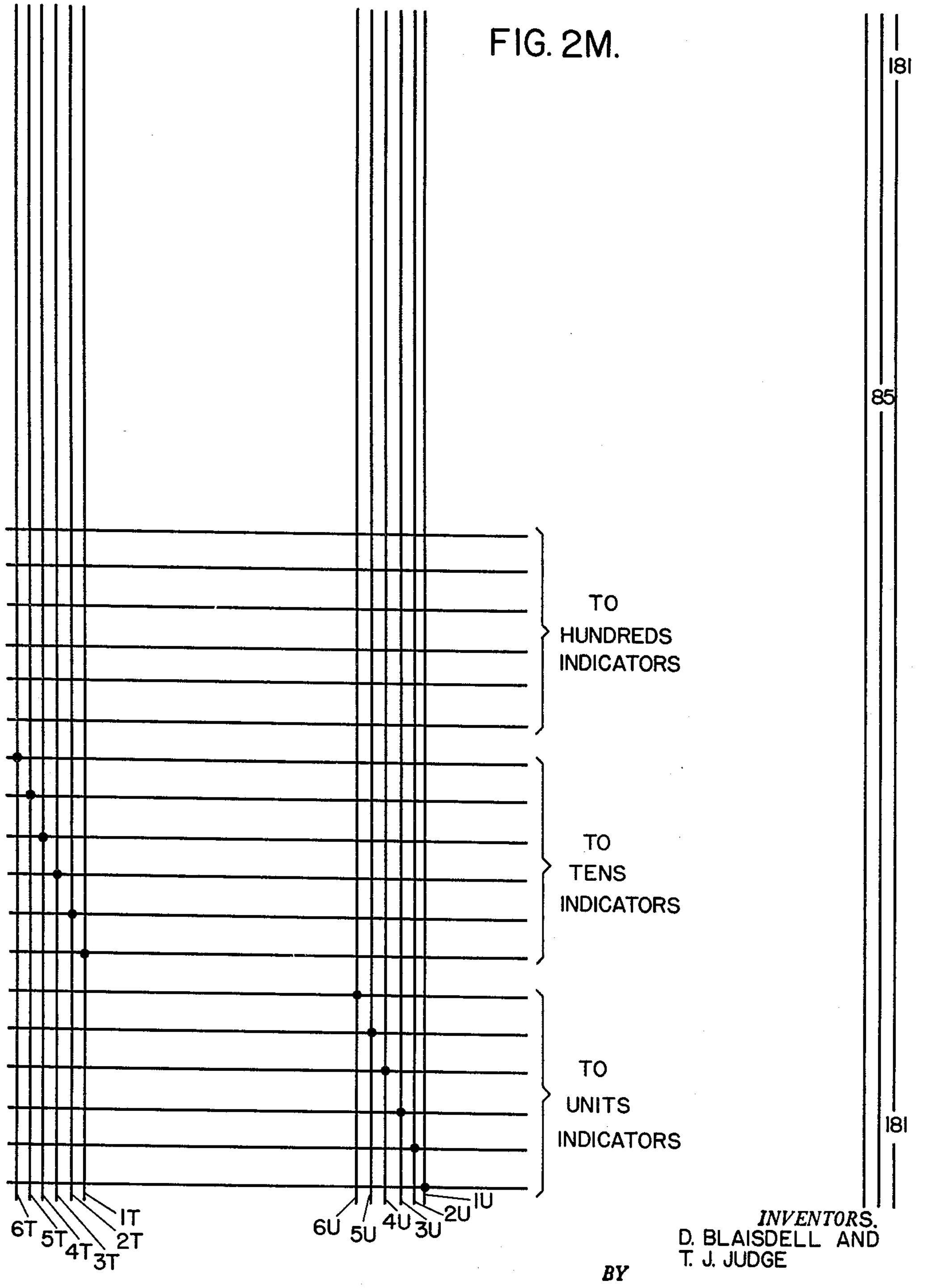
Figure 2N:
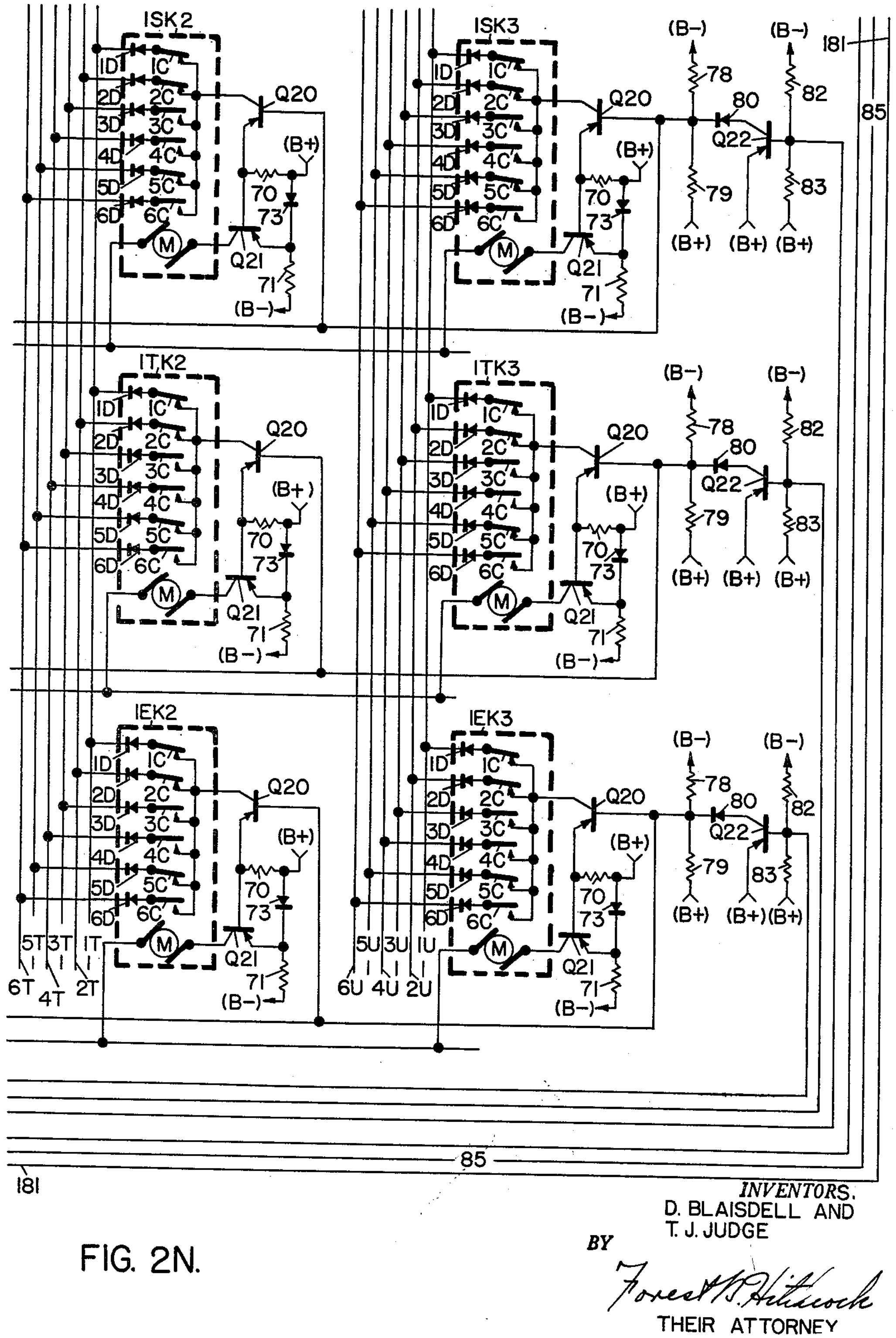

With the hundreds, tens and units buses being energized in the manner described above with (B—), the motor control circuits associated with the station indicators 2SK, 2SK2 and 2SK3 are effective to cause the operation of the associated motors M of such indicators in accordance with (B—) being supplied to each motor of such station indicators 2SK, 2SK2 and 2SK3 as described above and (B+) being supplied to the indicators selector circuit as described above. Referring to FIGS. 2K and 2L, it is seen that the commutator contacts 1C to 6C for each of the indicators 2SK, 2SK2 and 2SK3 are positioned corresponding to the code combination shown for the blank display shown in the code chart of FIG. 4. That is, the commutator contacts 1C, 2C and 5C are closed while the commutator contacts 3C, 4C and 6C are opened. The motor M of indicator 2SK3, for example, would be operated as a result of the energization of transistors Q20 and Q21 included in the motor control circuit associated therewith and the deenergization of transistor Q22 included in the indicators selector circuit for the station indicators in position No. 2. More particularly, (B+) is placed on the base of transistor Q22 as a result of the circuit described above being established which is effective to cause the deenergization of transistor Q22. The biasing circuit for the base of transistor Q20 is then effective to place such base of transistor Q20 at a negative (—) potential. This biasing circuit includes resistors 78 and 79. The emitter of transistor Q20 is placed at substantially (B+) as a result of (B+) being connected to one side of resistor 70 and diode 73. Transistor Q20 is then energized as long as any one of the commutator contacts 1C, 2C and 6C is closed to supply (B—) to the collector of transistor Q20. One circuit, for example, established for causing current flow through transistor Q20 extends from (B+) connected to one side of resistor 70, through resistor 70, through the transistor Q20 from its emitter to collector through its base, through closed commutator contact 2C, through diode 2D, to (B—) supplied to units bus 2U. Similar circuits may be traced for commutator contacts 1C and 6C. As a result of the transistor Q20 being energized, the base of transistor Q21 is placed at a negative (—) potential in accordance with the voltage drop across resistor 70 to thus cause the energization of transistor Q21. It is seen that the emitter of transistor Q21 is connected in the biasing circuit including resistor 71 and diode 73 which causes the emitter of transistor Q21 to be placed at a positive (+) potential in accordance with the voltage drop across resistor 71. The motor M associated with indicator 2SK3 is then caused to be operated when transistor Q21 is energized and as long as transistor Q21 is effectively energized for causing the letter J to be displayed in the face of such indicator 2SK3. The motor control circuits for the indicators 2SK and 2SK2 are similarly caused to be effective for energizing the respective motors M for causing such indicators to display the letters A and J respectively in accordance with (B—) being supplied to the hundreds and tens buses as described above.

As the motors M corresponding to the station indicators 2SK, 2SK2 and 2SK3 are initiated into operation, the motor run detector circuit shown in FIG. 2C and generally described above is effective to cause the commutating relay CR to become energized. Referring to FIG. 2C, it is seen that a voltage developed in the primary 95 of transformer TR1 is induced into the secondary 96 of such transformer TR1 as one or more of such motors M begin to operate. For the present disclosure, it is assumed that the transformer TR1 is wound in such a manner as to have no phase shift between the voltage in the primary and that voltage induced into the secondary thereof. With this assumption in mind, it is seen that as the motors M are operated, the voltage induced into the secondary 96 of transformer TR1 is in a direction to cause diode 218 to conduct through a capacitor 219 and a resistor 220 connected in a series-shunt relationship with such diode 218. Such capacitor 219 is thus charged while the voltage drop across resistor 220 places the base of transistor Q24 at a negative (—) potential. With (B+) connected to the emitter of transistor Q24 and (B—) connected to its collector through resistor 221, transistor Q24 is thus energized. Normally, current flows from (B+) to (B—) through resistors 152, 158 and 221 to effectively place the base of transistor Q25 at a negative (—) potential. With the emitter of transistor Q25 connected to (B+) and its collector connected to (B—) through resistor 154, it is normally energized. With transistor Q24 being energized in the manner described above, the base of transistor Q25 is placed at substantially (B+) to thus deenergize such transistor Q25. With transistor Q25 being deenergized in this manner, current flows from (B+) to (B—) through resistors 156, 155 and 154 which is effective to place the base of transistor Q26 at a negative (—) potential. With (B+) being connected to the emitter of transistor Q26 and (B—) being connected to its collector through the winding of relay CR, such transistor Q26 is effectively energized, and thus the relay CR is also energized. In order to insure that the relay CR remain energized during the time that one or more of such motors M included with the station indicators 2SK, 2SK2 and 2SK3 are operated, the capacitor 219 is discharged between alternate pulses of voltage received in the secondary 96 of transformer TR1 through the resistor 220 to effectively maintain the transistors Q24 and Q26 energized and the transistor Q25 deenergized for the duration of motor operation. Following the operation of the last station indicator to its desired position, substantially (B+) is placed on the base of transistor Q24 through resistor 220 since voltage pulses are no longer induced into the secondary 96 of transformer TR1. The transistors Q24 and Q26 are thus conditioned to their normally deenergized conditions while transistor Q25 is conditioned to its normally energized condition, which is effective to deenergize relay CR. The relay OR is subsequently deenergized while the relays ER and 2SR are sequentially energized to condition the circuits for the operation of the indicators 2TK, 2TK2 and 2TK3. In addition, (B+) is connected in the energizing circuit for the fill-in truck relay 2FTR through front contacts of stepping relays 1SR and 2SR for subsequently energizing such relay 2FTR and the corresponding fill-in truck lamps 2FTD and 2FTC located on the maps DM and CM respectively.

More particularly, following the release of relay CR, the stick circuit for relay OR extending from (+), through front contact 265 of relay CR, over wire 266, through front contact 267 of relay 1SR, through back contact 300 of relay 2SR, over wire 301, through front contact 279 of relay OR, through the winding of relay OR, to (—) is disconnected to thus deenergize relay OR. Following the release of relay OR, an energizing circuit for relay ER which extends from (+), through front contact 278 of relay OEP, over wire 303, through front contact 304 of relay 1SR, through back contact 305 of relay 2SR, over wire 306, through back contact 167 of relay OR, through the winding of relay ER, to (—) is established. With the relay ER thus being energized, the energizing circuit for relay 2SR is established and extends from (+), through front contact 277 of relay OEP, through front contact 281 of relay ER, over wire 308, through front contact 309 of relay 1SR, through the winding of relay 2SR, to (—). Following the energization of relay 2SR, the energizing circuit for relay ER through back contact 305 of relay 2SR is obviously disconnected. A stick circuit for relay ER is established, however, and extends from (+), through front contact 265 of relay CR, over wire 266, through front contact 267 of relay 1SR, through front contact 300 of relay 2SR, over wire 311, through front contact 283 of relay ER, through the winding of relay ER, to (—). It should be pointed out that this stick circuit is not established until the motors M corresponding to the indicators 2TK, 2TK2 and 2TK3 are initiated into operation and the motor run detector circuit is effective to cause the relay CR to be energized. It will be noted that the relay ER has diode 102 connected in shunt therewith to make such relay ER sufficiently slow in releasing such that the motor run detector circuit becomes effective before the release of relay ER. With the energization of relay 2SR, suitable energy sources are connected to the control circuits for indicators 2TK, 2TK2 and 2TK3 and the hundreds, tens and units buses respectively associated therewith.

Referring to FIGS. 2B, 2E and 2F, it is seen that the circuit including front contact 34 of relay 1SR and front contact 36 of relay 2SR as described above is established for supplying (B+) to the common connection of the microswitch contactors 1S to 10S included with token receiving means 2FT and is further supplied to the mark-space buses M1 to M8 and S1 to S8 in accordance with the identifying token means 034 assumed to be inserted into token receiving means 2FT. The cam bushings associated with identifying token means 034 are assumed to be arranged in a manner to provide the mark-space buses M1 to M8 and S1 to S8 energized in the code combination shown in the code chart of FIG. 3 for the unit designation 034 and station designation ADE. The manner in which (B—) is supplied to the hundreds, tens and units buses as a result of the mark-space buses M1 to M8 and S1 to S8 being energized with (B+) in such code combination through the unit-station bus designated 034–ADE, the letter-digit buses designated A–0, E–4 and F–5 and the transistors Q1 to Q18 is similar to that described above in connection with the identifying token means AJJ. Further description here is believed to be unnecessary.

Each of the motors M associated with indicators 2TK, 2TK2 and 2TK3 are connected to (B—) by a circuit established from (B—), through the primary winding 95 of transformer TR1, over wire 169, through front contact 170 of relay 2SR, through front contact 227 of relay 1SR, over wire 228, over bus 75, to the respective motors M. The circuit established for supplying (B+) to the indicators selector circuit associated with such hose truck HT indicators for position 2 extends from (B+), through front contact 175 of relay 2SR, through front contact 229 of relay 1SR, over bus 230, through front contact 232 of relay 2LC, over wire 85, to the common connection of resistors 82 and 83 and the base of transistor Q22 included with such indicators selector circuit. The indicators 2TK, 2TK2 and 2TK3 will thus be operated as a result of the proper controlling energy being supplied thereto in the manner described similar to the operation of indicators 2SK, 2SK2 and 2SK3 to thus display the unit designation 034. Since this operation is similar to that described above, no further explanation thereof is considered to be necessary here. It should be noted, however, that the motor run detector circuit is effective in the manner described above to cause the relay CR to be energized when the motors M corresponding to the indicators 2TK, 2TK2 and 2TK3 are initiated into operation. In addition, following the operation of all of such motors to positions where the respective indicators jointly display the unit designation 034, the motor run detector circuit is effective to condition relay CR to its deenergized condition.

In addition to (B+) being supplied to the mark-space buses M1 to M8 and S1 to S8 in combination via token receiving means 2FT as noted above, it is also simultaneously supplied to the energizing circuit for relay 2FTR. This energizing circuit for relay 2FTR which includes front contact 109 of relay 2SR and front contact 110 of relay 1SR has been described above. In addition, this energizing circuit also includes front contact 113 of station relay JJR as shown in FIG. 2G. This station relay JJR was caused to be energized when the code determining relays 1CD, 3CD, 4CD and 5CD here energized as described above. Referring to FIG. 2D, it is seen that the energizing circuit for such relay JJR extends from (+), through front contact 235 of relay 1CD, through back contact 236 of relay 2CD, through front contact 237 of relay 3CD, through the winding of relay JJR, through a diode 240, through back contact 241 of relay 7CD, through back contact 242 of relay 6CD, through front contact 243 of relay 5CD, through front contact 244 of relay 4CD, to (—). The relay 2FTR is thus energized which energization is effective to complete the circuit for illuminating the fill-in lamps 2FTC and 2FTD through its front contact 115.

Following the release of relay CR as noted above, the stick circuit for relay ER which includes front contact 265 of relay CR is disconnected to thus deenergize relay ER. Following the release of ER, an energizing circuit for relay OR is established and extends from (+), through front contact 278 of relay OEP, over wire 303, through front contact 304 of relay 1SR, through front contact 305 of relay 2SR, over wire 314, through back contact 282 of relay ER, through the winding of relay OR, to (—). With the relay OR thus being energized and the relay 2SR previously being energized, the stick circuits for relay 1SR are disconnected to thus deenergize relay 1SR. Following the release of relay 1SR, the indicators 2EK, 2EK2 and 2EK3 would normally be operated should there be an identifying token means located in the token receiving means 2FE for position No. 2. For the present case, it was assumed that no such identifying token means was located therein. In view of this, the system would then return to its normal condition as indicated in the sequence chart of FIG. 6 by the release of the various relays previously energized assuming the indicators 2EK, 2EK2 and 2EK3 are each displaying a blank indication.

Immediately following the release of relay 1SR, the energizing circuit for relay OR which includes front contact 304 of relay 1SR is disconnected to thus deenergize relay OR. The stick circuit for relay 2LC which extends from (+), through front contact 276 of relay OEP, through front contact 141 of relay OR, over bus 150, through front contact 275 of relay 2LC, through the winding of relay 2LC, through closed contact 139 of button CNB, to (—) is disconnected to thus deenergize relay 2LC. The relay OEP dependent upon the energization of relay OR or ER initiates its release a predetermined time after the release of relay OR dependent upon the values of capacitor 316 and resistor 317 connected in shunt therewith since relay ER is not thereafter energized as described above. The stick circuit for relay 2SR dependent only upon the energization of relay OEP is disconnected following the release of relay OEP to thus deenergize such relay 2SR. Following the release of relay 2LC, the lockout relay LO is released.

Should any one or more of the indicators 2EK, 2EK2 and 2EK3 be in a position other than blank, the relay OR would not be deenergized immediately following the release of relay 1SR, but such indicators in positions other than blank would be operated to their blank positions. The relay CR would thus be energized and deenergized in accordance with such indicator operation similar to that described above. In order to insure that such indicators are in the blank position or are operated thereto and the corresponding fill-in lamps located on the maps DM and CM remain deenergized, (B—) is supplied to the hundreds, tens and units buses in accordance with the code combination allotted to the blank position while (B+) is supplied to the deenergizing winding of the fill-in relay 2FER through a front contact of the energized station relay JJR for insuring that such fill-in relay 2FER remains deenergized. The corresponding fill-in lamps 2FED and 2FEC located on the maps DM and CM respectively thus remain deenergized.

More particularly, by referring to the code chart shown in FIG. 3, it is seen that each of the space buses S1 to S8 are required to be energized for the blank position. The manner in which the hundreds, tens and units buses are energized is similar to that described above for unit-station bus 099–AJJ except that such circuit excludes a bus similar to the letter-digit buses shown in FIG. 2J. Referring to FIG. 2H, it is seen that mark buses M1 and M8 are each connected to the blank bus by a diode such as diode 246 connecting the mark bus M3 to the blank bus, while the blank bus is further connected to corresponding hundreds, tens and units buses as shown in FIG. 2J for supplying (B−) to the third, fourth and sixth hundreds, tens and units buses. For example, the biasing circuits for the transistors Q3, Q4 and Q6 associated with the units buses 3U, 4U and 6U are completed through the diodes 248, 249 and 250 respectively. A complete biasing circuit for transistor Q3, for example, extends from (B+), through resistor 252, through diode 248, over the blank bus, through resistor 255, to (B−). The biasing circuits for transistors Q4 and Q6 may be similarly traced through diodes 249 and 250. The units buses 3U, 4U and 6U as well as the tens buses 3T, 4T and 6T and the hundreds buses 3H, 4H and 6H are thus each energized with (B−) as a result of their corresponding transistors being energized. Since each of the indicators 2EK, 2EK2 and 2EK3 are assumed to be in their blank positions initially, the affected circuits responsive to the operation of such indicators will be effective immediately. This is shown in the sequence chart of FIG. 6 where the relay OR is shown to be deenergized immediately following the denergization of relay 1SR.

The circuit established for insuring that the fill-in relay 2FER remains deenergized extends from (B+), through front contact 36 of relay 2SR, through back contact 34 of relay 1SR, over wire 39, through front contact 42 of relay 2LC, over wire 45, through the back contact included with microswitch contactor 9S included with receiving means 2FE, over bus 117, through front contact 119 of relay 2SR, through back contact 120 of relay 1SR, over bus 258, through front contact 260 of relay JJR, through the lower winding of relay 2FER, to (B−). The relay 2FER remains deenergized since it was not assumed to be previously energized which is effective to cause fill-in lamps 2FED and 2FEC to remain deenergized.

After a given length of time, the dispatcher would be notified that the hose truck HT represented by identifying token means 035 is returning to its normally assigned station AJJ. In view of this, the dispatcher would move the identifying token means 035 from the panel 11 and insert it into the appropriate token receiving means on panel 12. In addition, he would relocate the station identifying token means AJJ from the fill-in panel 14 to the station token storage panel 13, while also relocating the identifying token means 034 from the panel 14 to the units enroute and fill-in panel 12 in the appropriate token receiving means. The appropriate assigned lamps and fill-in lamps would be conditioned in accordance with the moving of identifying token means 034 and 035, while the station and hose truck indicators for position 2 would be operated to their blank positions in accordance with the actuation of reset button RSB.

More particularly, the identifying token means 035 would be inserted into token receiving means ETJ located on panel 12. The assigned lamps JTC and JTD located on the maps CM and DM respectively at the station AJJ would be operated in a flashing manner to indicate the hose truck HT identified by identifying token means 035 is returning to its normally assigned station AJJ. The circuit provided herein for operating the lamps JTC and JTD in a flashing manner is shown in FIG. 2A. Referring to FIG. 2A, it is seen that the front contacts for microswitch contactors 8S and 9S in addition to other microswitch contactors would be closed with the identifying token means 035 appropriately inserted in the token receiving means ETJ. One side of the lamps JTC and JTD would then be periodically connected to (+) through these two closed contacts and a front contact 320 of relay 3FR. It will be noted that relay 3FR has a capacitor 321 connected in shunt therewith while a resistor 322 is connected in the energizing circuit for relay 3FR which also includes back contact 323 of such relay. The heel of contact 323 is connected to (+) while the opposite side of relay 3FR is connected to (−). With the (+) and (−) connected to the circuit in this manner, the relay 3FR is energized through its back contact 323, while the capacitor 321 is simultaneously charged. When the relay 3FR is energized, the energizing circuit is disconnected, but relay 3FR remains energized for a predetermined time dependent upon the charge on capacitor 321 and the discharge thereof. The contact 320 of relay 3FR is thus opened and closed periodically to operate the lamps JTC and JTD in a flashing manner. Similarly, the lamps DTC and DTD located on the maps CM and DM respectively at the station ADF are operated in a flashing manner when the identifying token means 034 is moved to the units enroute and fill-in panel 12. The token receiving means located on panel 12 into which the identifying token means 034 would be inserted is designated ETD in FIG. 2A. As shown therein, the relay 1FR would be energized and deenergized in a similar manner to that described for relay 3FR. Thus, further explanation here is considered to be unnecessary.

The actuation of reset button RSB following the removal of station identifying token means AJJ and identifying token means 034 from the fill-in panel 14 is effective to cause the station and hose truck indicators for position 2 located on the chief's console CC to be operated to blank positions while the fill-in lamps 2FTC and 2FTD located on the maps CM and DM respectively which were previously illuminated are caused to be deenergized. Generally speaking, following the actuation of reset button RSB, the present invention provides that the different groups of indicators are operated to the blank position in sequence with all of the indicators for each group being initiated into operation simultaneously, while the indicators for each of the plurality of positions are sequentially controlled in accordance with the energization of their corresponding location code LC relays. In addition, all of the fill-in lamps which were previously illuminated are caused to be deenergized simultaneously following the actuation of reset button RSB. In the present case, it has been assumed that only the station and hose truck indicators for position 2 have been operated to display positions other than blank. As generally indicated above, the present system provides that the display positions of all of the indicators included in the system are checked in accordance with corresponding token receiving means included with the fill-in panel 14 which may or may not have an identifying token means inserted therein.

More particularly, following the actuation of reset button RSB for the present case, the energizing circuit for a reset relay RSR which extends from (+), through the closed contact of button RSB, through the winding of reset relay RSR, to (−) is established. The energization of such relay RSR initially causes the energization of code determining relay 8CD in order to connect space bus S8 through its front contact 49 and contacts 47 and 36 of stepping relays 1SR and 2SR respectively to (B+) as described above. The energizing circuit for relay 8CD extends from (+), through front contact 325 of relay RSR, over wire 326, through the winding of relay 8CD, to (−). In order to maintain such energizing circuit established until the stick circuit for relay 8CD is established, the relay RSR is shunted by resistor 328 and capacitor 329. The capacitor is charged following the actuation of reset button RSB through resistor 328 and is thereafter effective to maintain relay RSR energized for a predetermined time in accordance with the discharge thereof. The above mentioned stick circuit for relay 8CD is then effectively established during such discharge from (+), through back contact 330 of relay 2SR, through front contact 331 of relay 8CD, through the winding of relay 8CD, to (—). In addition to relay 8CD being energized in accordance with the energization of relay RSR, each of the storage relays ST is energized through a front contact of such relay RSR. For example, relay 2ST is energized by a circuit extending from (+), through front contact 355 of relay RSR, through the winding of relay 2ST, over bus 29, through closed contact 27 of cancel button CNB, to (—). With the storage relays ST thus being energized, the corresponding location code LC relays are energized in sequence starting with the location code relay corresponding to the first storage relay. This is obvious from FIG. 2B wherein it is shown that the energizing circuit for relay 2LC includes a back contact of relay 1ST.

In the present case, following the energization of relays 1ST and 2ST, the relay 1LC would be energized by a circuit similar to that described above for relay 2LC. The various relays described above for providing the stepping operation are energized and deenergized in a similar manner to that shown in the sequence chart of FIG. 6. The relay LO would be energized in the present case through a front contact 336 of relay 1LC initially. In order to provide that the relay 8CD is maintained energized during the stepping operations for the plurality of positions wherein the relay 2SR is energized, another stick circuit for relay 8CD is included and extends from (+), through front contact 333 of relay LO, over wire 338, through front contact 331 of relay 8CD, through the winding of relay 8CD, to (—). The relays 1SR and 2SR are caused to be energized in the sequence described above for supplying (B—) to the motors M for the station, hose truck HT and pump engine PE indicators for position 1 in sequence while supplying (B+) to their corresponding indicators selector circuit in a similar sequence. Since these three groups of indicators are all assumed to be in the blank position, they will remain inoperative, but the positions thereof will be in effect checked. That is, (B—) will be supplied to the third, fourth and sixth buses for the hundreds, tens and units buses during the operation of the relays 1SR and 2SR since the relays 1CD to 7CD are deenergized and the relay 8CD is energized to thus connect each of the space buses S1 to S8 to (B+) initially while thereafter connecting such space buses to (B+) through the microswitch contactors included with token receiving means 1FT and 1FE.

After the stepping operation has been completed for the indicators in position 1, the stepping operation for those indicators assigned to the position No. 2 are effectively controlled as the relay 2LC is energized following the release of relay 2SR. The relays 1SR and 2SR are thereafter controlled in the sequence described above for supplying (B—) to the motors M for the groups of indicators in position No. 2 in sequence while simultaneously therewith supplying (B+) to the corresponding indicators control circuits. The station indicators for position No. 2 which are assumed to be displaying the letters A, J and J respectively are operated to the blank position in the manner described above, while the hose truck indicators 2TK, 2TK2 and 2TK3 which are assumed to be displaying the numerals 0, 3 and 4 respectively are thereafter operated to the blank position. The pump engine indicators 2EK, 2EK2 and 2EK3 remain inoperative since they are assumed to be in the blank position, but the position of each of such indicators is checked in the manner described above. In this connection, further explanation here is considered to be unnecessary.

It should be understood from the above description that should one or more identifying token means remain in particular token receiving means, the appropriate mark buses M1 to M8 will be energized with (B+) for causing the hundreds, tens and units buses to be energized with (B—) in the proper combination corresponding to the display positions in which the respective indicators are located. Thus, such indicators will remain inoperative, but their positions will be checked similarly to those indicators located in the blank position.

In response to the energization of relay RSR as described above, (+) is supplied to the deenergizing winding of the fill-in relays for those fill-in relays corresponding to token receiving means located on the station token storage panel 13 having station identifying token means inserted therein. In the present case, the lamps 2FTC and 2FTD are extinguished in accordance with an energizing circuit being established for the deenergizing winding of relay 2FTR. In accordance with the assumptions made above, such circuit is established as shown in FIG. 2G. Referring to FIG. 2G, it is seen that the circuit extends from (+), through front contact 340 of relay RSR, over bus 126, through the closed contact of microswitch contactor 10S for token receiving means JS, over wire 361, through the lower or deenergizing winding of relay 2FTR, to (—). The front contact 115 of relay 2FTR becomes opened to thus extinguish the fill-in lamps 2FTC and 2FTD.

At some later time it is assumed that the identifying token means 034 and 035 are removed from the panel 12 and inserted into the appropriate token receiving means located on the units assigned panel 10. When this is effected, the assigned lamps DTC and DTD for hose truck 034 and the assigned lamps JTC and JTD for the hose truck 035 are extinguished. This is shown more explicitly in FIG. 2A which has been described above.

*Modification of Fill-In Lamp Circuit*

Figure 7:
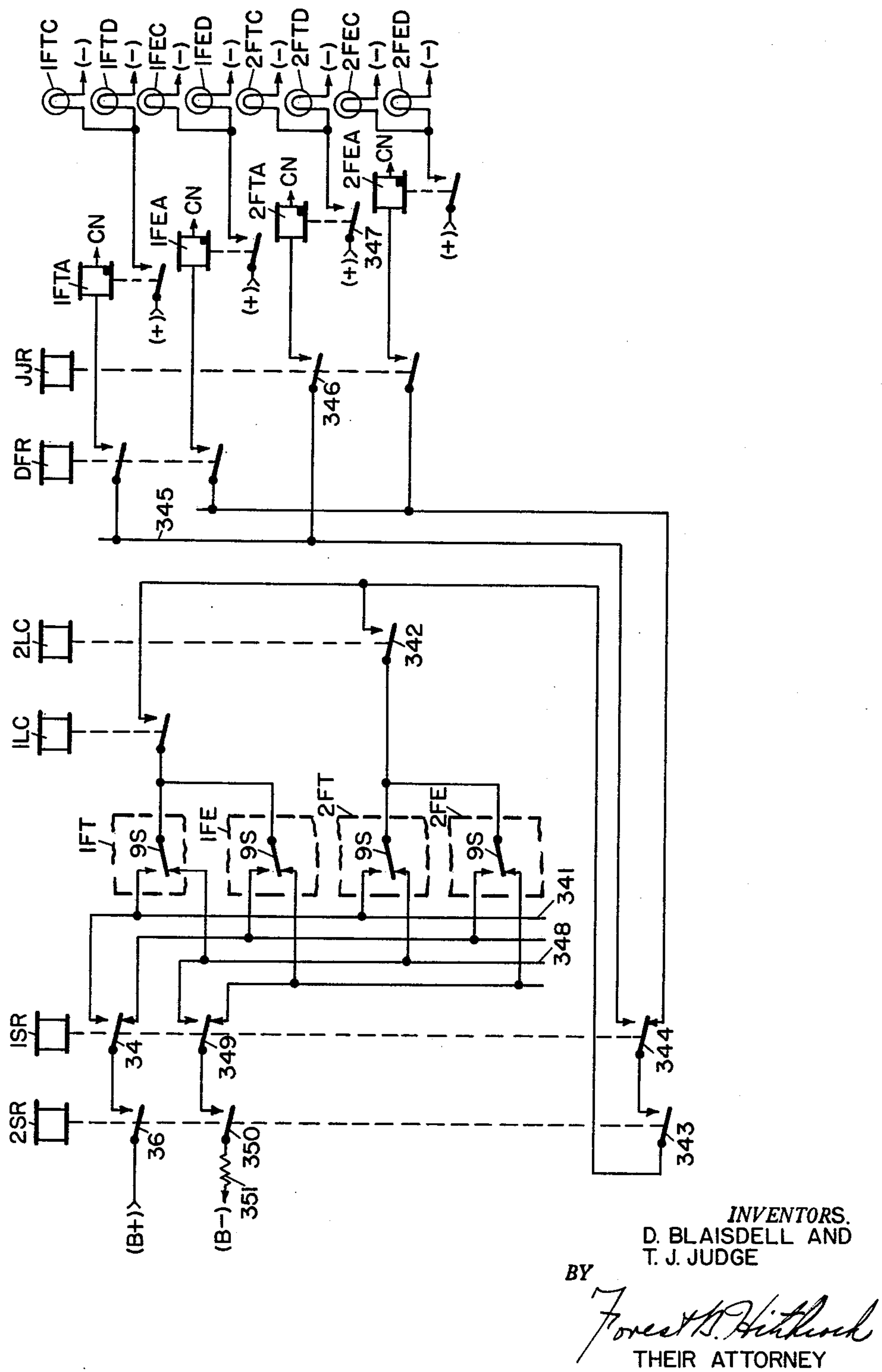
FIG. 7 illustrates a modified control circuit for the fill-in lamps located on the respective maps.

In order to show that other types of relays may be suitably employed in the fill-in lamp circuit described, the circuit shown in FIG. 7 is included in the present disclosure. Referring to FIG. 7, it is seen that that shown is similar to that described above except that the mechanically biased relays 1FTR, 1FER, 2FTR, and 2FER employed as the fill-in relays are replaced by magnetic stick relays 1FTA, 1FEA, 2FTA and 2FEA. It will be noted that each of such magnetic stick relays is indicated to be at times connected at one end of its respective winding to (B+) or (B—) through contacts of the various relays and the token receiving means described above, while the opposite end of the winding is indicated to be connected to a center or intermediate tap CN. The connections made at various times between (B+) and the intermediate tap CN and (B—) and the intermediate tap CN for each of such magnetic stick relays permits such relay to be energized and deenergized in its usual manner. That is, with the circuit being established between (B+) and the intermediate tap CN through a respective winding, that relay is energized and is maintained energized regardless of the condition of the energizing circuit thereafter, while such relay is normally deenergized when the circuit is established between (B—) and the intermediate tap CN for a respective relay. For example, the relay 2FTA would be energized in accordance with the conditions stated above by a circuit extending from (B+), through front contact 36 of relay 2SR, through front contact 34 of relay 1SR, over bus 341, through the closed front contact of microswitch contactor 9S for token receiving means 2FT, through front contact 342 of relay 2LC, through front contact 343 of relay 2SR, through front contact 344 of relay 1SR, over bus 345, through front contact 346 of station relay JJR, through the winding of relay 2FTA, to the intermediate tap CN. The fill-in lamps 2FTC and 2FTD described above would thus be energized through front contact 347 of relay 2FTA, in the present case. During the blanking operation as described, the various relays would be again energized in the proper combinations to cause the deenergizing circuit for relay 2FTA to be established in accordance with the removal of identifying token means 034 from the token receiving means 2FT located on the fill-in panel 14. Such deenergizing circuit would then be appropriately established from the intermediate tap CN, through the winding of relay 2FTA, through front contact 346 of station relay JJR, over bus 345, through front contact 344 of relay 1SR, through front contact 343 of relay 2SR, through front contact 342 of relay 2LC, through the back contact of microswitch contactor 9S for token receiving means 2FT, over bus 348, through front contact 349 of relay 1SR, through front contact 350 of relay 2SR, through resistor 351, to (B—). In this deenergizing circuit and each of the other deenergizing circuits for the other of the magnetic stick relays, the resistor 351 is included to provide for appropriate deenergization of such magnetic stick relays. The fill-in lamps 2FTC and 2FTD will thus be deenergized similarly to that described above.

ALTERNATE FORM OF SYSTEM

The present system is contemplated to include an unit dispatching system for fire apparatus where it is not desired to include the chief's console CC as described above, but to have an appropriate number of changeable display indicators located on the chief's map CM adjacent the assigned lamps located at the various stations shown thereon. With this arrangement, the changeable display indicators described above for displaying the combinations of letters indicative of the stations may be eliminated, while the appropriate information indicated by such groups of indicators may be alternately shown on the chief's map CM.

Figure 8:
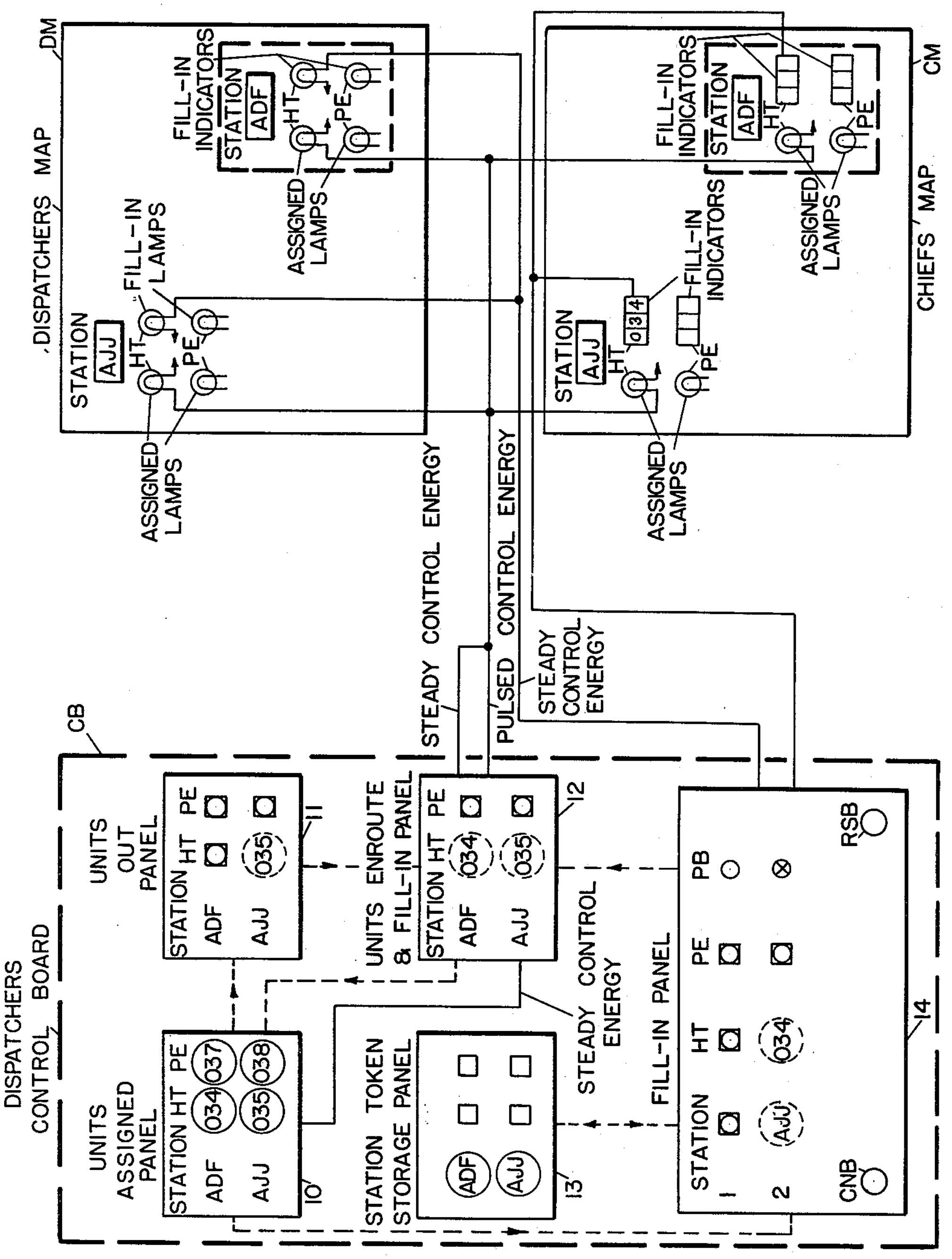
FIG. 8 is a block diagram showing an alternate form of the present invention to that shown in FIG. 1.

An organization as generally described above is shown in FIG. 8. Referring to FIG. 8, it will be noted that the dispatcher's control board and the panels shown thereon are identical to those described heretofore in connection with FIG. 1 while the dispatcher's map DM is additionally identical thereto. It will be noted, however, that the chief's console CC is not shown in FIG. 8, but three changeable display indicators are indicated to be grouped adjacent to each of the assigned lamps shown on the chief's map CM. The operation of the changeable display indicators, the assigned lamps and the fill-in lamps is similar to that described above in connection with FIG. 1. For convenience, the same assumptions have been made in connection with assumed hose truck movement in order to readily explain the differences in operation between that shown in FIG. 1 and that shown in FIG. 8.

It will suffice to state here that the operation of the system shown in FIG. 8 is identical to that described above except for the fill-in operation wherein the changeable fill-in lamps and display indicators are operated. The absence of the changeable display indicators employed to display the station designations necessitates certain circuit changes in connection with the stepping circuit described above for supplying sources of energy to the control and selector circuits for the hose truck and pump engine indicators. In addition, such changes in the stepping circuit necessarily affects the energizing circuits shown in FIG. 2 and described above for the fill-in relays. These respective circuit changes are shown in FIGS. 9A, 9B and 10.

Figure 9A:
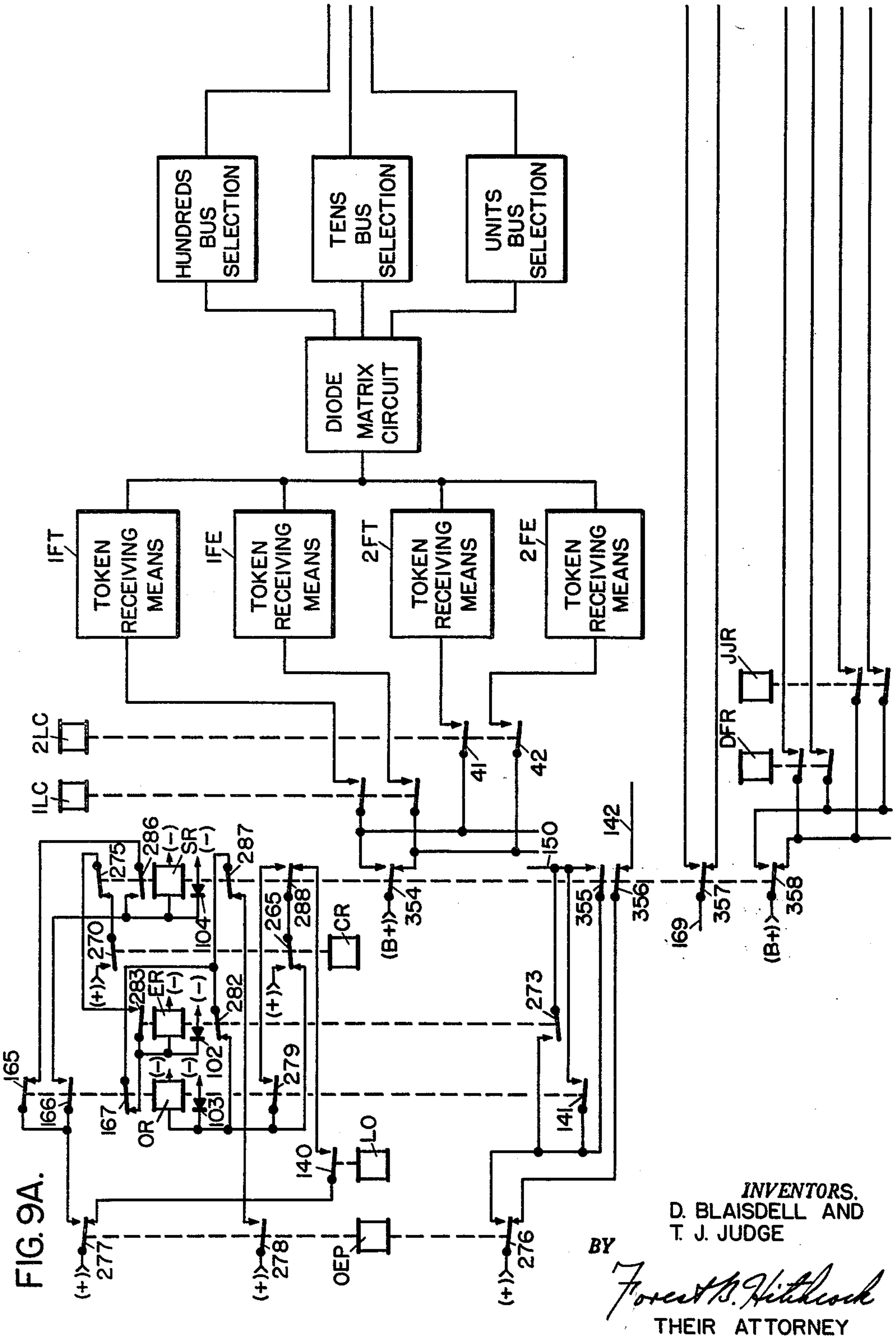
FIGS. 9A and 9B show a partial block diagram of the circuitry shown in FIGS. 2A to 2H and 2J to 2N which includes the detailed circuit changes necessary for the alternate form of the present invention.
Figure 9B:
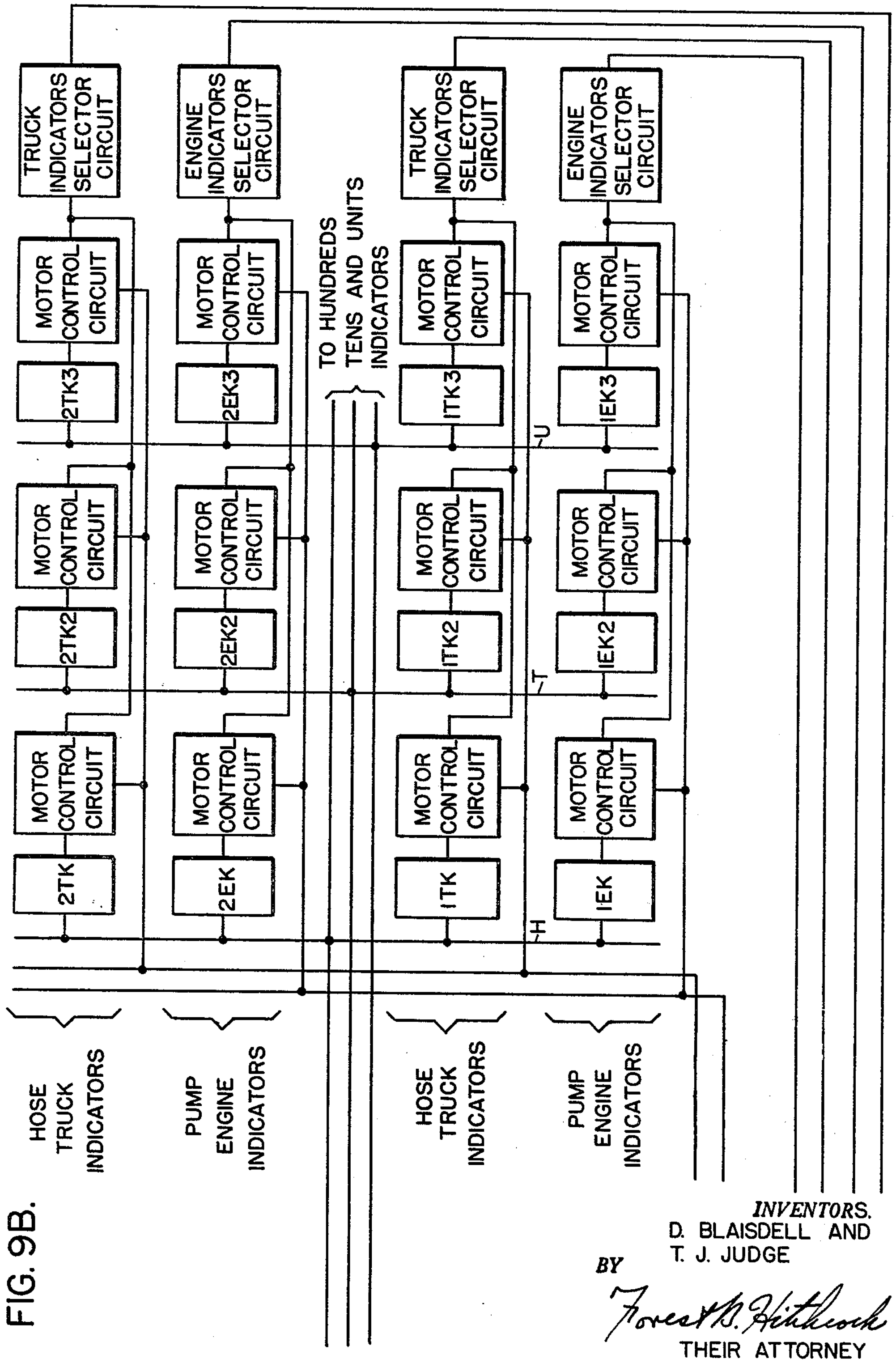

Referring to FIGS. 9A and 9B, it is seen that a portion of the stepping circuit is shown in detail in order to show circuit changes while the motor control circuits, indicators selector circuits and the circuits employed for bus selection are shown in block diagram form, with the circuits included in such blocks being identical to the corresponding circuits shown in the sections of FIG. 2 and described above. Generally speaking, since only two groups of three indicators each are employed in the present disclosure as being located on the chief's map CM, one stepping relay will be sufficient to effect the control of the two groups located according to station identification. A stepping relay SR is thus provided in lieu of relays 1SR and 2SR described above to be energized and deenergized for establishing circuits to the bus selection circuits, the motor control circuits and the indicators selector circuit for a given group of indicators. Generally speaking, the circuits shown in FIGS. 9A and 9B indicate that the initial energization of relay SR in accordance with the operation of the various relays described above is effective to establish circuits for first controlling a group of hose truck indicators and thereafter a group of pump engine indicators. In order to provide the necessary control circuits for the relays described above several additional contacts had to be included with several of such relays. For example, front contact 273 of relay ER had to be included for maintaining energization of the location code relays LC. In addition, the stick circuit for relay ER is revised to include front contact 270 of relay CR and back contact 275 of relay SR in lieu of contacts 267 and 300 of stepping relays 1SR and 2SR as described above. Similar energizing and stick circuits are at times established through contacts 286, 287, 288, 355 and 356 of relay SR. (B+) is supplied to the respective token receiving means through corresponding contacts of their respective location code relays through contact 354 of relay SR, while (B+) is additionally supplied to the respective indicators selector circuits through contact 358 of relay SR. (B—) is supplied over wire 169 in the manner shown in FIG. 2C through contact 357 of relay SR to the respective motor control circuits. The operation of such circuits should be obvious from that described above and thus it is considered unnecessary here to render further explanation.

Figure 10:
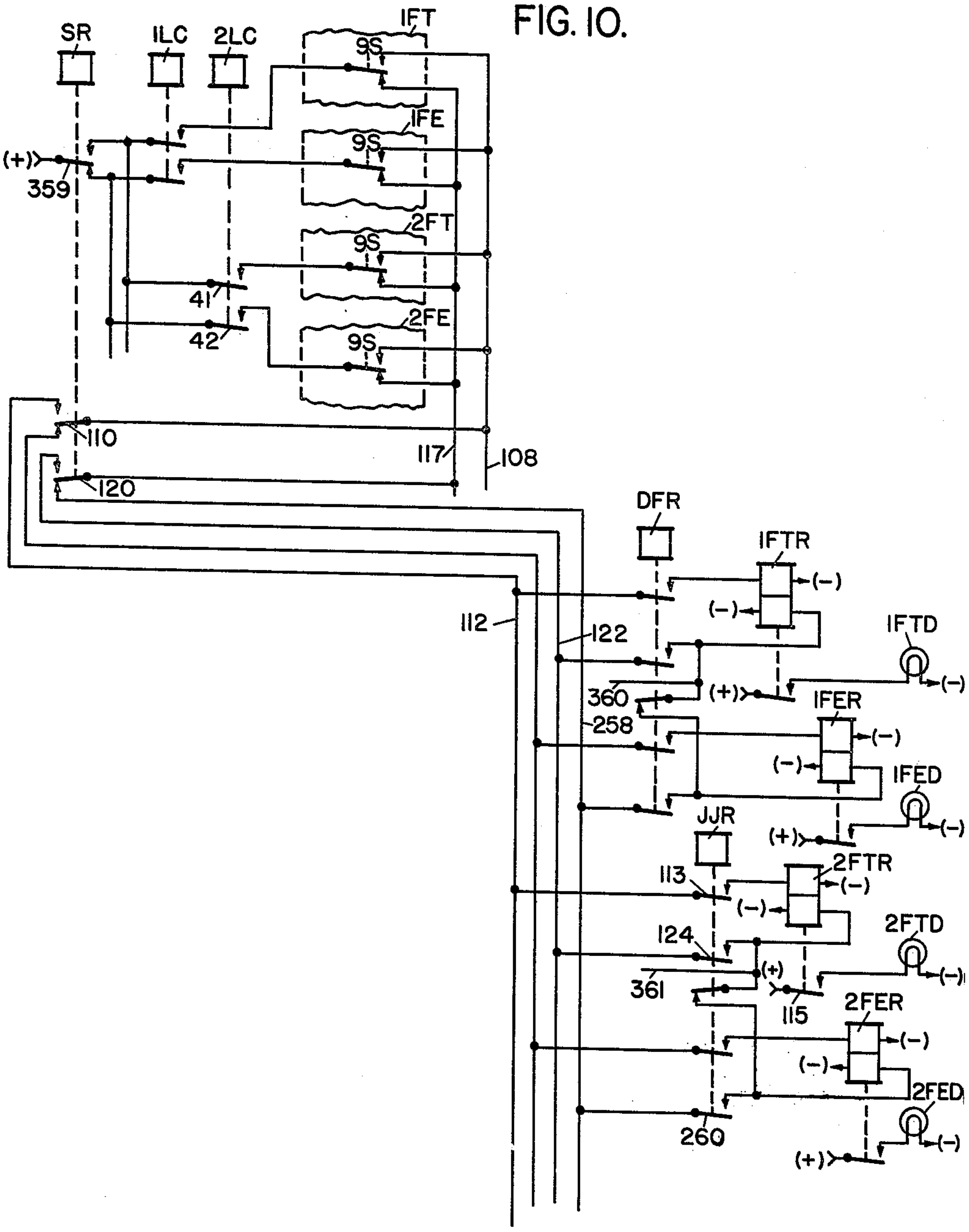
FIG. 10 illustrates the detailed circuit changes which are required for the alternate form of the present invention for the control of the fill-in lights located on the dispatcher's map; and, FIG. 11 illustrates by block diagram the arrangement of FIGS. 2A to 2H and 2J to 2N.

The circuits provided for operating the fill-in relays 1FTR, 1FER, 2FTR and 2FER for the alternate form are shown in FIG. 10. Referring to FIG. 10, it is seen that a contact 359 of relay SR is included for completing energizing circuits from (B+) to such fill-in relays in accordance with the location code relay energization and the insertion of identifying token means into the respective token receiving means shown therein. In addition, the appropriate station relay must be energized in the manner described above. Similarly, the deenergizing circuits for the fill-in relays are established, while the circuits for insuring that the appropriate fill-in relays are deenergized following the actuation of the reset button RSB are established over wires 360 and 361. It will be noted that only those fill-in lamps located on the map DM are shown in FIG. 10.

SUMMARY

A dispatching system has been disclosed above which may be applicable to any one of numerous areas wherein movable units are employed, with such movable units normally being assigned to respective stations, but which are dispatchable to designated locations while requiring that a similar movable unit fills in or covers at the normally assigned station during the absence thereof. Two forms of such system have been presented herein, each of which permits the dispatcher and other responsible parties to readily ascertain the general whereabouts of any one of the number of movable units included in the group under the supervision of the dispatcher.

Having described two forms of a dispatching system, as specific embodiments of the present invention, it is desired to be understood that these forms are selected to facilitate in the disclosure of the invention rather than to limit the number of forms which it may assume; and, it is to be further understood that various modifications, adaptations and alterations may be applied to the specific form shown to meet he requirements of practice without in any manner departing from the spirit or scope of the present invention.

What we claim is:

1. A dispatching system for governing the movements of a plurality of movable units of apparatus comprising, in combination, a map for representing geographically a predetermined area having a plurality of stations located therein to which said plurality of movable units of apparatus are distinctively assigned, a plurality of indicating means, one disposed on said map for each said movable unit of apparatus and with respect to its assigned station location for providing at least three indications each representative of a different location within said area to which that said movable unit of apparatus is assignable and including the assigned station location, and control means operatively connected electrically to said plurality of indicating means for selectively operating each of said plurality of indicating means to provide one indication representative of the existing location of the associated said movable unit of apparatus.

2. The system according to claim 1, wherein each of said indicating means is a lamp, each said lamp being operable according to selective control of said control means through characteristic conditions of unillumination, to a steady illumination, to a flashing illumination, to unillumination for indicating separate general locations of a circuitous route taken by the associated movable unit of apparatus from its assigned station location, to a location within said area and back thereto.

3. The system according to claim 1, wherein said control means includes a plurality of separate means each for defining one location within said area which is generally common to each of said plurality of movable units of apparatus, all of said plurality of separate means taken in combination being effective to define a circuitous route for each said movable unit of apparatus, and a plurality of controlling means each for defining one of said movable units of apparatus and each being movable between said plurality of separate means for defining the existing location of each said movable unit of apparatus within said area.

4. The system according to claim 3, wherein each of said plurality of separate means includes a plurality of controllable means, one for each of said plurality of movable units of apparatus, corresponding controllable means included with said plurality of separate means being defined by relative positions and distinctively interconnected electrically with an indicating means on said map associated with a particular movable unit of apparatus, each of said plurality of controlling means being movable between corresponding controllable means of one particular group for altering such electrical interconnection to cause the associated indicating means to be operated to a condition corresponding to the existing presence of the controlling means as it is caused to actuatably engage each controllable means in sequence.

5. A dispatching system for governing the movements of a plurality of movable units of apparatus comprising in combination, a plurality of maps each for representing geographically a similar predetermined area having a plurality of stations located therein to which said plurality of movable units of apparatus are distinctively assigned, a plurality of indicating means for each of said plurality of maps, one indicating means being disposed on each of said plurality of maps for the same said movable unit of apparatus and with respect to its assigned station location for providing a plurality of indications each representative of a different location within said area to which that said movable unit of apparatus is assignable and including the assigned station location, and control means operatively connected electrically to said pluralities of indicating means disposed respectively on said plurality of maps for selectively operating in a group all indicating means disposed on said plurality of maps corresponding to a given movable unit of apparatus to provide an indication representative of the existing location of the associated said movable unit of apparatus.

6. The system according to claim 5, wherein each of said plurality of maps is located remotely from the other maps, each said plurality of indicating means being disposed on its associated map of said plurality of maps in groups corresponding to the geographical location of said stations within said area defined by each of said maps and the number of movable units of apparatus assigned to each of said stations, each said indicating means of a group being operated to provide an indication representative of the existing location of the associated said movable unit within said area.

7. The system according to claim 5, wherein said control means includes a plurality of separate means each for defining one location within said area which is generally common to each of said movable units of apparatus and each having a plurality of controllable means, one for each of said plurality of movable units of apparatus, corresponding controllable means included with said plurality of separate means being further defined by relative positions and distinctively interconnected electrically with one group of indicating means disposed on said plurality of maps associated with a particular movable unit of apparatus, and a plurality of controlling means, each for defining one of said movable units of apparatus and each movable between corresponding controllable means of one particular group for altering such electrical interconnection to cause each of the indicating means in the group to be operated to a similar condition corresponding to the existing presence of the controlling means as it is caused to actuatably engage each of said plurality of controllable means in sequence.

8. In a dispatching system for indicating temporary assignments of movable units of apparatus to different stations, a plurality of changeable display indicators each having a display element capable of bearing a plurality of symbols each characteristic of a station or movable unit designation and each operable to display each such symbol separately, means for supporting said plurality of changeable display indicators in differently defined groups, each group of indicators in combination for providing displayed designations of a station and at least one movable unit of apparatus, a plurality of controlling means, each for distinctively identifying one of said movable units of apparatus or one of said stations and adapted to communicate by engagement such identification, panel means having a plurality of controllable means disposed thereon in groups with each group of controllable means being electrically interconnected distinctively with one group of said changeable display indicators and having a plurality of actuatable means, one for each of said groups actuatable for rendering operative the group of said changeable display indicators corresponding electrically to those controllable means in the group having controlling means engageably communicating therewith for each displaying a designation characteristic of the station or movable unit corresponding to the identification assigned to a said communicating controlling means.

9. The system according to claim 8, wherein each of said plurality of changeable display indicators includes a motor and a control circuit for governing the operation of said motor for causing the desired designation to be displayed by that indicator, each said control circuit rendered responsive according to the presence of a controlling means in a controllable means, group selecting means responsive to the actuation of an actuatable means for rendering operative the changeable display indicators in a particular group.

10. The system according to claim 9, wherein each controllable means includes a plurality of contacts each operable to two contact making positions and distinctively engageable by one of said controlling means, each changeable display indicator including a plurality of changeable contacts operatively governed in combination by said motor operation to different opened and closed contact positions characteristic of the different display positions, and circuit means operative to translate control energy supplied through said contact making positions for those controllable means associated with an actuated actuatable means characteristic of the respective identifications assigned to each communicating controlling means for operating corresponding changeable display indicators to display positions wherein respective designations are displayed.

11. The system according to claim 10, wherein said circuit means includes a plurality of control buses electrically connected to said plurality of changeable contacts for all of said plurality of changeable display indicators and switching means operative to select and supply said control energy to certain of said control buses, each actuatable means including stepping means responsive to the actuation thereof for rendering a group of said changeable display indicators responsive each in sequence dependent upon the conclusion of operation for the preceding changeable display indicator operated.

12. The system according to claim 11, wherein said stepping means includes a control means operable to two conditions, one of said conditions prevailing when no changeable display indicators are being controlled and the second of said two conditions prevailing when at least one indicator is being operated, other circuit means responsive to said one condition for causing said stepping means to render operative a succeeding changeable display indicator.

13. The system according to claim 11, wherein said panel includes an actuatable reset means for controlling all of said group selecting means in sequence and all changeable display indicators currently displaying a designation corresponding to controllable means not having controlling means therein, the plurality of contacts for each such controllable means being in similar contact making positions for providing said controlling energy on similar of said plurality of control buses, each said changeable display indicator when rendered operative according to said stepping means and a said group selecting means being operable to a display position wherein the display element therefor displays a blank indication.

14. In a dispatching system for indicating temporary assignments of movable units of apparatus to different stations, a plurality of changeable display indicators each having a display element capable of bearing a plurality of symbols each characteristic of a station or movable unit designation and each operable to display each such symbol separately, means for supporting said plurality of changeable display indicators in differently defined groups, each group of indicators in combination for providing displayed designations of a station and at least one movable unit of apparatus, a plurality of controlling means, each for distinctively identifying one of said movable units of apparatus or one of said stations and adapted to communicate by external engagement such identification, panel means having a plurality of controllable means disposed thereon in groups with each group of controllable means being electrically interconnected distinctively with one group of said changeable display indicators and having a plurality of actuatable means, one for each of said groups actuatable for rendering responsive the group of said changeable display indicators corresponding electrically to those controllable means in the group having controlling means engageably communicating therewith, stepping means responsive to at least one of said actuatable means for rendering operative an initial changeable display indicator and thereafter another changeable display indicator dependent upon the concluded operation of the preceding indicator controlled.

15. The system according to claim 14, wherein each movable unit designation includes a plurality of individual symbols, each plurality of symbols being identified by a respective one of the controlling means when engageably communicating with one of the controllable means, each of said plurality of changeable display indicators being operative to display one of such plurality of symbols with a complete designation being formed by displays of a particular plurality of changeable display indicators corresponding in number to said plurality of symbols, circuit means operative to electrically connect one of said controllable means to a plurality of said changeable display indicators and to supply control energy thereto simultaneously, said stepping means being responsive to an actuatable means when actuated for rendering operative an initial group of indicators and thereafter another group of indicators dependent upon the concluded operation of the slowest operating indicator in such preceding group of indicators controlled.

16. The system according to claim 15, wherein each complete designation displayed by each particular plurality of changeable display indicators is comprised of a similar number of symbols, said circuit means including a number of pluralities of control buses, one plurality of control buses for electrically connecting changeable contacts included with each changeable display indicator of all particular pluralities of changeable display indicators having corresponding indicating positions in a complete designation, said circuit means further including a plurality of switching means operative to select and apply said controlling energy to certain buses in each of the number of pluralities of control buses, whereby the changeable display indicators in a particular plurality of indicators are operated simultaneously.

17. The system according to claim 16, wherein said stepping means includes a control means operable to two conditions, one of said conditions prevailing when no changeable display indicator of a particular plurality of indicators is operating and the second of said two conditions prevailing when at least one indicator of a particular plurality of indicators is in operation, other circuit means responsive to said one condition for causing said stepping means to render operative a succeeding particular plurality of changeable display indicators.

18. In a dispatching system for indicating temporary assignments of movable units of apparatus, a map for representing geographically a predetermined area having a plurality of stations defined by location included therein with at least one station in each of a plurality of smaller areas comprising said predetermined area, a plurality of indication means, each for providing at least a first indication representative of the absence and a second indication representative of the presence of a movable unit of apparatus, at least one indicating means disposed on said map with respect to each defined station location, and means electrically connected to said plurality of indicating means for selectively operating each of said indicating means from said first indication to said second indication for thereby indicating the temporary assignment of a movable unit of apparatus to the corresponding station on said map.

19. The system according to claim 18, wherein a plurality of maps each remotely disposed from the others are provided for each representing geographically a similar predetermined area, a plurality of said indicating means for each of said plurality of maps, said means being electrically connected to correspondingly positioned indication means in multiple for slectively operating corresponding indicating means disposed on said plurality of maps from said first indication to said second indication for thereby indicating the temporary assignment of a movable unit of apparatus to the corresponding station of each of said plurality of maps.

20. In a dispatching system for indicating temporary assignments of movable units of apparatus, a map for representing geographically a predetermined area having a plurality of stations defined by location included therein, a plurality of indicating means, each for providing at least a first indication representative of the absence and a second indication representative of the presence of a movable unit of apparatus, at least one indicating means disposed on said map with respect to each defined station location, a plurality of changeable display indicators each having a display element capable of bearing a plurality of symbols each characteristic of a station or movable unit designation and each operable to display each such symbol separately, means for supporting said plurality of changeable display indicators in differently defined groups, and control means for selectively applying control energy to at least two of said indicators in a particular group to provide control thereof for respectively displaying designations representative of a particular station and a particular movable unit temporarily assigned thereto and to the indicating means disposed on said map to provide control thereof from said first indication to said second indication for indicating the presence of a movable unit thereat.

21. The system according to claim 20, wherein said control means includes panel means having a plurality of controllable means and a plurality of actuable means disposed thereon, said plurality of controllable means being arranged in differently defined groups for defining one of said stations and at least one of said movable units of apparatus, one of said plurality of actuatable means being associated with each defined group of controllable means, a plurality of controlling means, each for distinctively identifying one of said stations or one of said movable units of apparatus and effective to communicate by engagement such identification, station selection means responsive to the actuation of an actuatable means and according to controllable means therefor having a controlling means communicating therewith for causing the corresponding changeable display indicator and indicating means for that station to respectively display the station designation and said second indication.

22. The system according to claim 21, wherein said station selection means includes a first plurality of relay means responsively associated with each particular group of controllable means and operable in combination according to a controlling means communicating with one particular controllable means thereof, a second plurality of relay means one for each represented station each selectively conditioned dependent upon the existing operated condition of said first plurality of relay means, separate control means for each said indicating means respectively controlled by causing that indicating means to be operated to said second condition only provided the relay means of said second plurality of relay means has been selectively conditioned, said separate control means remaining controlled after such corresponding relay means becomes unconditioned.

23. The system according to claim 22, wherein the selective conditioning of one of said second plurality of relay means is effective to control each of the separate control means to a responsive condition only provided the controllable means corresponding to the movable unit of apparatus at the represented station has a controlling means communicating therewith, the absence of a said controlling means from a controllable means being effective to cause the separate control means corresponding thereto to be rendered uncontrolled thereby causing the associated indication means to be operated to said first condition.

24. The system according to claim 22, wherein said panel means includes an actuatable reset means, each said controllable means not having a controlling means communicating therewith being effective to provide a similar distribution of said control energy to corresponding changeable display indicators, second panel means having a plurality of controllable means each distinctively connected electrically to one of said separate control means, the actuation of said reset means being effective to cause control energy to be supplied to said changeable display indicators currently displaying a designation corresponding to a noncommunicating controllable means for operating each such corresponding changeable display indicator to a blank indication display and to said separate control means corresponding to such controllable means on said second panel means having a station identifying controlling means communicating therewith for operating each corresponding indicating means to said one condition.

25. In a dispatching system for indicating temporary assignments of movable units of apparatus, a plurality of changeable display indicators each having a display element capable of bearing a plurality of symbols each characteristic of a movable unit of apparatus designation and each operable to display each such symbol separately, a plurality of maps, each for representing geographically a similar predetermined area having a plurality of stations defined by location included therein, at least one of said plurality of changeable display indicators having its display element positioned at the defined station location on one of said maps, a plurality of indicating means, each for providing at least a first indication representative of the absence and a second indication representative of the presence of a movable unit of apparatus, at least one indicating means disposed on another of said maps at each defined station location, and control means electrically connected distinctively to said plurality of changeable display indicators and to said plurality of indicating means having corresponding positions on said maps for selectively operating a changeable display indicator and an indicating means to respectively display the designation and indicate the presence of a particular movable unit of apparatus at that station.

26. The system according to claim 25, wherein said control means includes a panel means having a plurality of controllable means and a plurality of actuatable means disposed thereon, said plurality of controllable means being arranged in differently defined groups each for defining one of said stations and at least one of said movable units of apparatus, one of said plurality of actuatable means being associated with each defined group of controllable means, a plurality of controlling means, each for distinctively identifying one of said stations or one of said movable units of apparatus and effective to communicate by engagement such identification, station selection means responsive to the actuation of an actuatable means and according to a controllable means therefor having a controlling means communicating therewith for causing the corresponding changeable display indicator and said indicating means located on said two maps for that station to respectively display the movable units designation and said second indication.

27. The system according to claim 26, wherein a plurality of relay means each representative of one of said station are separately rendered operable according to the presence of an identifying controlling means communicating with a particular said controllable means and the corresponding actuatable means is actuated, other relay means for that actuatable means rendered responsive according to the actuation thereof, circuit means responsive to a said relay means and a said other relay means when operated for selectively operating the changeable display indicators corresponding thereto and operating the associated indicating means to said second condition only provided the controllable means associated therewith has an engageable communicating controlling means therewith.

References Cited in the file of this patent

UNITED STATES PATENTS 2,425,973 Wight ---------------- Aug. 19, 1947